US009568965B2

(12) United States Patent
Honmura et al.

(10) Patent No.: US 9,568,965 B2
(45) Date of Patent: Feb. 14, 2017

(54) MOBILE TERMINAL

(71) Applicant: Toshiba Home Technology Corporation, Niigata (JP)

(72) Inventors: Osamu Honmura, Niigata (JP); Nobuyuki Kojima, Niigata (JP); Naoto Sakuma, Niigata (JP)

(73) Assignee: TOSHIBA HOME TECHNOLOGY CORPORATION, Nigata (JP)

( * ) Notice: Subject to any disclaimer, the term of this patent is extended or adjusted under 35 U.S.C. 154(b) by 0 days.

(21) Appl. No.: 14/527,225

(22) Filed: Oct. 29, 2014

(65) Prior Publication Data
US 2015/0119111 A1 Apr. 30, 2015

(30) Foreign Application Priority Data

Oct. 30, 2013 (JP) .................. 2013-225209

(51) Int. Cl.
*G06F 1/20* (2006.01)
*H04M 1/02* (2006.01)
(Continued)

(52) U.S. Cl.
CPC ........... *G06F 1/203* (2013.01); *F28D 15/0233* (2013.01); *F28D 15/046* (2013.01); *H04M 1/026* (2013.01)

(58) Field of Classification Search
CPC ................... H01L 23/427; H01L 2224/16225; G06F 1/203; G06F 1/20; G06F 2200/202; G06F 2200/203; G06F 1/02; F28D 15/0266; F28D 15/02; F28D 15/0233; F28D 15/0275; F28D 15/0283; F28D 15/04; F28D 15/046; F28D 15/06; F28D 1/0391; F28D 15/02753; H04M 1/026; H01J 61/52; H05K 7/20336

See application file for complete search history.

(56) References Cited

U.S. PATENT DOCUMENTS

2002/0080584 A1* 6/2002 Prasher et al. ................ 361/702
2003/0136551 A1* 7/2003 Bakke .................. F28D 15/046
165/104.26
(Continued)

FOREIGN PATENT DOCUMENTS

JP 10-207381 8/1998
JP 2002-286380 10/2002
(Continued)

OTHER PUBLICATIONS

Ultra Thin Heat Pipe and its Application by Hirofumi Aoki, Masami Ikeda and Yuichi Kimura Nov. 6-9, 2011.*
(Continued)

*Primary Examiner* — Nizar Sivji
(74) *Attorney, Agent, or Firm* — Duane Morris LLP; J. Rodman Steele, Jr.; Gregory M. Lefkowitz

(57) ABSTRACT

Provided is a mobile terminal capable of allowing a heat generating component such as a CPU to make best use of its capabilities. The sheet-shaped heat pipe, according to the present invention, is provided either between the rear surface of the touch panel and motherboard, or between the one and the battery pack. In this case, since the sheet-shaped heat pipe is arranged opposite to the rear surface of the touch panel which is a part of the chassis of the mobile terminal, a favorable heat diffusion from the heat generating components such as the CPU to a large area on the chassis can be achieved through these sheet-shaped heat pipe, thus allowing the heat generating component such as the CPU to make best use of its capabilities.

12 Claims, 48 Drawing Sheets

(51) Int. Cl.
*F28D 15/02* (2006.01)
*F28D 15/04* (2006.01)

(56) References Cited

U.S. PATENT DOCUMENTS

| | | |
|---|---|---|
| 2005/0104526 A1* | 5/2005 | Rossi et al. .................... 315/149 |
| 2005/0111189 A1 | 5/2005 | Smalc et al. |
| 2008/0141681 A1* | 6/2008 | Arnold ................. A41D 13/005 62/3.5 |
| 2010/0101763 A1 | 4/2010 | Huang et al. |
| 2010/0149755 A1 | 6/2010 | Tomioka et al. |
| 2012/0118537 A1* | 5/2012 | Kameoka ............ F28D 15/0233 165/104.26 |
| 2013/0194731 A1* | 8/2013 | Nakano .................... 361/679.01 |
| 2014/0226272 A1* | 8/2014 | Imamura et al. ........ 361/679.04 |
| 2014/0262160 A1* | 9/2014 | Vadakkanmaruveedu et al. ....................... 165/104.33 |

FOREIGN PATENT DOCUMENTS

| | | |
|---|---|---|
| JP | 2005-349955 | 12/2005 |
| JP | 2012016064 | 1/2012 |
| JP | 2012-186692 | 9/2012 |
| JP | 2013-90117 | 5/2013 |

OTHER PUBLICATIONS

Ultra-thin Sheet-shaped Heatpipe "pera-flex®" by Furukawa 2004.*

Japanese Notice of Reasons for Refusal, dated Jan. 26, 2016, in JP Patent Application No. 2013-225209, and English translation thereof.

* cited by examiner

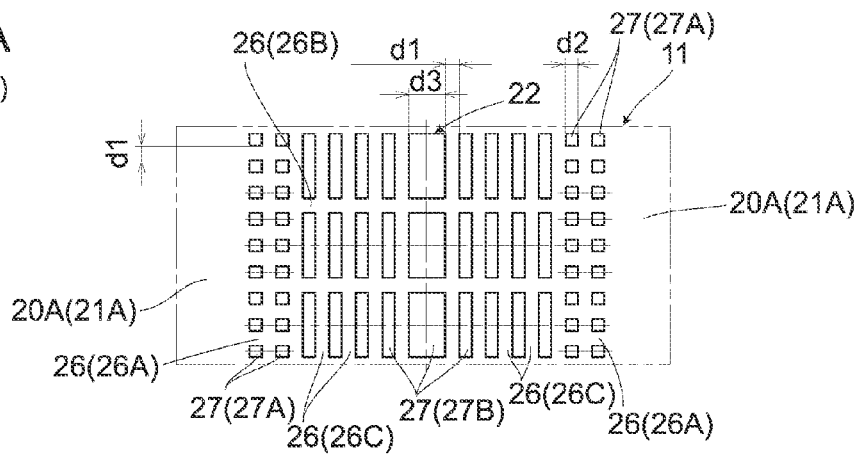
FIG.4A (Section A)
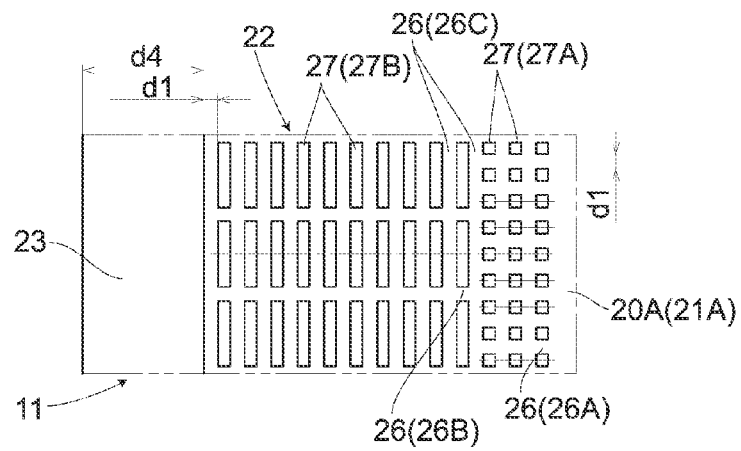
FIG.4B (Section C)
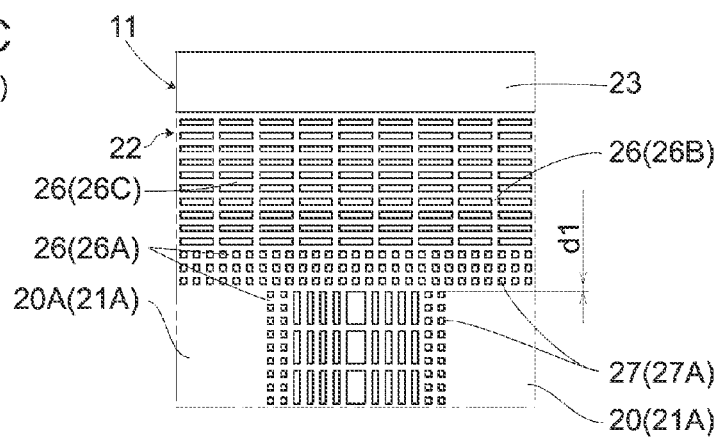
FIG.4C (Section E)

(Section B)

(Section D)

(Section F)

(Section G)

(Section H)

(Section A)

(Section B)

(Section C)

(Section A)

(Section C)

(Section B)

(Section D)

(Section E)

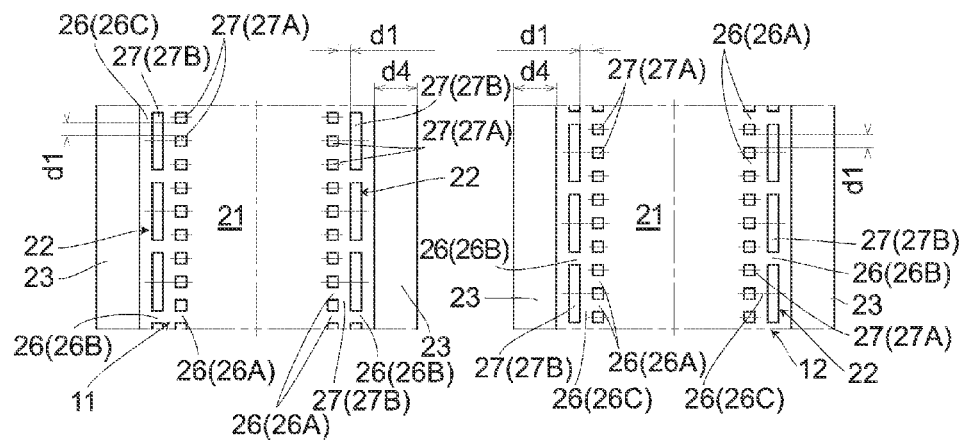
FIG.23A
(Section A)
FIG.23B
(Section B)
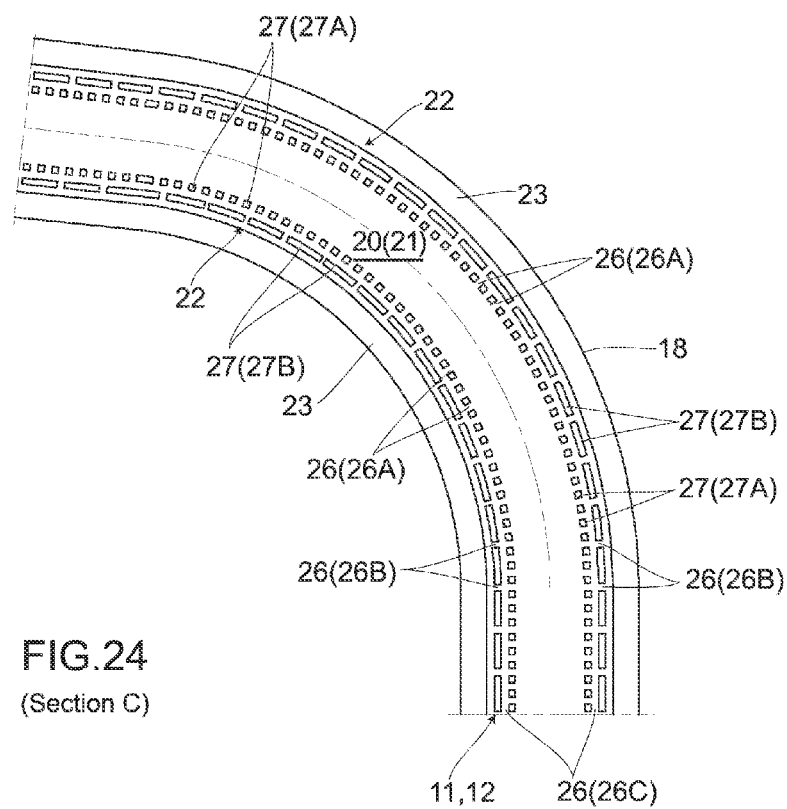
FIG.24
(Section C)

(Section D)

(Section E)

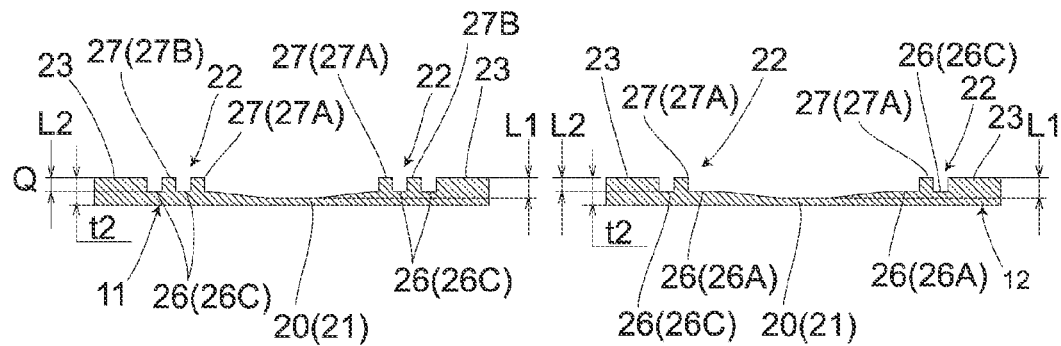
FIG.40A
D-D cross-section
FIG.40B
E-E cross-section
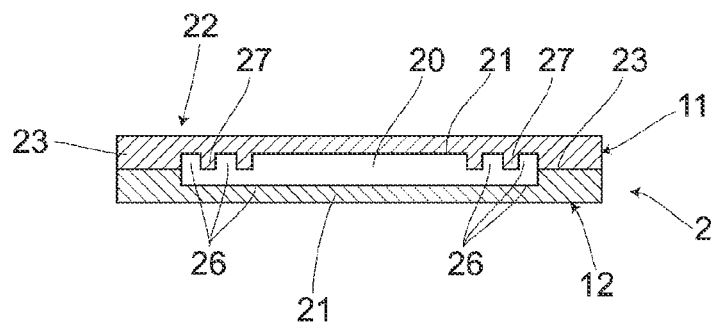
FIG.41

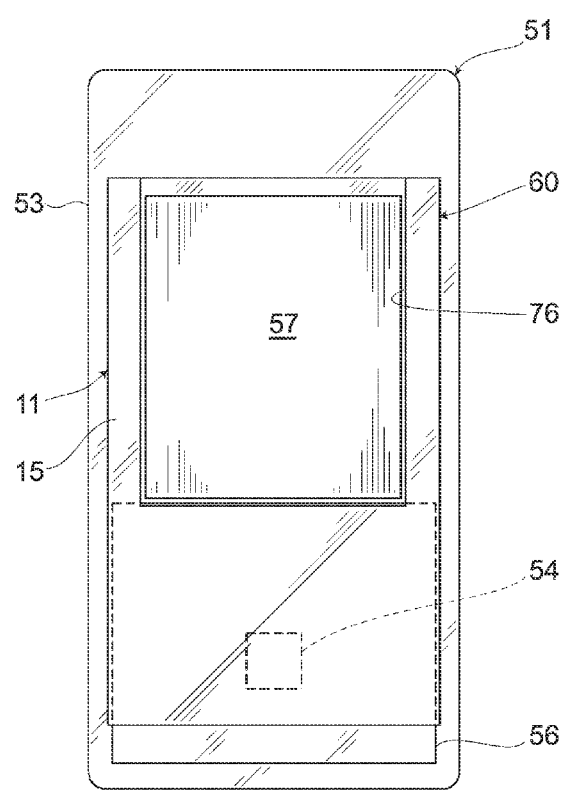
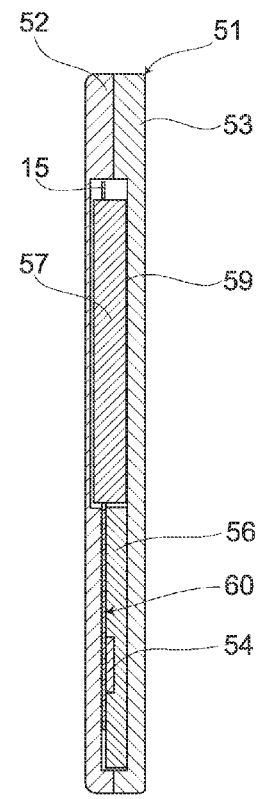
FIG.68A  FIG.68B
< Surface temperature of touch panel >
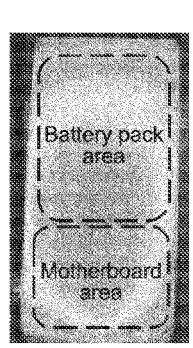
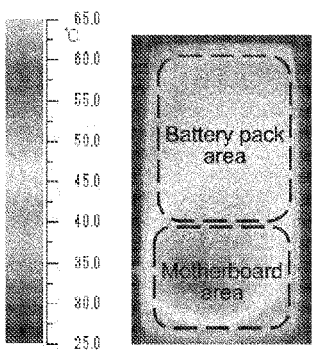
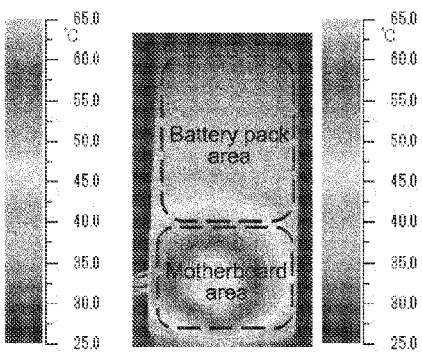
FIG.69A  FIG.69B  FIG.69C

MOBILE TERMINAL

CROSS-REFERENCE TO RELATED APPLICATION

This application claims priority under 35 U.S.C. §119 to Japanese Patent Application No. 2013-225209 filed on Oct. 30, 2013 in the Japanese Intellectual Property Office, the disclosure of which is incorporated herein by reference in its entirety.

BACKGROUND OF THE INVENTION

Field of the Invention

The present invention relates to a mobile terminal such as a smartphone or tablet terminal in which a flat-type heat pipe, such as flattened heat pipe and sheet-shaped heat pipe, is installed.

Conventionally, is order to diffuse a heat generated by a CPU installed in a mobile device such as a tablet terminal, there has been proposed, for example, a heat dissipation structure disclosed in JP-A-2012-186692. This heat dissipation structure is characterized by mixing into a heat dissipation sheet a graphite having a high thermal conductivity.

SUMMARY OF THE INVENTION

However, the conventional structure has tailed to bring about a sufficient heat diffusion such that the temperature of a CPU sometimes surpassed a restrictive temperature, and that a heat spot(s) occurred on an outer frame of the mobile device. Therefore, it has been imperative to control the heat generation of the CPU. That is, it has been impossible to make best use of the capabilities of the CPU.

Meanwhile, there has also been known a heat dissipation structure for diffusing the heat generated by a CPU through a heat pipe. However, due to the restriction of a preferred size of a mobile device such as a tablet terminal, it is difficult to secure a space inside a chassis of the mobile device that is large enough to receive a heat pipe having a diameter of not smaller than $\phi 3$ mm. Especially, as for a mobile terminal such as a smartphone, the thickness of its chassis is restricted for ease of use, which makes it difficult to install the heat pipe. Further, a pipe-shaped heat pipe is incapable of performing a favorable heat diffusion in a wide region of the mobile terminal, thus making it impossible for the mobile terminal to take full advantage of a heat-generating component such as CPU.

In view of the aforementioned problems, it is an object of the present invention to provide a mobile terminal capable of allowing a heat generating component such as CPU to make best use of its capabilities.

The problem to be solved is to provide a mobile terminal capable of installing a heat pipe inside the thin chassis of the mobile terminal and to provide the one capable of allowing a heat generating component such as CPU to make best use of its capabilities.

A mobile terminal of the present invention is so configured that a flat-type heat pipe, such as flattened heat pipe and sheet-shaped heat pipe, is disposed between a rear surface of a touch panel and a substrate or between the one and a battery pack.

Further, a mobile terminal of the present invention is so configured that a flat-type heat pipe, such as flattened heat pipe and sheet-shaped heat pipe, is disposed between a rear cover and a substrate.

According to the invention of a first aspect, a flat-type heat pipe, such as flattened heat pipe and sheet-shaped heat pipe, is arranged opposite to a rear surface of a touch panel which is a part of a chassis of the mobile terminal. For this reason, a favorable heat diffusion from a heat generating component such as a CPU to a large area on the chassis can be achieved through these heat pipes, thus allowing the heat generating component such as CPU to make best use of its capabilities.

According to the invention of a second aspect, the flat-type heat pipe, such as flattened heat pipe and sheet-shaped heat pipe, is arranged opposite to the rear surface of the rear cover which is a part of the chassis of the mobile terminal. For this reason, a favorable heat diffusion from a heat generating component such as a CPU to a large area on the chassis can be achieved through these heat pipes, thus allowing the heat generating component such as CPU to make best use of its capabilities.

According to the invention of a third and a fifth aspects, by means of a dent formed on a heat dissipation plate, a flattened heat pipe having the heat dissipation plate can be installed even in a thin chassis of the mobile terminal by mounting the flattened heat pipe on the dent. Therefore, the heat dissipation plate allows a heat generating component such as a CPU to make best use of its capabilities since the heat dissipation plate allows favorable heat diffusion into a larger area of the chassis.

According to the invention of a fourth and a sixth aspects, when a thickness of a region where the dent is not formed in the heat dissipation plate is larger than that of the flattened heat pipe, the flattened heat pipe can be mounted so as not to protrude outwardly from any side surface of the heat dissipation plate, thus allowing an easier installation onto the mobile terminal.

According to the invention of a seventh and an eighth aspects, by forming a heat-receiving portion wider than any other parts of the pipe, thermal connections between the heat-receiving portion and a heat generating component such as a CPU are ensured. Also, by the forming a heat dissipation portion wider than any parts of it, the heat is allowed to dissipate into a larger area, allowing the heat generating component such as the CPU to make best use of its capabilities.

According to the invention of a ninth aspect, by the virtue of a touch panel that is configured not to get heated locally, when the increase in temperature of the touch panel has reached a maximum, there can be achieved a good and uniform heat diffusion over the rear surface of the touch panel, allowing a heat generating component such as a CPU to make best use of its capabilities.

According to the invention of a tenth aspect, by the virtue of a touch panel whose rear surface configured not to get heated locally when the increase in temperature of the touch panel has reached a maximum without causing undercooking of the CPU, as a heat generating component, there can be achieved a good and uniform heat diffusion over the rear surface of the touch panel, thereby allowing a heat generating component such as a CPU to make best use of its capabilities without degrading its primary capability of the CPU.

BRIEF DESCRIPTION OF THE DRAWINGS

FIG. 4A is a detailed enlarged view of a section A shown in FIG. 2B.

FIG. 4B is a detailed enlarged view of a section C shown in FIG. 2B.

FIG. 4C is a detailed enlarged view of a section E shown in FIG. 2B.

FIG. 10 is a planar view of a second sheet body of the second embodiment of the invention.

FIG. 23A is a detailed enlarged view of a section A shown in FIG. 20B.

FIG. 23B is a detailed enlarged view of a section B shown in FIG. 21A.

FIG. 24 is a detailed enlarged view of a section C shown in FIG. 20B and FIG. 21A.

FIG. 40A is a cross-sectional view taken on a line D-D shown in FIG. 11A.

FIG. 40B is a cross-sectional view taken on a line E-E shown in FIG. 11B FIG. 41 is a cross-sectional view of a modified embodiment of the sheet-shaped heat pipe of the second embodiment.

FIG. 68A is a rear view of the mobile terminal without a rear cover but with a dissipation plate that has the flattened heat pipe disposed between the rear cover of a chassis and a motherboard.

FIG. 68B is a vertical cross-sectional view of the mobile-terminal with the rear cover and with the heat dissipation plate that has the flattened heat pipe disposed between the rear cover of the chassis and the motherboard.

FIG. 69A through FIG. 69C are explanatory diagrams for comparing temperature increases of the mobile terminal with one another depending on differences in cooling structures.

DETAILED DESCRIPTION OF THE INVENTION

Preferred embodiments of the present invention are described hereunder. Particularly, a mobile terminal with a sheet-shaped heat pipe is described in the first through the fourth embodiments. A mobile terminal with flattened heat pipe is described in the fifth embodiment. Here, identical parts are denoted by identical symbols, and descriptions of identical structures, functions and effects are omitted as much as possible to avoid repetition.

First Embodiment

Figure 1A:
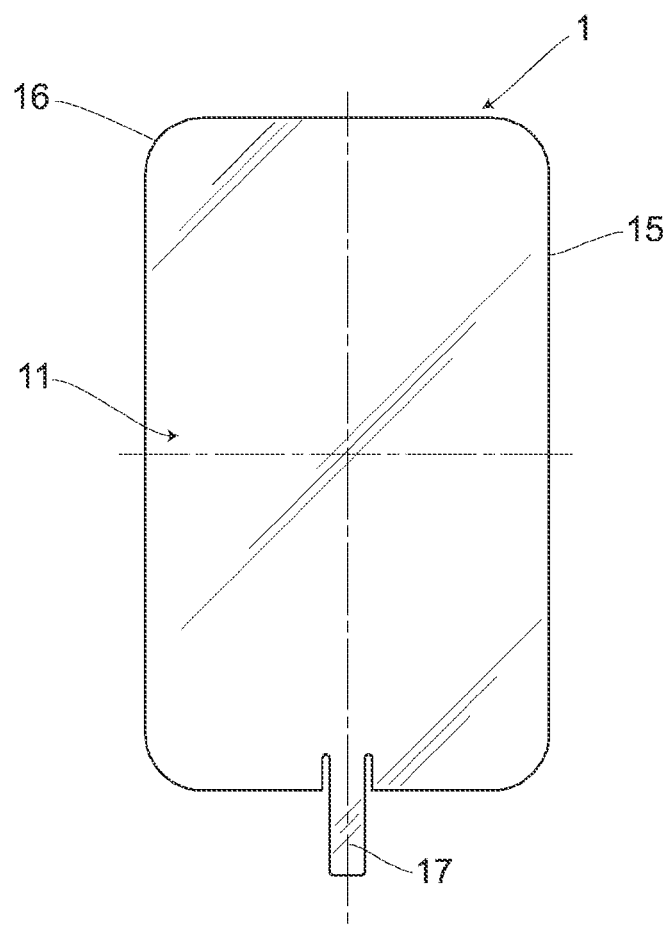
FIG. 1A is a planar view of a completed sheet-shaped heat pipe of a first embodiment of the invention.

FIG. 1A to FIG. 7 show a sheet-shaped heat pipe 1 of a first embodiment of the present invention. As illustrated in each of the figures, the sheet-shaped heat pipe 1 is composed of a container 15 obtained by diffusion-joining a first sheet body 11 and a second sheet body 12 that are two copper foil sheets. As such sheet bodies 11 and 12, there may also be employed a sheet of another metal e.g. aluminum that has a favorable thermal conductivity and is capable of being etched. As shown in FIG. 1A, the sheet-shaped heat pipe 1 of a completed state is formed into the shape of a substantially rectangular plate, and has an outer shape matched to a chassis inner shape of a later-described mobile terminal 51 (see FIG. 31) such as a smartphone. Further, formed on four corners of the sheet-shaped heat pipe 1 of the completed state are chamfered portions 16 having round shapes. Furthermore, a tube-shaped sealing portion 17 for welding is formed on the container 15 for the purpose of vacuum-encapsulating an operating fluid (not shown) such as pure water in the container 15. Here, a thickness t1 of the container 15 sealed by the sealing portion 17, i.e. a thickness of the sheet-shaped heat pipe 1 is 0.4 mm.

FIGS. 2A and 2B and FIGS. 3A and 3B show the first sheet body 11 and the second sheet body 12, respectively. A thickness t2 of each of the sheet bodies 11 and 12 is 0.2 mm.

Figures 2A, 2B:
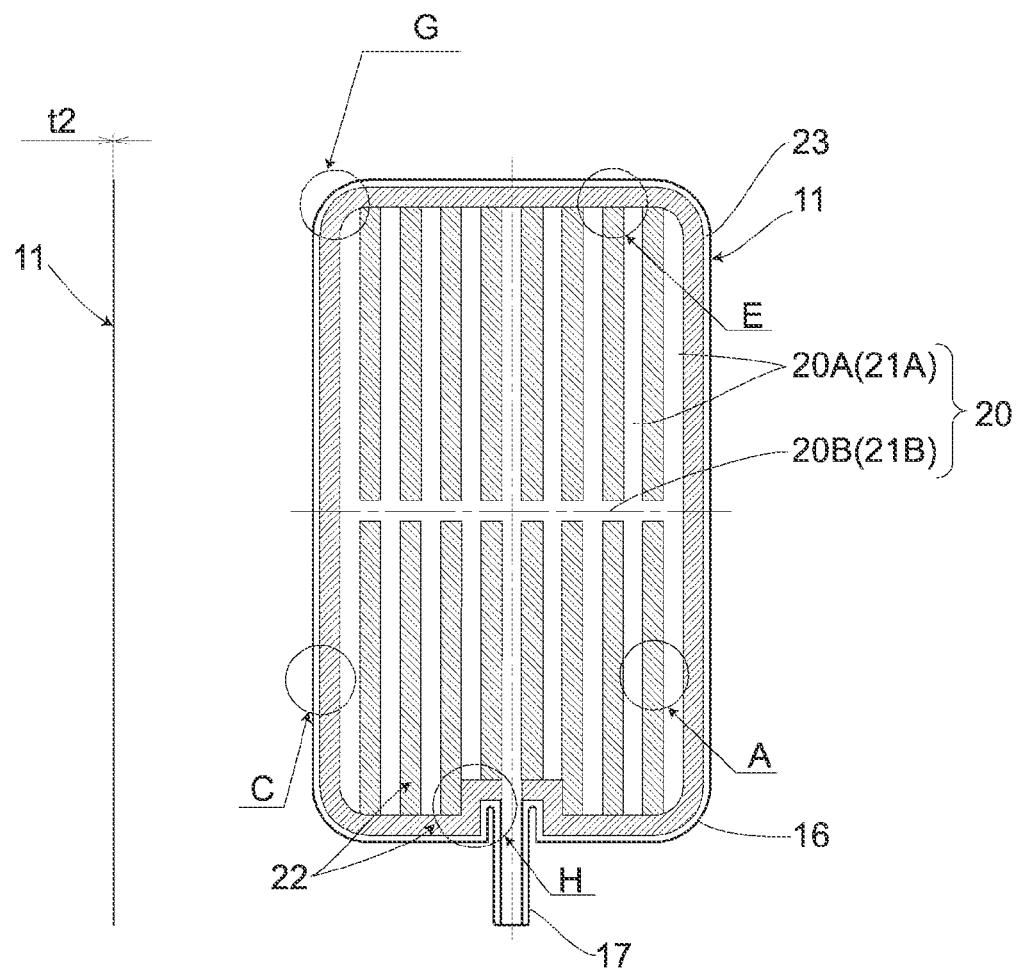
FIG. 2A is a side view of a first sheet body of the first embodiment of the invention.
FIG. 2B is a planar view of the first sheet body of the first embodiment of the invention.
Figures 3A, 3B:
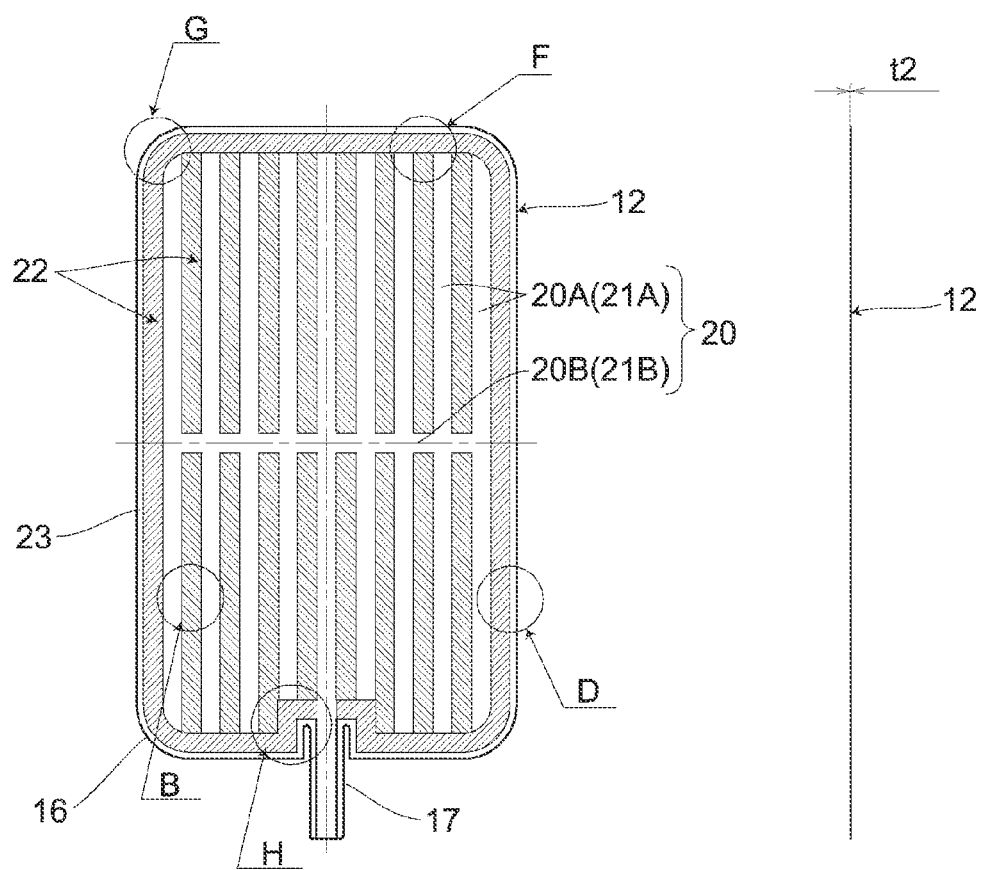
FIG. 3A is a planar view of a second sheet body of the first embodiment of the invention.
FIG. 3B is a side view of the second sheet body of the first embodiment of the invention.

Exclusively provided on one side surface of each of the sheet bodies 11 and 12 that eventually serves as the inner surface of the container 15, are a vapor passage 20 and wicks 22 which are formed through half-etching, i.e. etching is performed midway through the thickness of each of the sheet bodies 11 and 12. Particularly, the vapor passage 20 serves to transport to a heat dissipation portion a vapor generated from the operating fluid at a heat-receiving portion, and the wicks 22 serve to reflux to the heat-receiving portion the operating fluid condensed at the heat dissipation portion. Other than the vapor passage 20 and the wicks 22, further provided on the one side surface of each of the sheet bodies 11 and 12 is an unetched side wall 23 formed along an outer circumference of each of the sheet bodies 11 and 12. In fact, the side walls 23 of the sheet bodies 11 and 12 are formed in locations where the side walls 23 are allowed to lie on top of each other when the one side surfaces of the sheet bodies 11 and 12 face each other. Eventually, the side walls 23 become a part of the outer circumferential portion of the container 15 through diffusion joining. In FIG. 2B and FIG. 3A, the wicks 22 are shown as the shaded areas.

When forming the vapor passages 20 and the wicks 22 on the sheet bodies 11 and 12 through photo-etching, it is required that each of the sheet bodies 11 and 12 has a thickness t2 of not smaller than 0.05 mm. It is difficult to install the sheet-shaped heat pipe 1 in the mobile terminal 51 having a unique shape, when the thickness t2 of each of the sheet bodies 11 and 12 is larger than 0.3 mm, i.e. the thickness t1 of the container 15 (eventually the sheet-shaped heat pipe 1) is larger than 0.5 mm. Therefore, as a result of etching the surfaces of the sheet bodies 11 and 12 having a thickness of 0.05 mm to 0.3 mm, and thus limiting the thickness t1 of the completed sheet-shaped heat pipe 1 to a thickness of not larger than 0.5 mm, not only the fine vapor passages 20 and wicks 22 with a sufficient heat transport capability can be formed on the inner surface of the container 15; but the sheet-shaped heat pipe 1 can be effortlessly installed in a thin chassis such as that of the mobile terminal 51.

Inside the sealed container 15, each vapor passage 20 of the first embodiment is composed of concave first passage sections 21A and a concave second passage section 21B. Particularly, a plurality of the first passage sections 21A are arranged along the longitudinal direction of the sheet-shaped heat pipe 1; and the second passage section 21B intersects and is communicated with each of the first passage sections 21A. Although the first passage sections 21A and the second passage section 21B are linear; and the first passage sections 21A and the second passage section 21B are orthogonal to one another in the central region of the sheet-shaped heat pipe 1, they may be formed into any shape and communicated with one another in any location. In the present embodiment, when laying the sheet bodies 11 and 12 on top of each other with the one side surfaces thereof facing each other, hollow tube-shaped first vapor paths 20A are formed as a result of allowing the first passage sections 21A of the sheet bodies 11 and 12 to face one another; and a hollow tube-shaped second vapor path 20B is formed as a result of allowing the second passage sections 21B to face each other. At that time, established inside the container 15 is the completed vapor passage 20 composed of the first vapor paths 20A and the second vapor path 20B. That is, the plurality of the first vapor paths 20A formed along the longitudinal direction of the sheet-shaped heat pipe 1, are now communicated with the single second vapor path 20B formed along the horizontal direction of the heat pipe 1. In addition, inside the container 15, the wicks 22 are now formed in locations other than where the vapor passage 20 and the side wall 23 are provided.

Figure 5A:
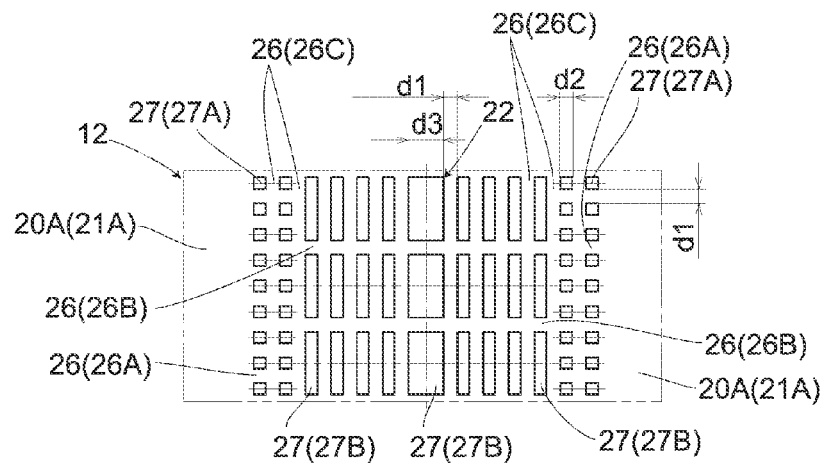
FIG. 5A is a detailed enlarged view of a section B shown in FIG. 3A.
Figure 5B:
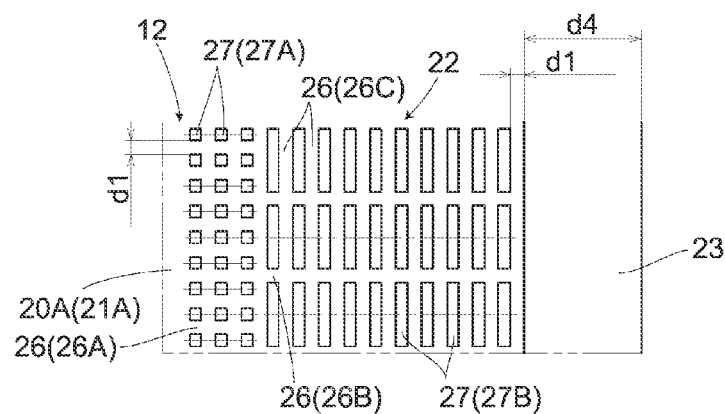
FIG. 5B is a detailed enlarged view of a section D shown in FIG. 3A.
Figure 5C:
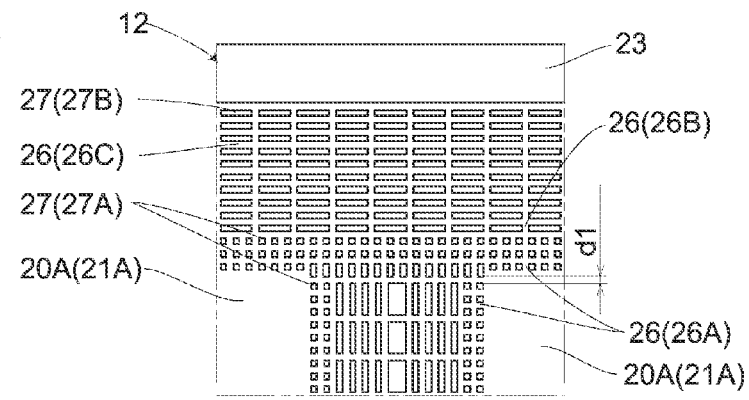
FIG. 5C is a detailed enlarged view of a section F shown in FIG. 3A.

FIG. 4A, FIG. 4B and FIG. 4C are enlarged views showing sections A, C and E of the first sheet body 11 of FIG. 2B. Further, FIG. 5A, FIG. 5B and FIG. 5C are enlarged views showing sections B, D and F, respectively, of the second sheet body 12 of FIG. 3A. As shown in each of these views, the wicks 22 are composed of concave grooves 26 obtained through etching; and unetched walls 27. That is, in the regions of the wicks 22, a plurality of the grooves 26 serving as passages of the operating fluid are formed into desired shapes by the walls 27.

The grooves 26 are composed of first grooves 26A, second grooves 26B and third grooves 26C. Specifically, a plurality of the first grooves 26A are located along bilateral regions and end regions of the vapor passage 20, and are arranged at a given interval in a manner such that the first grooves 26A are formed orthogonal to the direction of the vapor passage 20. Further, the second grooves 26B of the number smaller than that of the first grooves 26A are formed more distant from the vapor passage 20 than the first grooves 26A, and are arranged at an interval larger than that of the first grooves 26A. Furthermore, the third grooves 26C serve to communicate these first grooves 26A and second grooves 26B with one another along the direction of the vapor passage 20. The depth of the grooves 26 is 0.1 mm to 0.13 mm. As for a width d1 of the grooves 26, each of the first grooves 26A, the second grooves 26B and the third grooves 26C has a width of 0.12 mm. Here, the capillarity of the wicks 22 can be improved when the width d1 of the grooves 26 is in a range of 0.05 mm to 0.3 mm. In addition, the number of the first grooves 26A provided is larger than that of the second grooves 26B, and the first grooves 26A finer than the second grooves 26B are located at the bilateral regions of and directly communicated with the vapor passage 20.

Meanwhile, the walls 27 formed among the grooves 26 are composed of at least a plurality of first walls 27A and a plurality of second walls 27B. Particularly, the first walls 27A has a width d2 that is as large as 0.1 mm and established along a direction orthogonal to the vapor passage 20, for the purpose of establishing the first grooves 26A at an interval smaller than that of the second grooves 26B. Further, the second walls 27B are provided to establish the second grooves 26B, and the shapes of the second walls 27B are different from those of the first walls 27A. As for several second walls 27B, a width d3 thereof along the direction orthogonal to the vapor passage 20 is formed to 0.3 mm which is larger than the width d2 of each first wall 27A. In the present embodiment the plurality of the first walls 27A and the plurality of the second walls 27B are aligned together in a direction orthogonal to the direction of the vapor passage 20, and the side wall 23 is formed outside the wicks 22, thereby allowing the plurality of the third grooves 26C to be established thereamong at a given interval. Preferably, when the width d2 of each first wall 27A is smaller than 0.25 mm and the width d3 of each second wall 27B is not smaller than 0.25 mm, diffusion joining can be performed at where the wicks 22 are formed, with the second walls 27B of the sheet bodies 11 and 12 being laid on top of one another.

A width d4 of the side wall 23 is formed to 1 mm on the entire circumference of each of the sheet bodies 11 and 12. Preferably, the width d4 of the side wall 23 of each of the sheet bodies 11 and 12 that eventually becomes the outer circumferential portion of the container 15 is formed to at least not smaller than 0.3 mm. In this way, the sheet bodies 11 and 12 can be favorably diffusion-joined to each other at where the side walls 23 are formed, thus obtaining the sheet-shaped heat pipe 1 with a high reliability in sealing the container 15.

Figure 6:
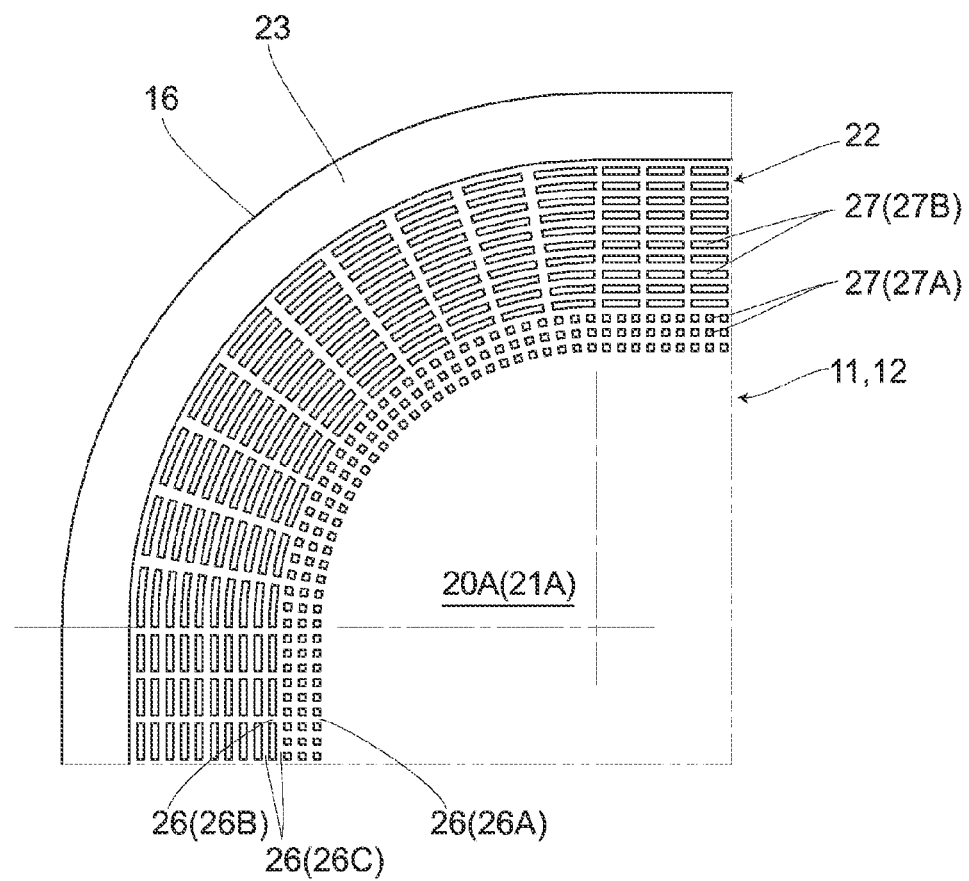
FIG. 6 is a detailed enlarged view of a section G shown in FIG. 2B and FIG. 3A.
Figure 7:
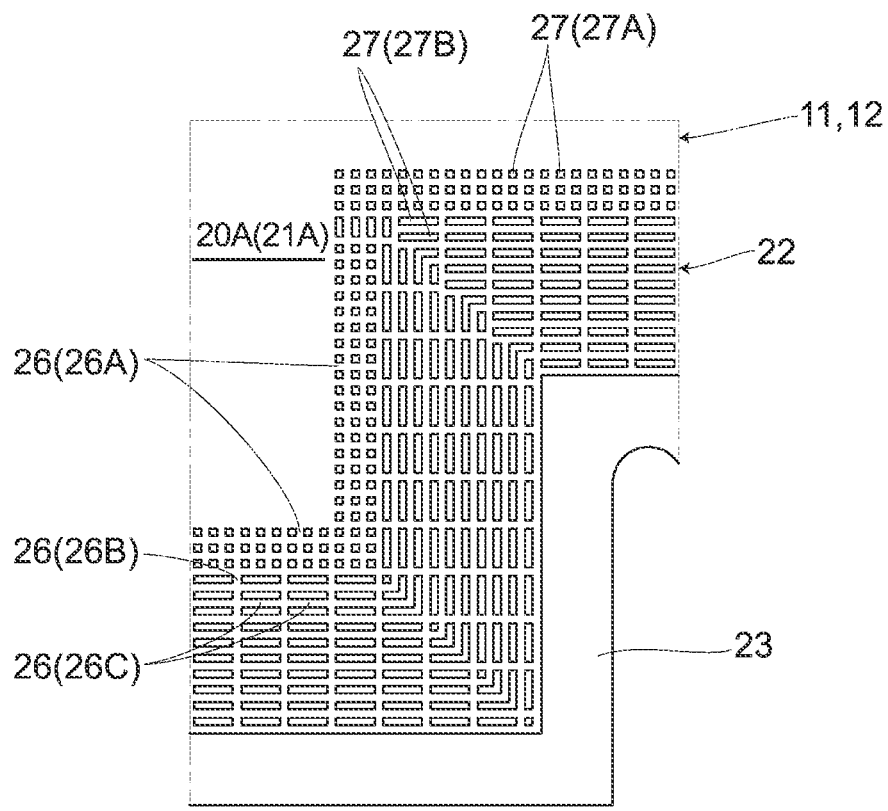
FIG. 7 is a detailed enlarged view of a section H shown in FIG. 2B and FIG. 3A.

FIG. 6 is an enlarged view showing a section G of each of the sheet bodies 11 and 12 of FIG. 2B and FIG. 3A. Further, FIG. 7 is an enlarged view showing a section H of each of the sheet bodies 11 and 12 of FIG. 2B and FIG. 3A. As shown in each of these views, the structure of the wicks 22 is likewise provided between the vapor passage 20 and the side wall 23 in the vicinity of the chamfered portions 16 and the sealing portion 17. Here, the width d1 of the grooves 26 is also formed to 0.12 mm.

Second Embodiment

Figures 8A, 8B:
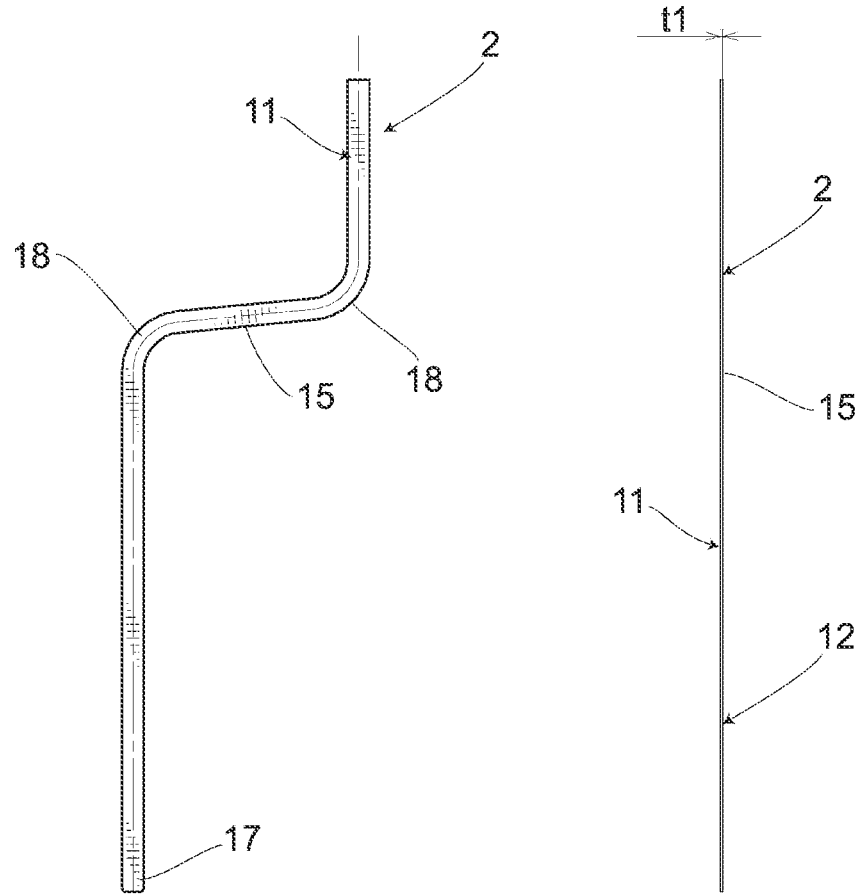
FIG. 8A is a planar view of a completed sheet-shaped heat pipe of a second embodiment of the invention.
FIG. 8B is a side view of the completed sheet-shaped heat pipe of the second embodiment of the invention.

FIG. 8A to FIG. 12 show a sheet-shaped heat pipe 2 of a second embodiment of the present invention. As shown in each of these figures, the sheet-shaped heat pipe 2 of this embodiment, as is the case far the first embodiment, is composed of the container 15 obtained by diffusion-joining together the two copper foil sheets which are the first sheet body 11 and the second sheet body 12. However, as shown in FIG. 8A and FIG. 8B, the sheet-shaped heat pipe 2 is formed into the shape of a thin and elongated planar stick as compared to the sheet-shaped heat pipe 1 of the first embodiment. Further, in consideration of the chassis inner structure of the mobile terminal 51, two bended portions 18 are formed on the sheet-shaped heat pipe 2 if necessary. In fact, no limitation is imposed on the number of the bended portions 18 as well as the angles at which they are bended. Particularly, the sheet-shaped heat pipe 2 may also be formed into a linear shape with no bended portion 18 being provided thereon. Moreover, the tube-shaped sealing portion 17 is formed at one end of the container 15 so that an operating fluid such as pure water can be vacuum-encapsulated inside the container 15. A thickness t1 of the container 15 sealed by the sealing portion 17, i.e. a thickness of the sheet-shaped heat pipe 2 is 0.4 mm.

FIG. 9A to FIG. 10B show the first sheet body 11 and the second sheet body 12, respectively. A thickness t2 of each of the sheet bodies 11 and 12 is 0.2 mm, and exclusively formed on a one side surface of each of the sheet bodies 11 and 12 through half-etching are the vapor passage 20, the wicks 22 and the side wall 23. In the present embodiment, the wicks 22 are provided on both sides of the vapor passage 20 that is unidirectionally extended along the outer shape of the sheet-shaped heat pipe 2, and the side wall 23 is formed outside the wicks 22. Specifically, the side walls 23 are provided in locations where the side walls 23 can be laid on top of each other when the one side surfaces of the sheet bodies 11 and 12 face each other. More specifically, the side walls 23 eventually form the outer circumferential portion of the container 15 through diffusion joining. Here, in FIG. 9B and FIG. 10A, the wicks 22 are shown as the shaded areas.

When forming the vapor passages 20 and the wicks 22 on the sheet bodies 11 and 12 through photo-etching, etching is performed on the surfaces of the sheet bodies 11 and 12 each having the thickness t2 of 0.05 mm to 0.3 mm, and the thickness t1 of the completed sheet-shaped heat pipe 2 is set to be not larger than 0.5 mm. Thus, there can be formed on the inner surface of the container 15 the fine vapor passage 20 and wicks 22 with a sufficient heat transport capability. In addition, the sheet-shaped heat pipe 2 can be effortlessly installed in a thin chassis such as that of the mobile terminal 51.

The vapor passage 20 of the second embodiment is composed of a concave passage section 21. This concave passage section 21 is established inside the sealed container 15 and is formed along the longitudinal direction of the sheet-shaped heat pipe 2. Particularly, the passage sections 21 of the sheet bodies 11 and 12 face each other to form a single hollow and tube-shaped vapor passage 20, as a result of laying the sheet bodies 11 and 12 on top of each other with the one side surfaces thereof facing each other. Here, the wicks 22 are formed at locations inside the container 15 where the vapor passage 20 and the side wall 23 are not provided.

Figures 9A, 9B:
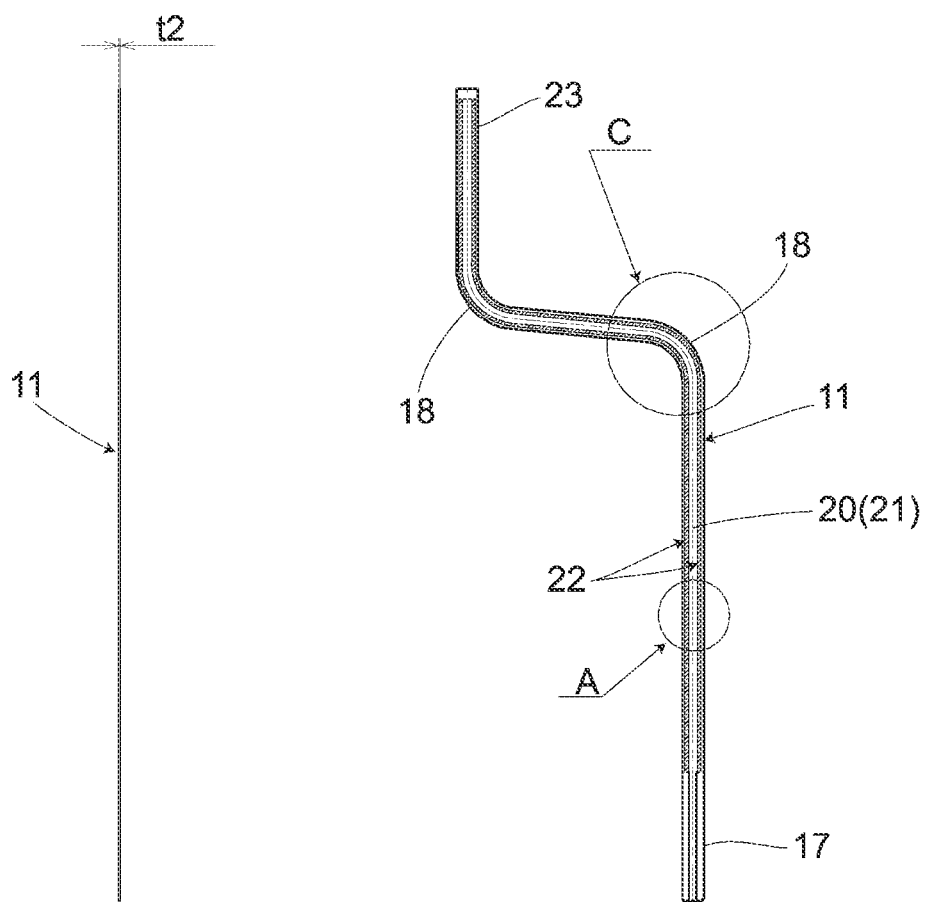
FIG. 9A is a side view of a first sheet body of the second embodiment of the invention.
FIG. 9B is a planar view of the first sheet body of the second embodiment of the invention.
Figures 10A, 10B:
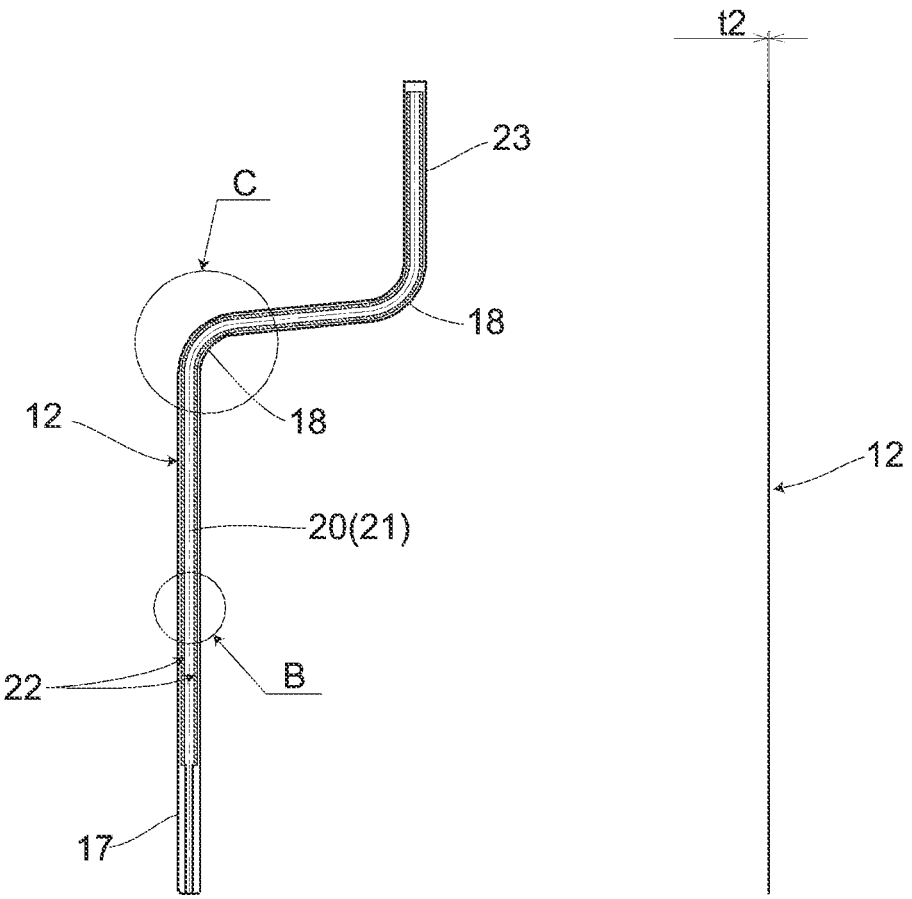
FIG. 10B is a side view of the second sheet body of the second embodiment of the invention.
Figures 11A, 11B:
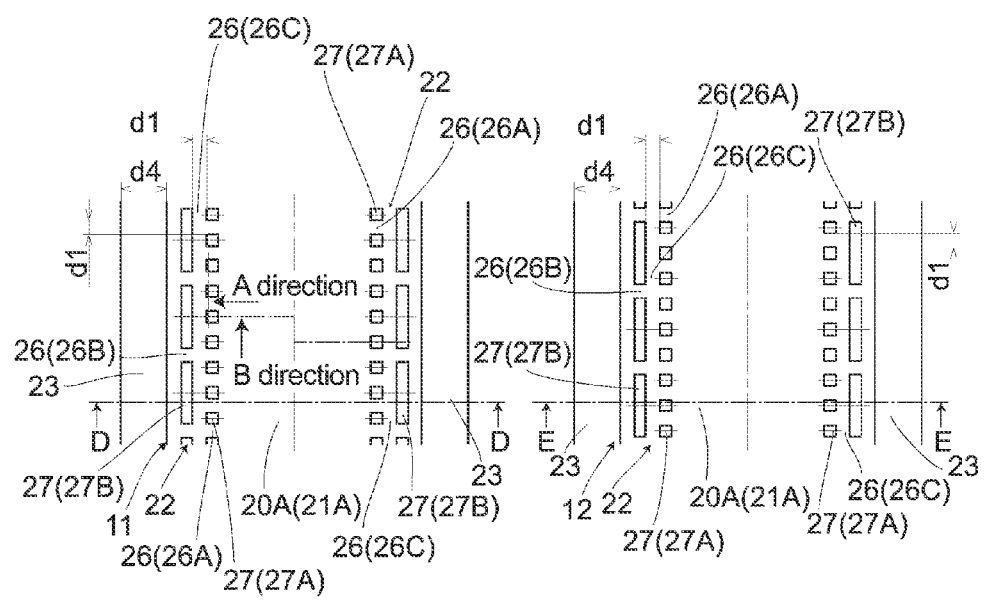
FIG. 11A is a detailed enlarged view of a section A shown in FIG. 9B.
FIG. 11B is a detailed enlarged view of a section B shown in FIG. 10A.

FIG. 11A is an enlarged view showing a section A of the first sheet body 11 of FIG. 9B; and FIG. 11B is an enlarged view showing a section B of the second sheet body 12 of FIG. 10A. Here, the wicks 22 are also composed of the concave grooves 26 formed through etching; and the unetched walls 27. Further, the plurality of the grooves 26 as passages of an operating fluid are established in the regions of the wicks 22, and are formed into desired shapes by the walls 27.

The grooves 26 are located along the bilateral regions and end regions of the vapor passage 20. As is the case with the first embodiment, the grooves 26 are composed of the first grooves 26A, the second grooves 26B and the third grooves 26C. The depth of the grooves 26 is 0.1 mm to 0.13 mm. As for a width d1 of the grooves 26, each of the first grooves 26A, the second grooves 26B and the third grooves 26C has a width of 0.12 mm. The number of the first grooves 26A provided is larger than the number of the second grooves 26B provided; and the first grooves 26A finer than the second grooves 26B are arranged on the bilateral regions of and directly communicated with the vapor passage 20.

A width d4 of the side wall 23 is formed to 0.4 mm on the entire circumference of each of the sheet bodies 11 and 12. That is, the sheet bodies 11 and 12 can be favorably diffusion-joined to each other at where the said walls 23 are formed, thus obtaining the sheet-shaped heat pipe 2 with a high reliability in sealing the container 15.

Figure 12:
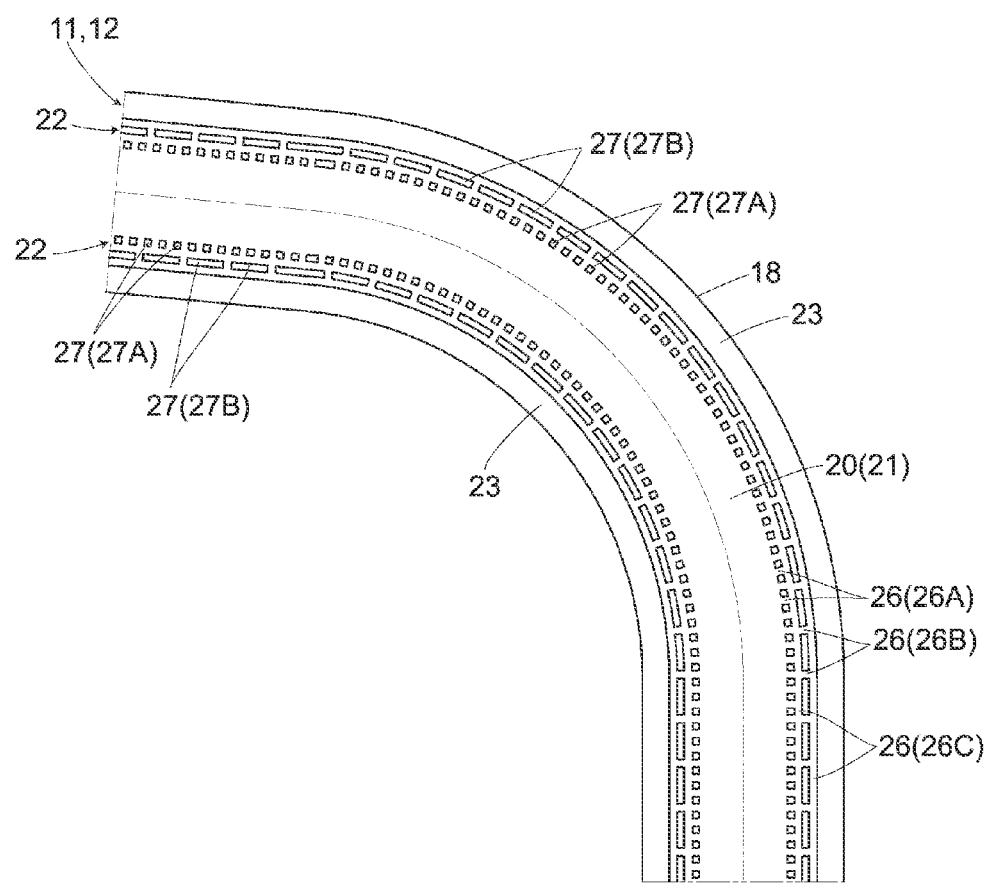
FIG. 12 is a detailed enlarged view of a section C shown in FIG. 9B and FIG. 10A.
Figures 13A, 13B:
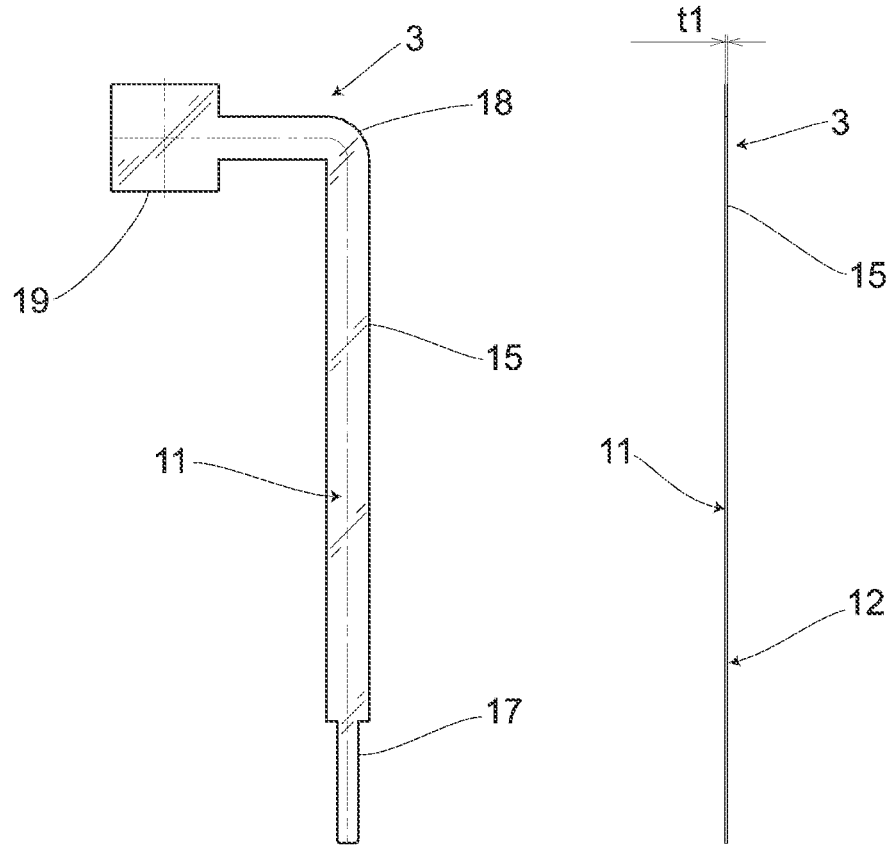
FIG. 13A is a planar view of a completed sheet-shaped heat pipe of a third embodiment of the invention.
FIG. 13B is a side view of the completed sheet-shaped heat pipe of the third embodiment of the invention.

FIG. 12 is an enlarged view showing a section C of the sheet bodies 11 and 12 of FIG. 9B and FIG. 10A. As shown in FIG. 12, the aforementioned structure of the wicks 22 is likewise established between the vapor passage 20 and the side wall 23 even in the bended portions 18 of the sheet-shaped heat pipe 2. Here, the width d1 of the grooves 26 is also formed to 0.12 mm.

Third Embodiment

FIG. 13A to FIG. 18 show a sheet-shaped heat pipe 3 of a third embodiment of the present invention. As shown in each of these figures, the sheet-shaped heat pipe 3 of this embodiment is, as is the case with the second embodiment, composed of the container 15 obtained by diffusion-joining together the two copper foil sheets which are the first sheet body 11 and the second sheet body 12. Further, the sheet-shaped heat pipe 3 is formed into the shape of a thin and elongated planar stick as compared to the sheet-shaped heat pipe 1 of the first embodiment. Furthermore, in order to optimize a heat receiving capability with respect to a heat source such as a CPU, a heat-receiving portion 19 matched to the outer shape of such CPU is formed on one end of the sheet-shaped heat pipe 3. This heat-receiving portion 19 is formed wider than any other portions of the sheet-shaped heat pipe 3 in the planar view. Moreover, only one bended portion 18 is formed midway through the container 15 such that the sheet-shaped heat pipe 3 is substantially formed into the shape of "L" in the planar view. No limitation is imposed on the number of the bended portions 18 as well as the angles at which they are bended. In fact, the sheet-shaped heat pipe 3 may be formed into a linear shape with no bended portion 18 being provided thereon. Similarly no limitation is imposed on the number of the heat-receiving portions 19 and the shapes thereof. The tube-shaped sealing portion 17 is formed at one end of the container 15 so that an operating fluid such as pure water can be vacuum-encapsulated inside the container 15. A thickness t1 of the container 15 sealed by the sealing portion 17, i.e. a thickness of the sheet-shaped heat pipe 3 is 0.4 mm.

FIG. 14A to FIG. 15B show the first sheet body 11 and the second sheet body 12, respectively. A thickness t2 of each of the sheet bodies 11 and 12 is 0.2 mm, and exclusively formed on one side surface of each of the sheet bodies 11 and 12 through half-etching are the vapor passage 20, the wicks 22 and the side wall 23. In the present embodiment, the wicks 22 are provided on both sides of the vapor passage 20 that is unidirectionally extended along the outer shape of the sheet-shaped heat pipe 3, and the side wall 23 is arranged outside the wicks 22. Specifically the side walls 23 are formed in locations where the side walls 23 are allowed to lie on top of each other when the one side surfaces of the sheet bodies 11 and 12 face each other. More specifically, the side walls 23 eventually form the outer circumferential portion of the container 15 through diffusion joining. Here, in FIG. 14B and FIG. 15A, the wicks 22 are shown as the shaded areas.

When forming the vapor passage 20 and the wicks 22 on the sheet bodies 11 and 12 through photo-etching, etching is performed on the surfaces of the sheet bodies 11 and 12 each having a thickness t2 of 0.05 mm to 0.3 mm, and the thickness t1 of the completed sheet-shaped heat pipe 3 is set to be not larger than 0.5 mm. Thus, there can be formed on the inner surface of the container 15 the fine vapor passage 20 and wicks 22 with a sufficient heat transport capability, and the sheet-shaped heat pipe 3 can be effortlessly installed in a thin chassis such as that of the mobile terminal 51.

The vapor passage 20 of the third embodiment is composed of the concave first passage sections 21A, a single concave second passage section 21B and a single concave third passage section 21C. Particularly, a plurality of the first passage sections 2A are aligned along a single direction of the wide heat-receiving portion 19 inside the sealed container 15. Further, the second passage section 21B cuts across each of the first passage sections 2A in the heat-receiving portion 19, and is communicated with these first passage sections 21A. Furthermore, the third passage section 21C is formed on a linear region between the heat-receiving portion 19 and the sealing portion 17, and is communicated with the second passage section 21B. Although both the first passage sections 21A and the second passage section 21B are formed into linear shapes; and the first passage sections 21A and the second passage section 21B are orthogonal to one another at an end region of the heat-receiving portion 19, the first passage sections 21A and the second passage section 21B may have any shapes and be communicated with one another in any locations. In the present embodiment, as a result of laying the sheet bodies 11 and 12 on top of each other with the one side surfaces thereof facing each other, the first passage sections 21A of the sheet bodies 11 and 12 face one another such that the hollow tube-shaped first vapor paths 20A can be formed; the second passage sections 21B of the sheet bodies 11 and 12 face each other such that the hollow tube-shaped second vapor path 20B can be formed; and the third passage sections 21C of the sheet bodies 11 and 12 face each other such that a hollow tube-shaped third vapor passage 20C can be formed. At that time, formed inside the container 15 is the vapor passage 20 composed of the first vapor paths 20A, the second vapor path 20B and the third vapor passage 20C that are communicated with one another. Further, inside the container 15, the wicks 22 are now formed in locations other than where the vapor passage 20 and the side wall 23 are provided.

Figures 14A, 14B:
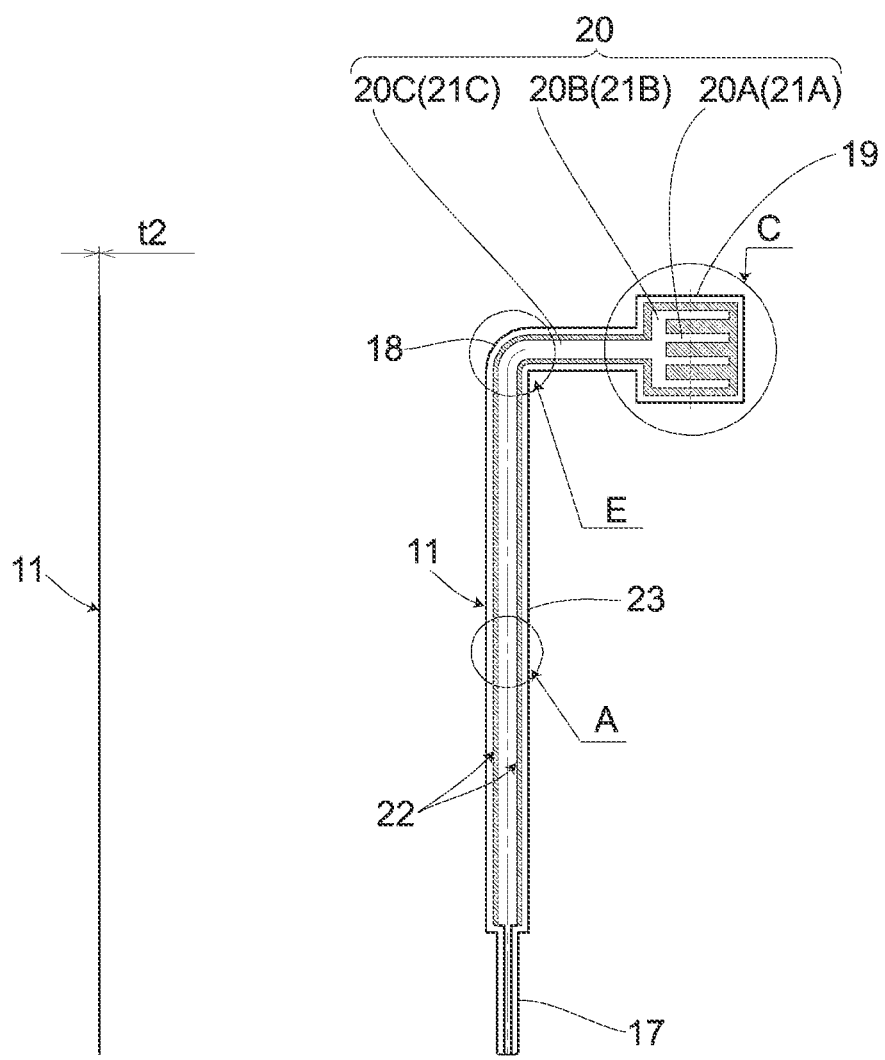
FIG. 14A is a side view of a first sheet body of the third embodiment of the invention.
FIG. 14B is a planar view of the first sheet body of the third embodiment of the invention.
Figures 15A, 15B:
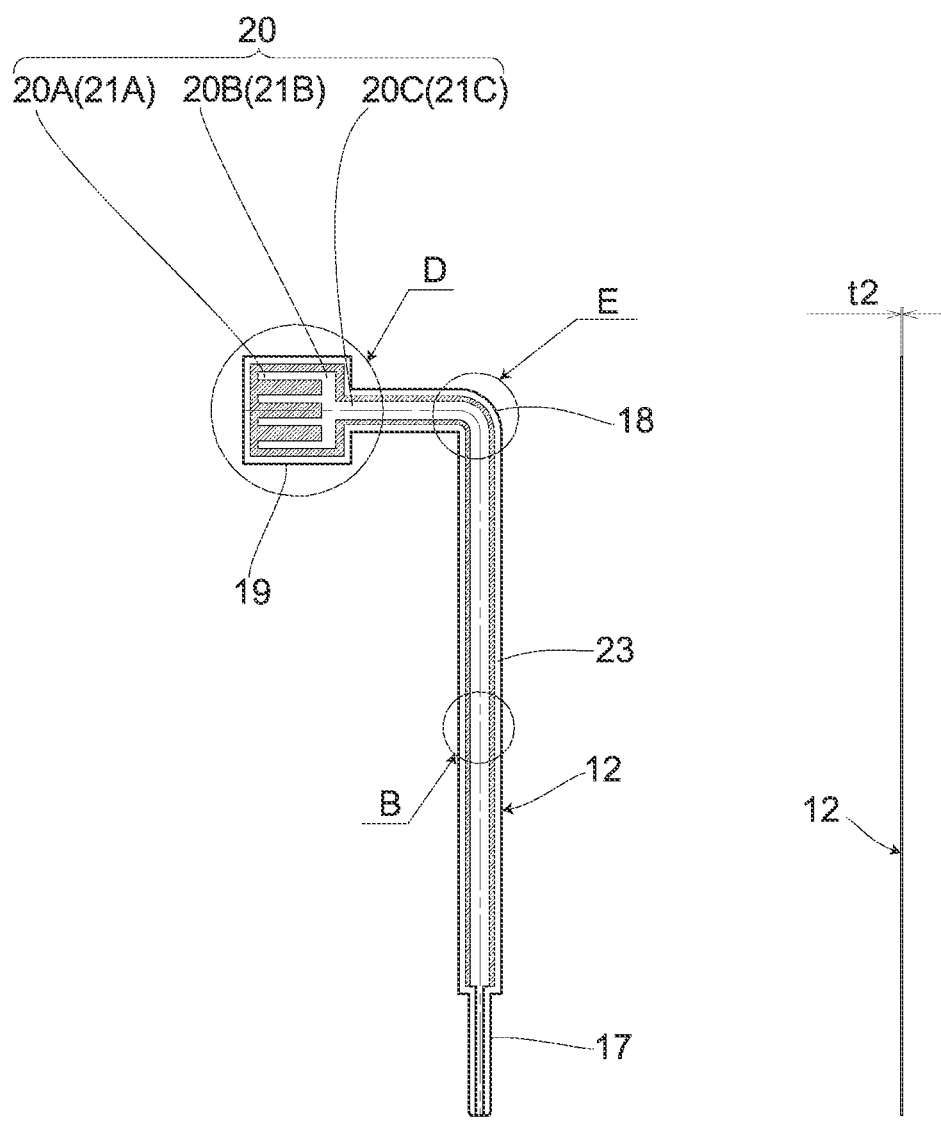
FIG. 15A is a planar view of a second sheet body of the third embodiment of the invention.
FIG. 15B is a side view of the second sheet body of the third embodiment of the invention.
Figure 16A:
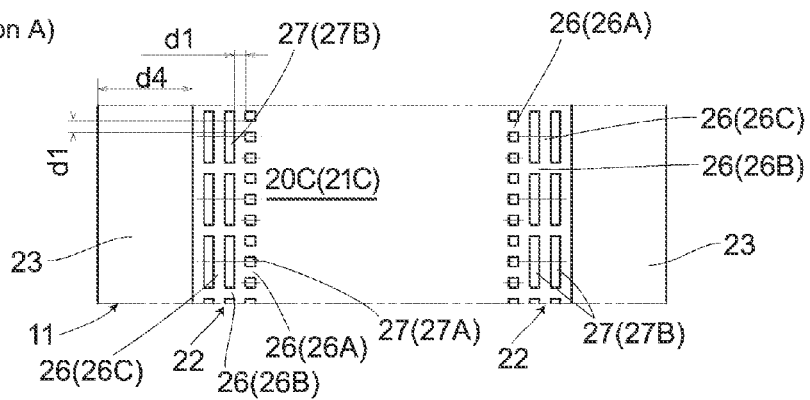
FIG. 16A is a detailed enlarged view of a section A shown in FIG. 14B.
Figure 16B:
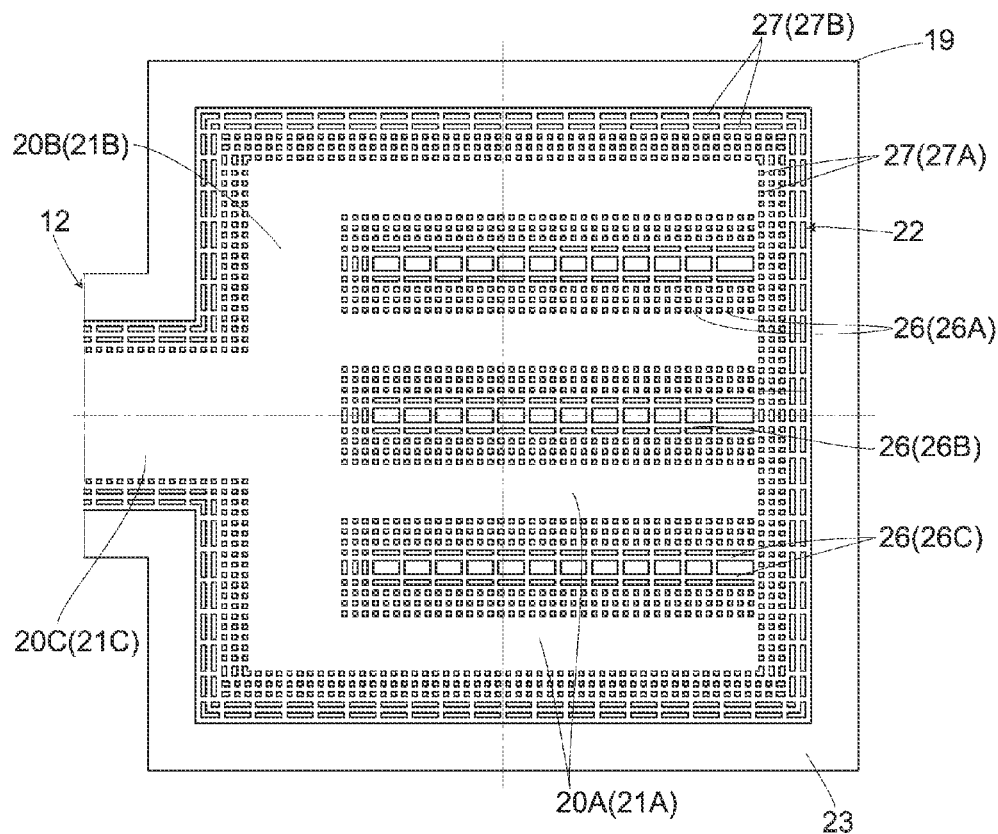
FIG. 16B is a detailed enlarged view of a section C shown in FIG. 14B.
Figure 17A:
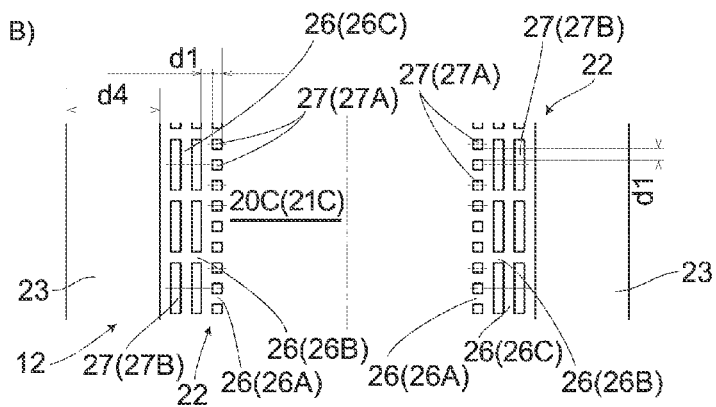
FIG. 17A is a detailed enlarged view of a section B shown in FIG. 15A.
Figure 17B:
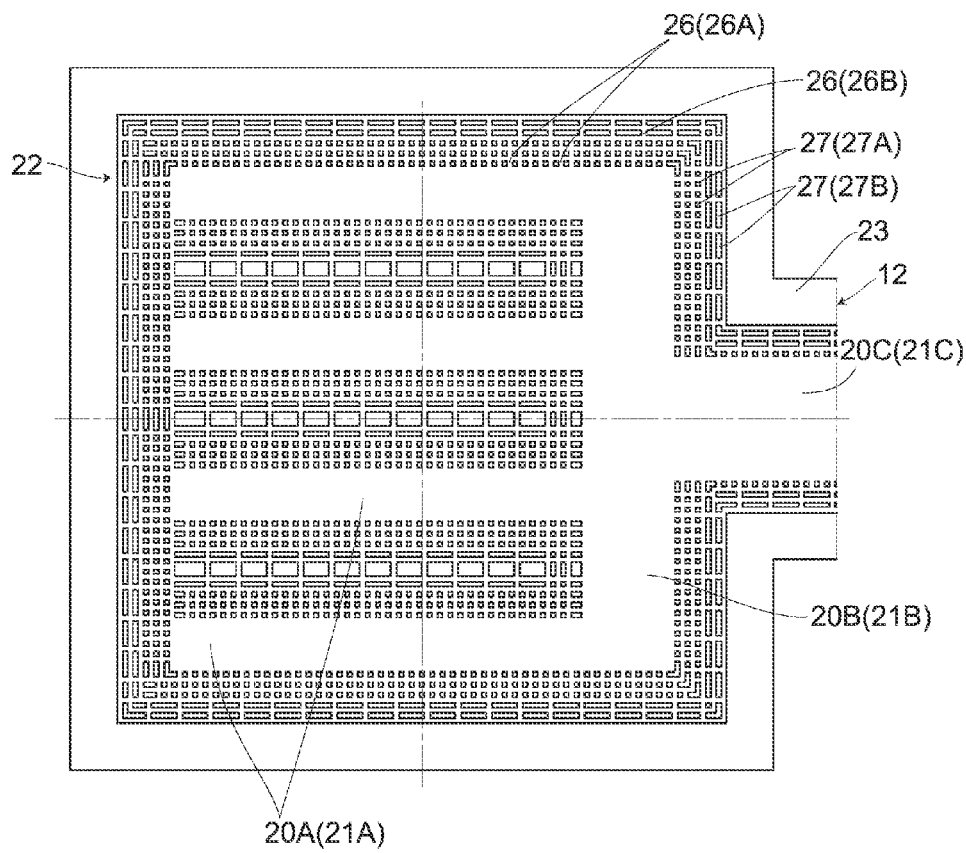
FIG. 17B is a detailed enlarged view of a section D shown in FIG. 15A.

FIG. 16A is an enlarged view showing a section A of the first sheet body 11 of the FIG. 14B; and FIG. 16B is an enlarged view showing a section C of the first sheet body 11 of the FIG. 14B. Further, FIG. 17A is an enlarged view showing a section B of the second sheet body 12 of FIG. 15A; and FIG. 17B is an enlarged view showing a section D of the second sheet body 12 of FIG. 15A. As shown in these views, the wicks 22 are composed of the concave grooves 26 obtained through etching; and the unetched walls 27. That is, in the regions of the wicks 22, the plurality of the grooves 26 serving as passages of an operating fluid are formed into desired shapes by the walls 27.

The grooves 26 are located along the bilateral regions and end regions of the vapor passage 20; and are composed of the first grooves 26A, the second grooves 26B and the third grooves 26C as is the case with the first embodiment. The depth of the grooves 26 is 0.1 mm to 0.13 mm. As for a width d1 of the grooves 26, each of the first grooves 26A, the second grooves 26B and the third grooves 26C has a width of 0.12 mm. The number of the first grooves 26A provided is larger than that of the second grooves 26B, and the first grooves 26A finer than the second grooves 26B are located on the bilateral regions of and directly communicated with the vapor passage 20.

A width d4 of the side wall 23 is formed to 1 mm on the entire circumference of each of the sheet bodies 11 and 12. In this way, the sheet bodies 11 and 12 can be favorably diffusion-joined to each other at where the side walls 23 are formed, thus obtaining the sheet-shaped heat pipe 3 with a high reliability in sealing the container 15.

Figure 18:
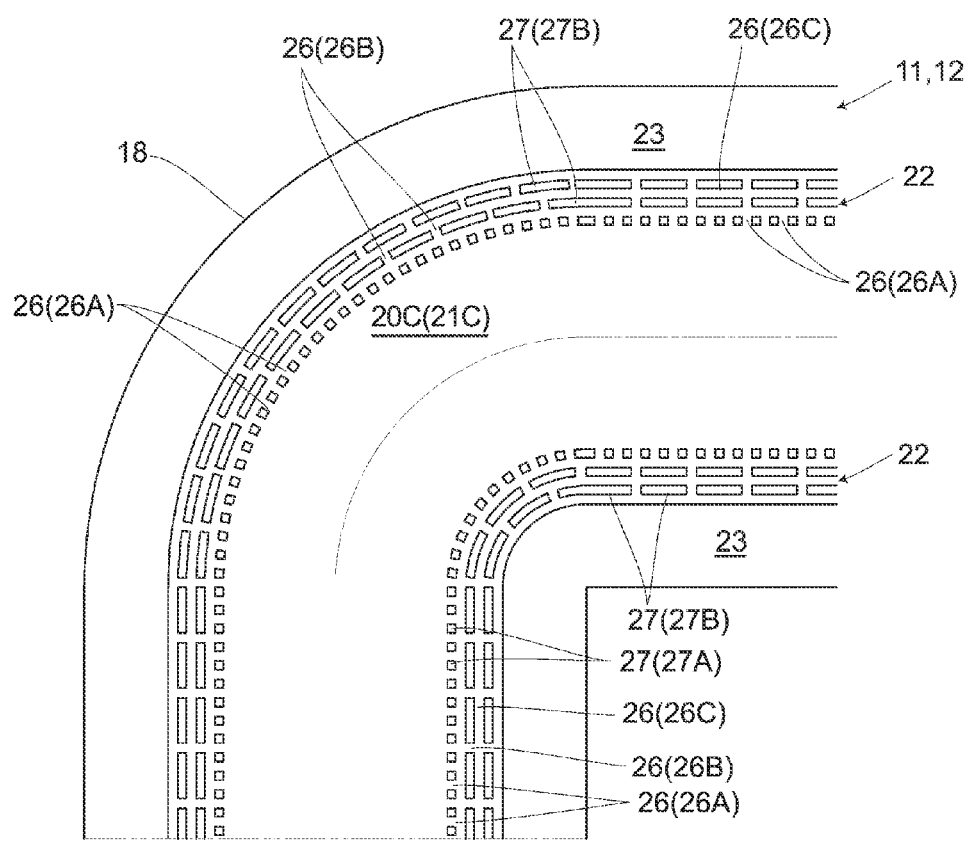
FIG. 18 is a detailed enlarged view of a section E shown in FIG. 14B and FIG. 15A.

FIG. 18 is an enlarged view showing a section E of each of the sheet bodies 11 and 12 of FIG. 14B and FIG. 15A. As shown in FIG. 18, the aforementioned structure of the wicks 22 is likewise established between the vapor passage 20 and the side wall 23 even in the bended portions 18 of the sheet-shaped heat pipe 3. Here, the width d1 of the grooves 26 is formed to 0.12 mm.

Fourth Embodiment

FIG. 19A to FIG. 26 show a sheet-shaped heat pipe 4 of a fourth embodiment of the present invention. As shown in each of these figures, the sheet-shaped heat pipe 4 of this embodiment is composed of the container 15 obtained by diffusion-joining together not only the first and second sheet bodies 11 and 12 but also a third sheet body 13 laminated between the sheet bodies 11 and 12. That is, the container 15 is made of these three copper foil sheets. No limitation is imposed on the numbers of the sheet bodies 11, 12 and 13 as long as two or more of them are employed. As for the first sheet body 11 and the second sheet body 12 that serve as the outermost layers and form one and the other side surfaces of the container, half-etching is performed exclusively on one side surface of each of the sheet bodies 11 and 12 whereas full-etching is performed on the two side surfaces of the third sheet body 13 serving as the middle layer.

Figures 19A, 19B:
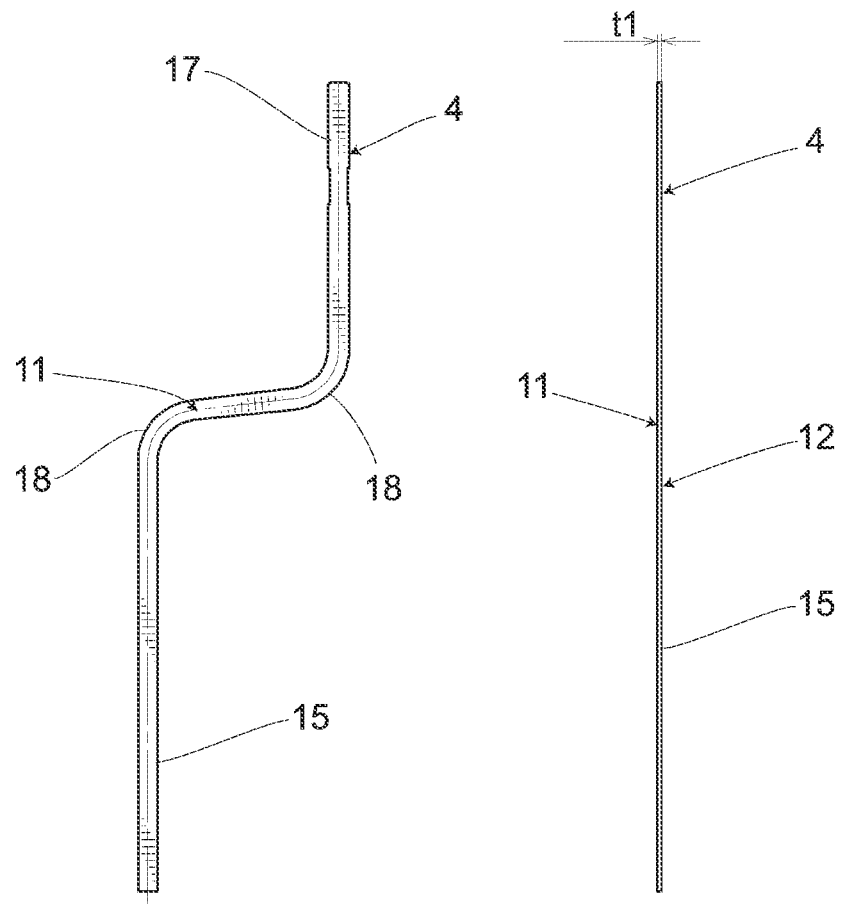
FIG. 19A is a planar view of a completed sheet-shaped heat pipe of a fourth embodiment of the invention.
FIG. 19B is a side view of the completed sheet-shaped heat pipe of the fourth embodiment of the invention.

As shown in FIG. 19A and FIG. 19B, the sheet-shaped heat pipe 4 of the present embodiment has an outer shape substantially identical to that of the sheet-shaped heat pipe 2 of the second embodiment. That is, the sheet-shaped heat pipe 4 is formed into the shape of a thin and elongated planar stick as compared to the sheet-shaped heat pipe 1 of the first embodiment. Further, in consideration of the chassis inner structure of the mobile terminal 51, two bended portions 18 are formed on the sheet-shaped heat pipe 4 if necessary. The tube-shaped sealing portion 17 is formed at one end of the container 15 so that an operating fluid such as pore water can be vacuum-encapsulated inside the container 15. A thickness t1 of the container 15 sealed by the sealing portion 17, i.e. a thickness of the sheet-shaped heat pipe 4 is 0.5 mm.

Figures 20A, 20B:
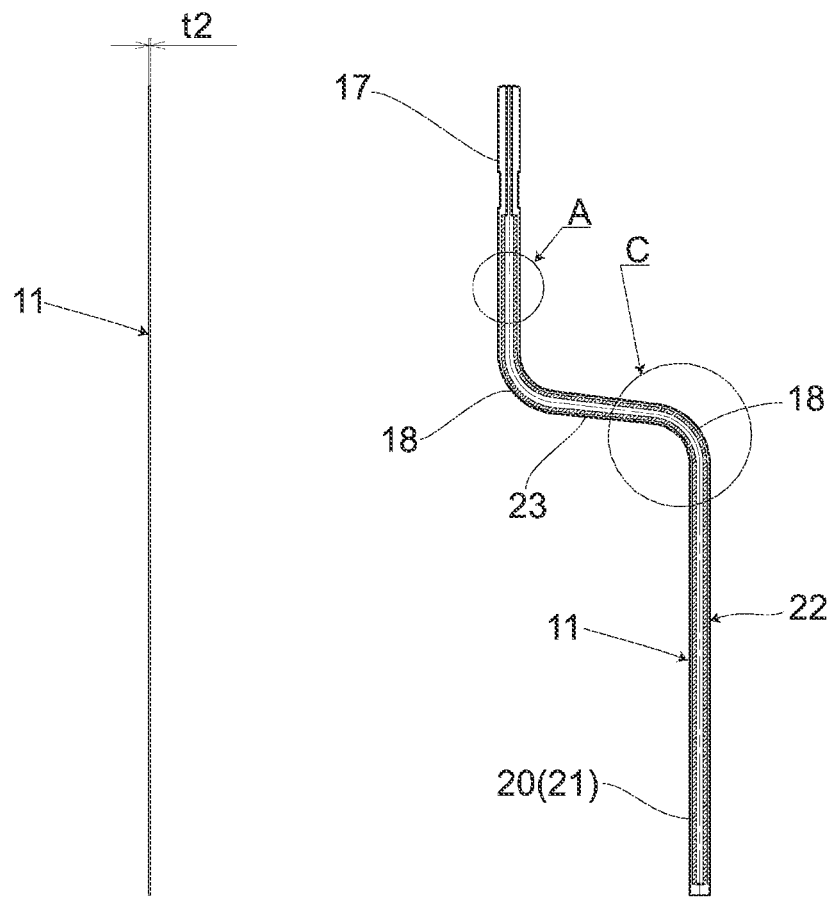
FIG. 20A is a side view of a first sheet body of the fourth embodiment of the invention.
FIG. 20B is a planar view of the first sheet body of the fourth embodiment of the invention.
Figures 21A, 21B:
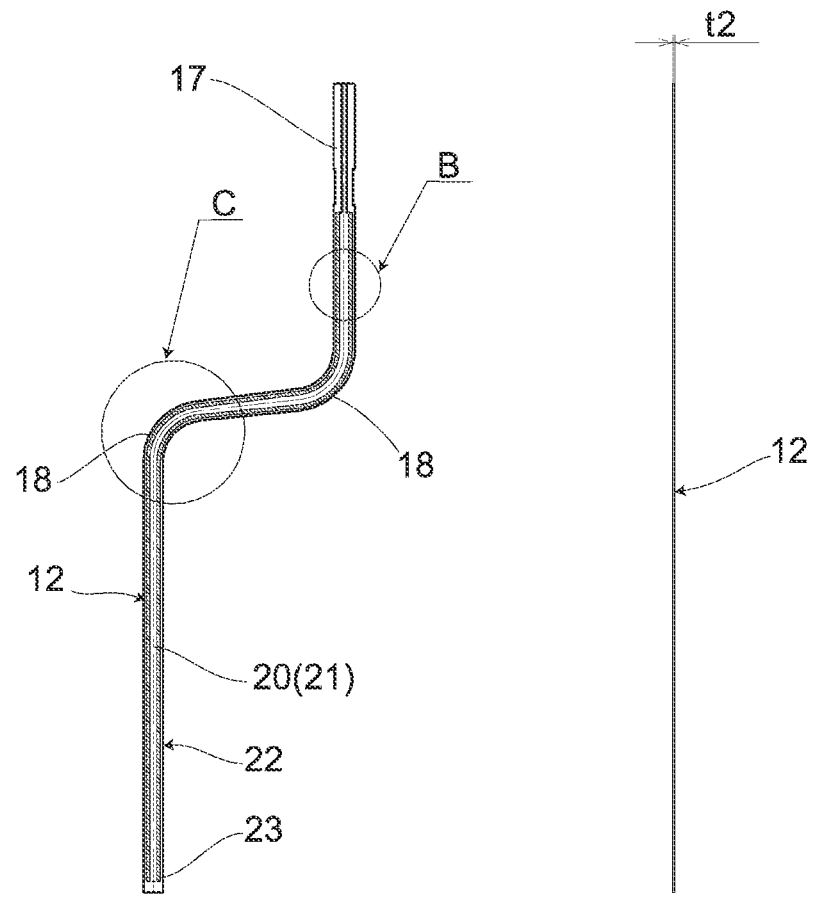
FIG. 21A is a planar view of a second sheet body of the fourth embodiment of the invention.
FIG. 21B is a side view of the second sheet body of the fourth embodiment of the invention.

FIG. 20A and FIG. 20B show the first sheet body 11; and FIG. 21A and FIG. 21B show the second sheet body 12, respectively. A thickness t2 of each of the sheet bodies 11 and 12 is 0.2 mm. Further, the vapor passage 20, the wicks 22 and the side wall 23 are formed exclusively on one side surface of each of the sheet bodies 11 and 12 through half etching. In this embodiment, the wicks 22 are provided on both sides of the vapor passage 20 that is unidirectionally extended along the outer shape of the sheet-shaped heat pipe 4, and the side wall 23 is arranged outside the wicks 22.

Figures 22A, 22B:
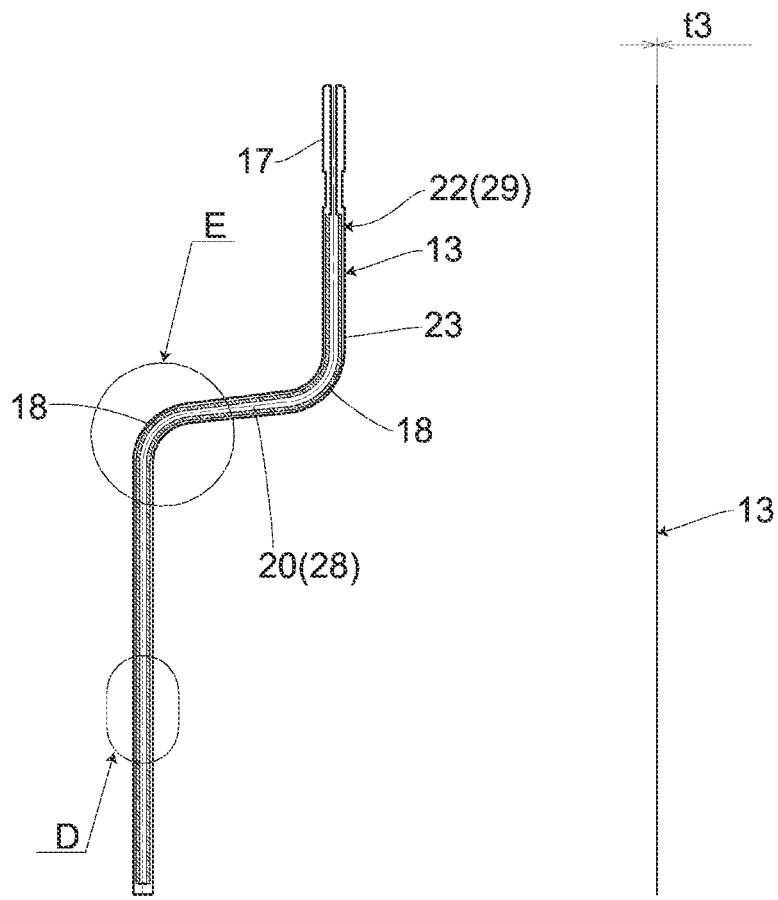
FIG. 22A is a planar view of a third sheet body of the fourth embodiment of the invention.
FIG. 22B is a side view of the third sheet body of the fourth embodiment of the invention.
Figure 25:
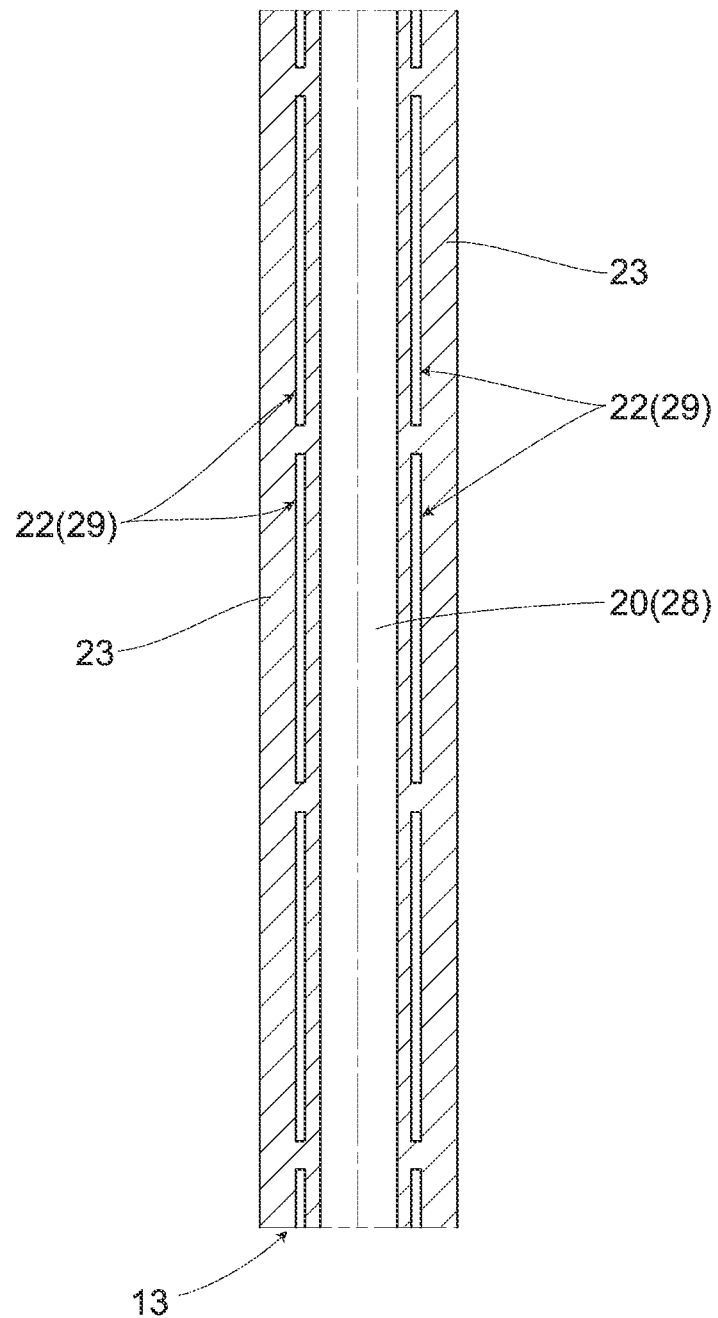
FIG. 25 is a detailed enlarged view of a section D shown in FIG. 22A.

FIG. 22A and FIG. 22B show the third sheet body 13. A thickness t3 of the third sheet body 13 is 0.1 mm. A penetrated section 28 and through-grooves 29 both passing through the third sheet body 13 are formed through full-etching. Particularly the penetrated section 21 is continuously provided from one end of the third sheet body 13 to the other. That is, the penetrated section 28 forms a part of the vapor passage 20 as a result of further laminating the other sheet bodies 11 and 12. Further, the slit-shaped through-grooves 29 are formed on both sides of the penetrated section 28, from one end of the third sheet body 13 to the other. Specifically, the through-grooves 29 form a part of the wicks 22 as a result of further laminating the other sheet bodies 11 and 12. Moreover, formed outside the through-grooves 29 is the unetched side wall 23. In fact, the side walls 23 of the sheet bodies 11, 12 and 13 are formed in locations where these side walls 23 are allowed to be laid on top of one another as a result of laminating the sheet bodies 11 and 12 with the third sheet body 13 sandwiched therebetween and with the one side surfaces of such sheet bodies 11 and 12 facing each other. These side walls 23 eventually form the outer circumferential portion of the container 15 through diffusion joining. Here, FIG. 20B, FIG. 21A and FIG. 22A, the wicks 22 are shown as the shaded areas.

When forming the vapor passage 20 and the wicks 22 on the sheet bodies 11, 12 and 13 through photo-etching, half-etching is performed on the surface of each of the sheet bodies 11 and 12 having the thickness t2 of 0.05 mm to 0.3 mm whereas full-etching is performed on the surface of the third sheet body 13 having the thickness t3 of 0.05 mm to 0.3 mm. In such case, the thickness t1 of the completed sheet-shaped heat pipe 4 is set to be not larger than 0.5 mm. Thus, there can be formed on the inner surface of the container 15 the fine vapor passage 20 and wicks 22 having a sufficient heat transport capability, and the sheet-shaped heat pipe 4 can be effortlessly installed in a thin chassis such as that of the mobile terminal 51.

The vapor passage 20 of the fourth embodiment is composed of the concave passage section 21 and the penetrated section 28. Particularly, this passage section 21 is established inside the sealed container 15 and is formed on each of the sheet bodies 11 and 12 along the longitudinal direction of the sheet-shaped heat pipe 4. Further, the penetrated section 28 is formed on the third sheet body 13. That is, when laminating the sheet bodies 11, 12 and 13 on top of one another, the passage sections 21 of the sheet bodies 11 and 12 are allowed to race each other on both sides of the penetrated section 28, thus forming a single and hollow tube-shaped vapor passage 20. Moreover, inside the container 15, the wicks 22 are formed in locations other than where the vapor passage 20 and the side wall 23 are provided.

FIG. 23A is an enlarged view showing a section A of the first sheet body 11 of FIG. 20B; and FIG. 23B is an enlarged view showing a section B of the second sheet body 12 of FIG. 21A. Here, the wicks 22 are also composed of the concave grooves 26 obtained through etching; and the unetched walls 27. Further, the plurality of the grooves 26 as passages of an operating fluid are established in the regions of the wicks 22, and are formed into desired shapes by the walls 27.

The grooves 26 are located along the bilateral regions and end regions of the vapor passage 20. As is the case with the first embodiment, the grooves 26 are composed of the first grooves 26A, the second grooves 26B and the third grooves 26C. The depth of the grooves 26 is 0.1 mm to 0.13 mm. As for a width d1 of the grooves 26, each of the first grooves 26A, the second grooves 26B and the third grooves 26C has a width of 0.12 mm. The number of the first grooves 26A provided is larger than the number of the second grooves 26B provided; and the first grooves 26A finer than the second grooves 26B are arranged on the bilateral regions of and directly communicated with the vapor passage 20.

A width 44 of the side wall 23 is formed to 0.4 mm on the entire circumference of each of the sheet bodies 11, 12 and 13. Therefore, the sheet bodies 11, 12 and 13 can be favorably diffusion-joined to one another at where the side walls 23 are formed, thus obtaining a sheet-shaped heat pipe 4 with a high reliability in sealing the container 15.

FIG. 24 is an enlarged view showing a section C of each of the sheet bodies 11 and 12 of FIG. 20B and FIG. 21A. As shown in FIG. 24, the aforementioned structure of the wicks 22 is likewise established between the vapor passage 20 and the side wall 23 in the bended portions 18 of the sheet-shaped heat pipe 4. Here, the width d1 of the grooves 26 is also formed to 0.12 mm.

Figure 26:
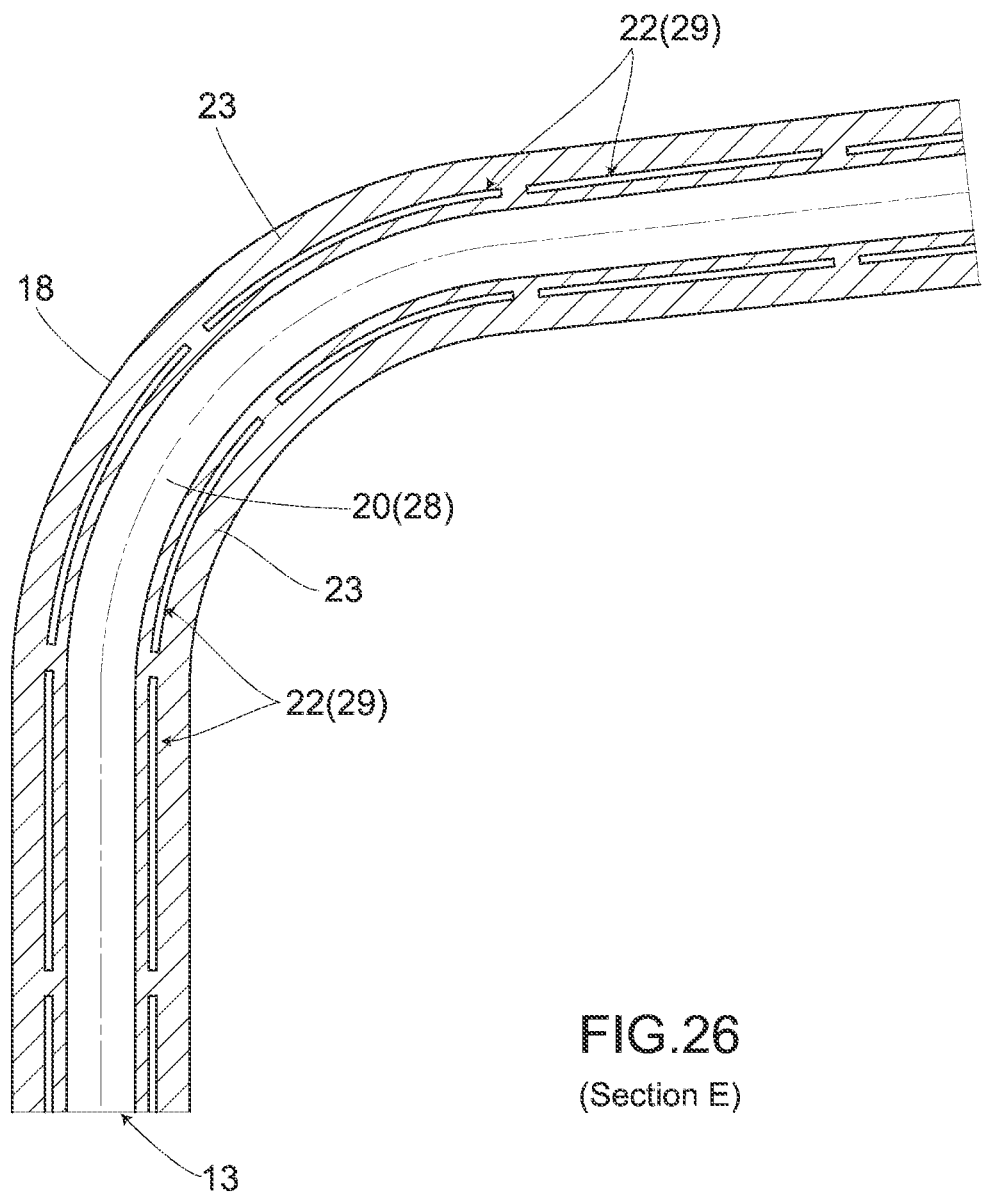
FIG. 26 is a detailed enlarged view of a section E shown in FIG. 22A.

FIG. 23 is an enlarged view showing a section D of the third sheet body 13 of FIG. 22. Further, FIG. 26 is an enlarged view showing a section E of the third sheet body 13 of FIG. 22A. The third sheet body 13 includes the penetrated section 28 as a part of the vapor passage 20; and the through-grooves 29 aligned on both sides of the penetrated section 28, the penetrated section 28 and the through-grooves 29 being respectively formed in a penetrated manner.

Next, working principles of the sheet-shaped heat pipes of the aforementioned embodiments are described with reference to FIG. 27. Although FIG. 27 only shows the sheet-shaped heat pipe 2 of the second embodiment, the basic working principle thereof is identical to those of the sheet-shaped heat pipes 1, 3 and 4 of the other embodiments.

As for the sheet-shaped heat pipe 2, a portion thermally connected to a heat source serves as a heat-receiving portion 31, whereas a portion for discharging the heat received by the heat-receiving portion 31 toward the outside serves a heat dissipation portion 32. As for the sheet-shaped heat pipe 3 of the third embodiment, the heat-receiving portion 19 is established at the other end thereof such that the heat dissipation portion 32 is thus provided at the one end of the sheet-shaped heat pipe 3. However, as for each of the sheet-shaped heat pipes 1, 2 and 4, the locations of the heat-receiving portion 31 and the heat dissipation portion 32 vary in accordance with the location where the heat pipe is thermally connected to the heat source. Here, for the purpose of illustration, the heat-receiving portion 31 is considered as being located at the other end of the sheet-shaped heat pipe 2, and the heat dissipation portion 32 is considered as being located at the one end of the sheet-shaped heat pipe 2.

The working-principle of the sheet-shaped host pipe 2 is as follows. At the heat-receiving portion 31, an operating fluid evaporates inside the container 15 as a result of receiving the heat from the heat source, thereby increasing a pressure with an evaporative latent heat being stored in the vapor. This vapor then flows from the heat-receiving portion 31 to the heat dissipation portion 32 through the vapor passage 20 inside the container 15, thus making it possible to transport the heat from the heat-receiving portion 31 to the heat dissipation portion 32 distant from the heat-receiving portion 31. At the heat dissipation portion 32, the vapor is then condensed inside the container 15 such that a condensation latent heat can be discharged toward the outside of the sheet-shaped heat pipe 2. Further, the operating fluid accumulated in the heat dissipation portion 32 will be brought back to the heat-receiving portion 31 through the wicks 22.

Figure 27:
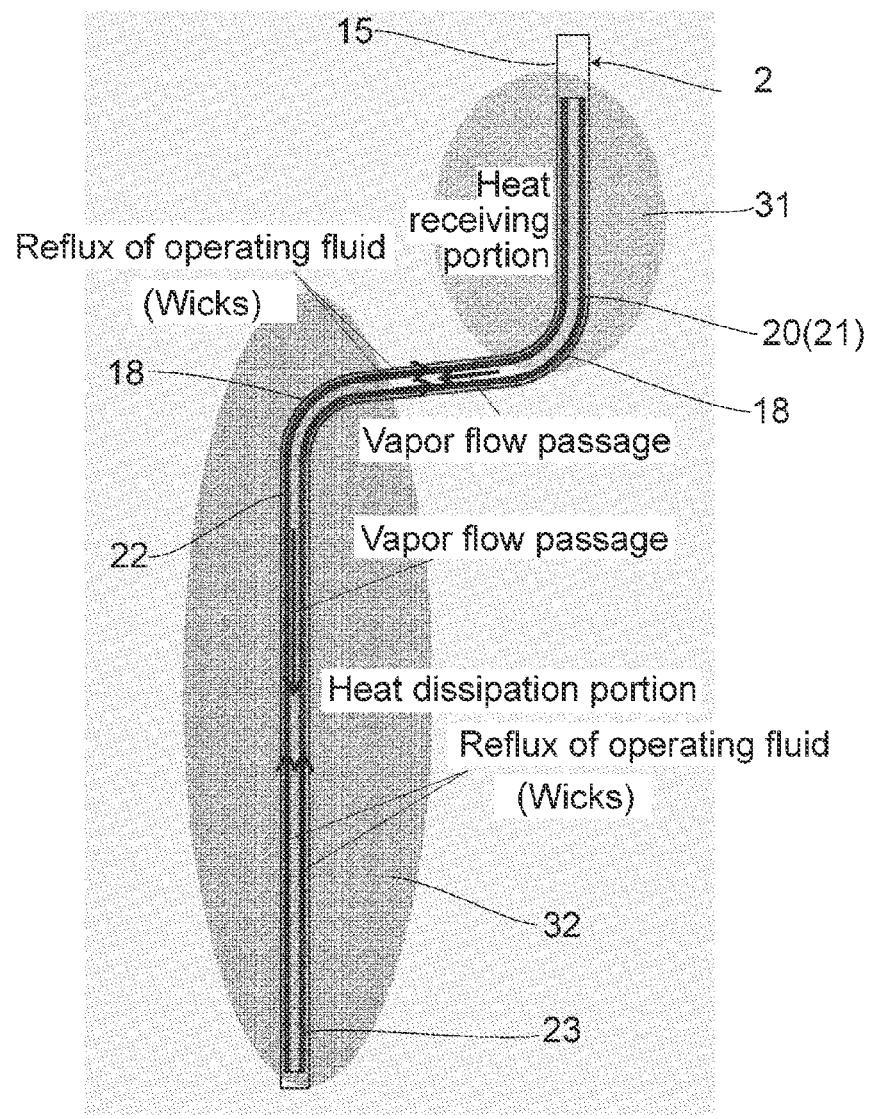
FIG. 27 is an explanatory diagram showing a working principle of each of the sheet-shaped heat pipes of the embodiments of the invention.

As shown in FIG. 27, denoted by arrows are a vapor flow passage established from the heat-receiving portion 31 to the heat dissipation portion 32 through the vapor passage 20 as a space; and a reflux flow of the operating fluid that is established from the heat dissipation portion 32 to the heat-receiving portion 31 through the wicks 22. The sheet-shaped heat pipe 2 of this embodiment is referred to as the "wick type (capillary type)" in terms of the operation method thereof. That is, the sheet-shaped heat pipe 2 has an inner structure capable of bringing the operating fluid accumulated in the heat dissipation portion 32 back to the heat-receiving portion 31 through the capillary force of the wicks 22.

Figure 28:
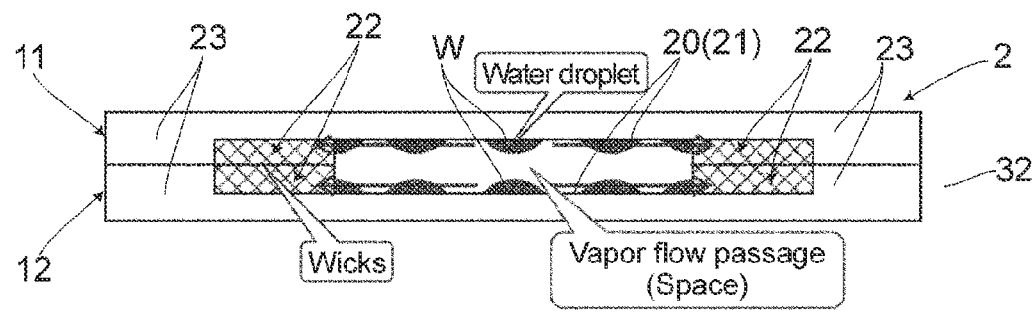
FIG. 28 is a cross-sectional view showing a state of a heat dissipation portion at the time of heat transportation, in the embodiments of the invention.

FIG. 28 is a diagram schematically showing a state of the heat dissipation portion 32 under the condition when heat is being transported. When the sheet-shaped heat pipe 2 i.e. the container 15 is formed to a thickness of not larger than 0.5 mm, especially to an extremely small thickness of not larger than 0.4 mm, established is a narrow vapor passage 20 such that the vapor low generated at the heat-receiving portion 31 will be condensed due to a flow resistance (pressure loss) and temperature decrease when passing through the vapor passage 20; and that the water droplets will then block the vapor passage 20 to significantly degrade the performance of the sheet-shaped heat pipe 2. That is, in the case of a thin sheet-shaped heat pipe 2, it is important to employ the structure of the wicks 22 capable of swiftly absorbing the water droplets inside the vapor passage 20; and if is required that the structure of the wicks 22 be designed well enough to be able to prevent the vapor passage 20 from being blocked.

As for each of the aforementioned embodiments, the structure of the wicks 22 is distinctively established as follows. That is, the grooves 26 formed as the wicks 22 on the sheet bodies 11, 12 are composed of the first grooves 26A that are adjacently arranged on both sides of the vapor passage 20; and the second grooves 268 that are formed more distant from the vapor passage 20 than the first grooves 26A. Further, the interval at which the first grooves 26A are provided is narrower than that of the second grooves 26B, and the number of the first grooves 26A provided is larger than that of the second grooves 26B. In this way, the wicks 22 are provided on both sides of the vapor passage 20, and the wicks 20 adjacent to the vapor passage 20 are formed finer, thus allowing the water droplets in the vapor passage 20 to be swiftly absorbed by the wicks 22. In FIG. 28, arrows are used to denote the flows of the water droplets W from the vapor passage 20 toward the wicks 22 that are arranged on both sides of the vapor passage 20. In a region where the heat dissipation portion 32 is provided.

Figure 29:
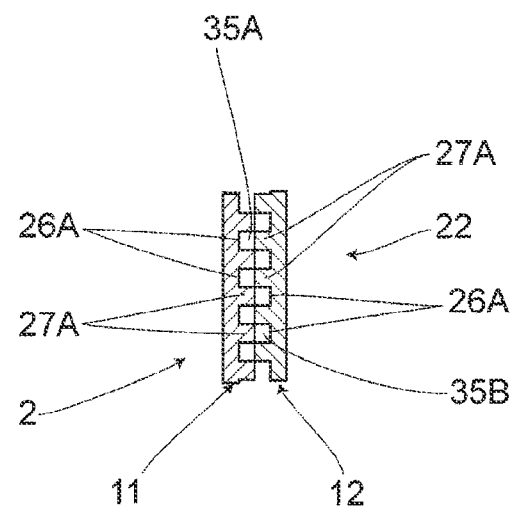
FIG. 29 is a cross-sectional view of the sheet-shaped heat pipe of the invention that is taken along a direction A shown in FIG. 11A.

Next, the structure of the wicks 22 is described in greater detail FIG. 29 is a cross-sectional view of the sheet-shaped heat pipe 2 with the sheet bodies 11 and 12 being laid on top of each other. This cross-sectional view is taken on a direction A along the direction of the vapor passage 20 shown in FIG. 11A. Further, the FIG. 30 likewise is a cross-sectional view of the sheet-shaped heat pipe 2 with the sheet bodies 11 and 12 being laid on top of each other. However, this cross-sectional view is taken on a direction B that is orthogonal to the direction of the vapor passage 20 shown in FIG. 11A.

As shown in FIG. 29, with the sheet bodies 11 and 12 being laid on top of each other, the first grooves 26A of the first sheet body 11 and the first grooves 26A of the second grooves 26B are arranged in a staggered manner against one another in the direction A along the direction of vapor passage 20. Specifically established in the staggered manner on both sides of the sheet bodies 11 and 12 are fluid passages 35A formed as a result of allowing the first walls 27A of the second sheet body 12 to block the opening sections of the first grooves 26A of the first sheet body 11; and fluid passages 35B formed as a result of allowing the first walls 27A of the first sheet body 11 to block the opening sections of the first grooves 26A of the second sheet body 12. That is, as for the wicks 22 adjacent to the vapor passage 20, formed on each of the sheet bodies 11 and 12 having a thickness t2 of 0.2 mm are the first grooves 26A that are finely miniaturized to the utmost limit through etching. Moreover, the first grooves 26A of the front and rear sheet bodies 11 and 12 are then arranged in the staggered manner against one another such that the fluid passages 35A and 358 can thus be respectively formed on the sheet bodies 11 and 12 as the sheet bodies 11 and 12 facing each other mutually block the opening sections of the first grooves 26A. In this way, it is possible to finely miniaturize the structure of the wicks 22 to the utmost limit even when the sheet-shaped heat pipe 2 is formed extremely thin.

Figure 30:
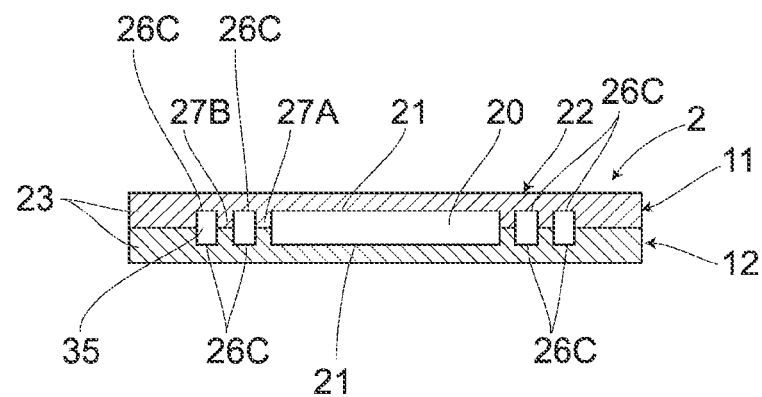
FIG. 30 is a cross-sectional view of the sheet-shaped heat pipe of the invention that is taken along a direction B shown in FIG. 11B.

Meanwhile, as shown in FIG. 30, with the sheet bodies 11 and 12 being laid on top of each other, the third grooves 26C of the first sheet body 11 and the third grooves 26C of the second sheet body 12 face one another in the direction B orthogonal to the direction of the vapor passage 20. Specifically, fluid passages 35 straddling the sheet bodies 11 and 12 are established as the third grooves 26C of the second sheet body 12 block the opening sections of the third grooves 26C of the first sheet body 11. The cross-sectional area of each fluid passage 35 is formed larger than the cross-sectional area of each of the fluid passages 35A and 35B that are provided in the staggered manner on both sides of the sheet bodies 11 and 12. Therefore, the water droplets taken in by the wicks 22 through the fluid passages 35A and 35B can be smoothly refluxed to the heat-receiving portion 31 through the fluid passage 35.

In addition, as mentioned above, the locations of the heat-receiving portion 31 and the heat dissipation portion 32 vary in accordance with the location where each of the sheet-shaped heat pipes 1, 2 and 4 is thermally connected to the heat source. However, as is the case with the sheet-shaped heat pipe 1 of the first embodiment, since the plurality of the first vapor paths 20A formed inside the container 15 are all communicated with the single second vapor path 20B, a thermal uniformity can be achieved in the entire area of the sheet-shaped heat pipe 1 regardless of where the heat-receiving portion 31 and the heat dissipation portion 32 are located on the sheet-shaped heat pipe 1.

Described hereunder are the structures, functions and effects of the sheet-shaped heat pipes 1 to 4 of the aforementioned embodiments when installed in the thin mobile terminal 51.

Figure 31:
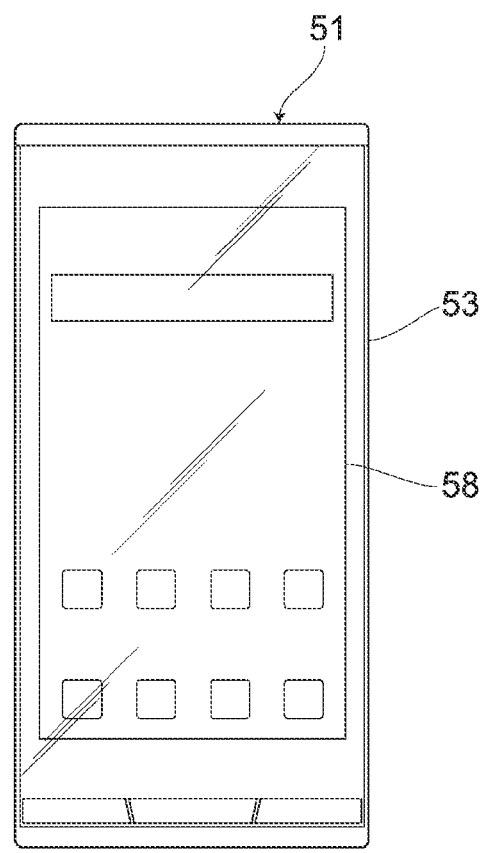
FIG. 31 is an extend view of a smartphone as a mobile terminal in which the sheet-shaped heat pipe of any one of the first through the fourth embodiments is to be installed.
Figures 32A, 32B:
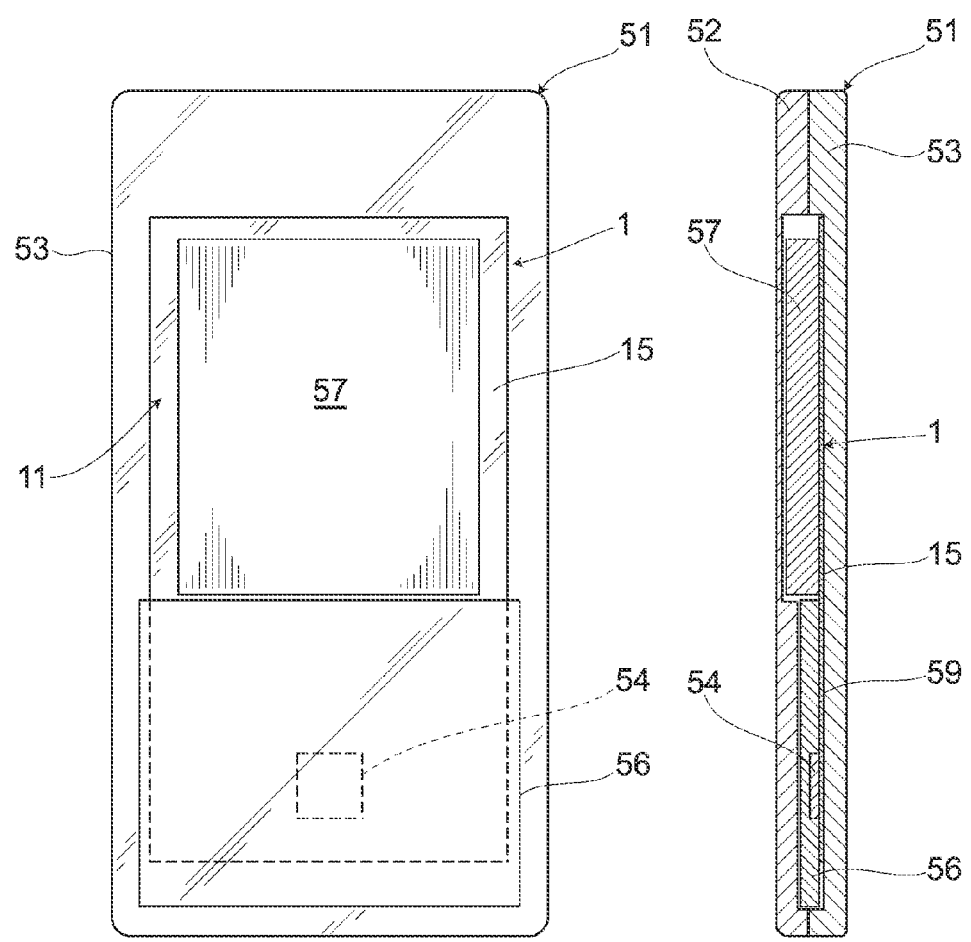
FIG. 32A is a rear view of a mobile terminal without a rear cover but with the sheet-shaped heat pipe disposed between a tear surface of a touch panel and a motherboard, or between the one and a battery pack.
FIG. 32B is a vertical cross-sectional view of the mobile terminal with the rear cover and with the sheet-shaped heat pipe disposed between the rear surface of the touch panel and the motherboard, or between the one and the battery pack.

FIG. 31 shows the appearance of the mobile terminal 51 in which each of the sheet-shaped heat pipes 1 to 4 is to be installed. Further, FIG. 32A and FIG. 32B show the inner structure of the mobile terminal 51 in which the sheet-shaped heat pipe 1 of the first embodiment has been installed. The mobile terminal 51 shown in FIG. 31 and FIG. 32A and FIG. 32B is a smartphone that is formed smaller than a tablet terminal and has an external size small enough to be held by hand. Particularly, the mobile terminal 51 includes a longitudinal rear cover 52 that is substantially formed into a rectangular shape. Here, a flat outer frame (chassis) of the mobile terminal 51 is formed by attaching the rear cover 52 to the rear surface region of a tabular touch panel 53. Disposed inside the chassis of the mobile terminal 51 are a CPU (central processing unit) 54 serving as a control unit of the mobile terminal 51; various electronic components other than the CPU 54; a motherboard 56 serving as a substrate; and a rechargeable battery pack 57 that is formed into a flat and substantially rectangular shape and is used as a charging component to supply necessary electric power to the CPU 54 and other electronic components. Specifically, the CPU 54 and the various electronic components other than the CPU 54 are mounted on the motherboard 56 when disposed inside the mobile terminal 51; and the battery pack 57 is in fact detachably received in the mobile terminal 51. Further, provided on the front surface region of the touch panel 53 is an operation display 58 formed by integrally combing a input and output devices; whereas the rear surface of the touch panel 53 that faces the front surface region opening section of the rear cover 52 is composed as a flat and smooth metal plate 59 such as an aluminum plate. The operation display 58 is exposed on the front surface of the mobile terminal 51 such that the user can touch the operation display 38 with his/her finger(s).

As shown in FIG. 32A and FIG. 32B, the sheet-shaped heat pipe 1 of the first embodiment has the outer shape matched to the chassis inner shape of the mobile terminal 51. That is, the single sheet-shaped heat pipe 1 can be installed inside the chassis of the mobile terminal 51 as it is. Here, it is preferred that the sheet-shaped heat pipe 1 be installed in a region occupying not less than 50% of the rear surface of the touch panel 53. One part of the side surface of the sheet-shaped heat pipe 1 serves as a heat-receiving portion, and is in contact with and thermally connected to the motherboard 56 including the CPU 54 as a heat source. Meanwhile, the other part of the side surface of the sheet-shaped heat pipe 1 serves as a heat dissipation portion, and is in contact with and thermally connected to the battery pack 57. Moreover, another side surface of the sheet-shaped heat pipe 1 is entirely in contact with and thermally connected to the metal plate 59 as the rear surface of the touch panel 53; especially a portion of such another side surface that is distant from the CPU 54 is formed as a heat dissipation portion. That is, the sheet-shaped heat pipe 1 is disposed between the rear surface of the touch panel 53 and the motherboard 56, or between the one and the battery pack 37.

Figure 1B:
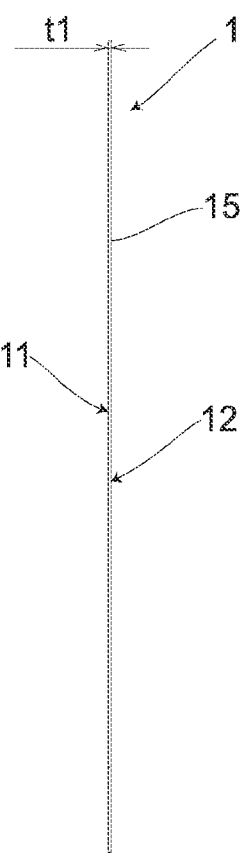
FIG. 1B is a side view of the completed sheet-shaped heat pipe of the first embodiment of the invention.
Figure 33:
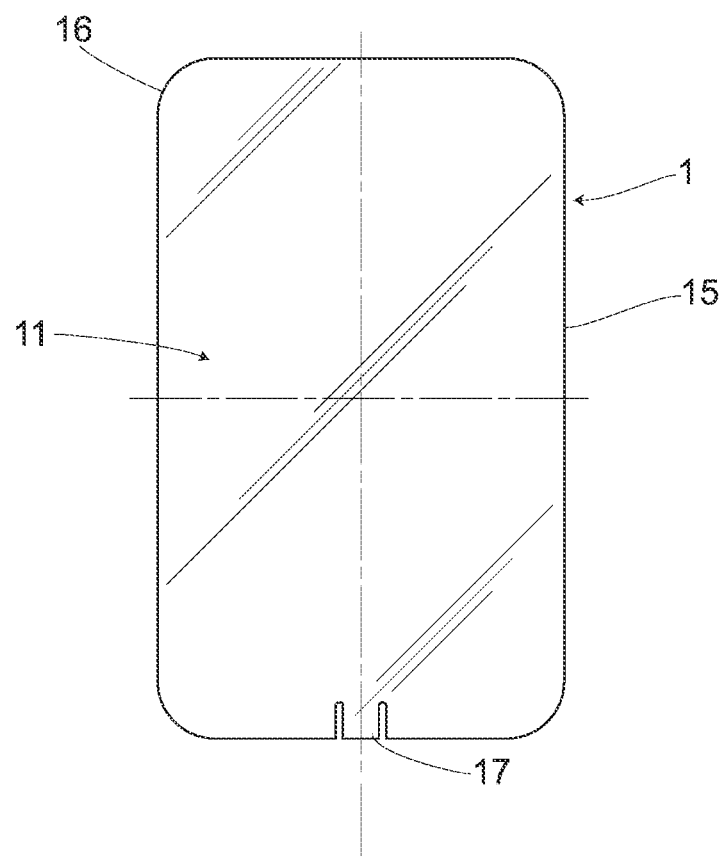
FIG. 33 is a planar view of the sheet-shaped heat pipe of the first embodiment to be installed in the smartphone.

FIG. 33 shows the sheet-shaped heat pipe 1 that is about to be installed in the mobile terminal 51. Here, the completed sheet-shaped boat pipe 1 shown in FIG. 1A and FIG. 1B is processed as follows. That is, the sealing portion 17 protruding downward front the container 15 is cut off while maintaining the sealed state of the container 15. Particularly FIG. 33 shows the sheet-shaped heat pipe 1 of a condition where the font end of the sealing portion 17 has been cut off such that the sheet-shaped heat pipe 1 can now be disposed inside the chassis of the mobile terminal 51 without being hindered by the sealing portion 17.

As for the mobile terminal 51 shown in FIG. 32A and FIG. 32B, when the CPU 54 or the like produces heat such that the temperature inside the chassis increases, the heat from the CPU 54 will be transported to the heat-receiving portion of the one side surface of the sheet-shaped heat pipe 1. Accordingly, the operating fluid will evaporate at the heat-receiving portion, and the vapor thus generated will then flow from the heat-receiving portion toward the heat dissipation portion having a low temperature, through the vapor passage 20. In other words, heat transport takes place inside the sheet-shaped heat pipe 1. The heat transported to the heat dissipation portion will be thermally diffused in a large and planar region of the sheet-shaped heat pipe 1, and will then be released to both the battery pack 57 and the metal plate 59 as the rear surface of the touch panel 53 from the front and rear sides, i.e. the one and other side surfaces of the sheet-shaped heat pipe 1. In this way, since the mobile terminal 51 allows the heat produced by the CPU 54 or the like to be thermally diffused in a large area, a heat condensed in a heat spot(s) on the outer frame surface of the touch panel 53 or the like can be relaxed, thereby making it possible to restrict the temperature of the CPU 54 from increasing.

Moreover, although the vapor will be condensed such that the operating fluid will then be collected at the heat dissipation portion of the sheet-shaped heat pipe 1, the operating fluid will actually be brought back from the heat dissipation portion to the heat-receiving portion through a strong capillary force of the grooves 22 that are formed on both sides of the vapor passage 20 inside the sheet-shaped heat pipe 1. Specifically, the operating fluid is brought back to the heat-receiving portion by travelling from the fluid passages 35A and 35B that are orthogonal to the vapor passage 20 through the fluid passage 35 that is formed along the vapor passage 20. Therefore, the operating fluid shall never be absent at the heat-receiving portion; particularly, the operating fluid that has evaporated at the heat-receiving portion will be guided to the heat dissipation portion along the grooves 22 through the capillary force, thereby allowing evaporation to continuously take place, thus allowing the sheet-shaped heat pipe 1 to exhibit its primary capabilities.

Further, the thickness t1 of the sheet-shaped heat pipe 1 itself is not larger than 0.5 mm. Especially, in the case of the mobile terminal 51 such as a smartphone, the sheet-shaped heat pipe 1 can be used in the chassis thereof that is limited to a certain thickness for ease of use. Particularly, the sheet-shaped heat pipe 1 allows the heat of the CPU 54 or the like to be swiftly and thermally diffused in a large area while exhibiting and maintaining a significantly favorable thermal conductivity as compared to a graphite sheet.

Figure 34A:
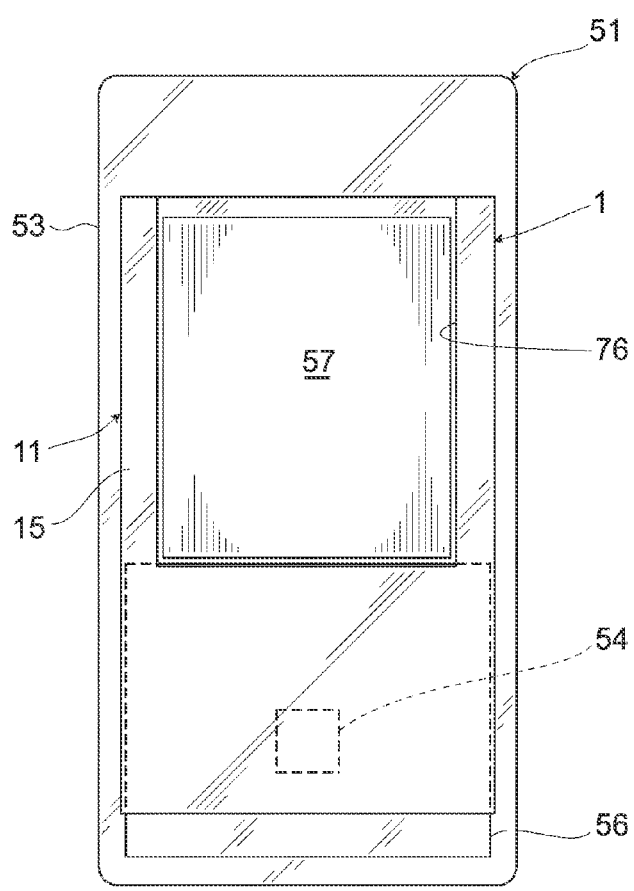
FIG. 34A is a rear view of a mobile terminal without a rear cover but with the sheet-shaped heat pipe disposed between a rear cover of a chassis and a motherboard.
Figure 34B:
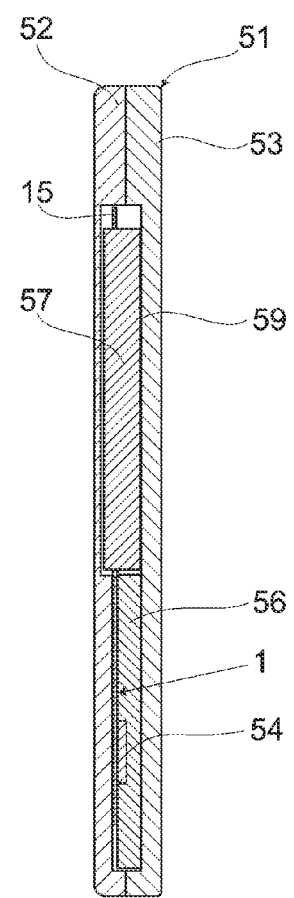
FIG. 34B is a vertical cross-sectional view of the mobile terminal with the rear cover and with the sheet-shaped heat pipe disposed between the rear cover of the chassis and the motherboard.

Further, FIG. 34A and FIG. 34B show an alternative inner structure of the mobile terminal 51 in which the sheet-shaped heat pipe 1 of the first embodiment has been installed. Here, the sheet-shaped heat pipe 1 includes an escape section 76 as a region interfering with the chassis of the mobile terminal 51. Particularly, the escape section 76 is provided to avoid an interference with the battery pack 57. For this reason, the sheet-shaped heat pipe 1 can be installed in the chassis of the mobile terminal 51 without causing the sheet-shaped heat pipe 1 to come into contact with the battery pack 57, thereby also making it possible to alleviate a heat influence exerted upon the battery pack 57 by the sheet-shaped heat pipe 1. Other than the region of the battery pack 57, the aforementioned escape section 76 may be provided in regions interfering with various functional components that are installed inside the chassis of the mobile terminal 51.

As shown in FIG. 34A and FIG. 34B, one part of the side surface of the sheet-shaped heat pipe 1 serves as a heat-receiving portion, and is in contact with and thermally connected to a motherboard 56 that includes the CPU 54 as a heat source while one portion of another side surface of the sheet-shaped heat pipe 1 is in contact with and thermally connected to the rear cover 52 of the chassis; especially, the portion of such another side surface that is distant from the CPU 54 is formed as a heat dissipation portion. That is, inside the chassis of the mobile terminal 51, the sheet-shaped heat pipe 1 herein is disposed between the rear cover 52 and the motherboard 56 having the CPU 34.

As for the mobile terminal 51 shown in FIG. 34A and FIG. 34B, when the CPU 54 or the like produces heat such that the temperature inside the chassis increases, the heat from the CPU 54 will be transported to the heat-receiving portion of the one side surface of the sheet-shaped heat pipe 1. Accordingly, the operating fluid will evaporate at the heat-receiving portion, and the vapor thus generated will then flow from the heat-receiving portion toward the heat dissipation portion having a low temperature, through the vapor passage 20. In other words, heat transport takes place inside the sheet-shaped heat pipe 1. The heat transported to the heat dissipation portion will be thermally diffused in a large and planar region of the sheet-shaped heat pipe 1, and will then be released to rear cover 52 of the chassis from another side surface of the sheet-shaped heat pipe 1. In this way, since the mobile terminal 51 allows the heat produced by the CPU 54 or the like to be thermally diffused in a large area, a heat condensed in a heat spot(s) on the outer frame surface of the rear cover 52 or the like can be relaxed, thereby making it possible to restrict the temperature of the CPU 54 from increasing.

Moreover, although the vapor will be condensed such that the operating fluid will be collected at the heat dissipation portion of the sheet-shaped heat pipe 1, the operating fluid will actually be brought back from the heat dissipation portion to the heat-receiving portion through a strong capillary force of the grooves 22 that are formed on both sides of the vapor passage 20 inside the sheet-shaped heat pipe 1. Specifically, the operating fluid is brought back to the heat-receiving portion by travelling from the fluid passages 35A and 35B that are orthogonal to the vapor passage 20 through the fluid passage 35 that is formed along the vapor passage 20. Therefore, the operating fluid shall never be absent at the heat-receiving portion; particularly the operating fluid that has evaporated at the heat-receiving portion will be guided to the heat dissipation portion along the grooves 22 through the capillary force, thereby allowing evaporation to continuously take place, thus allowing the sheet-shaped heat pipe 1 to exhibit its primary capabilities.

Figure 35:
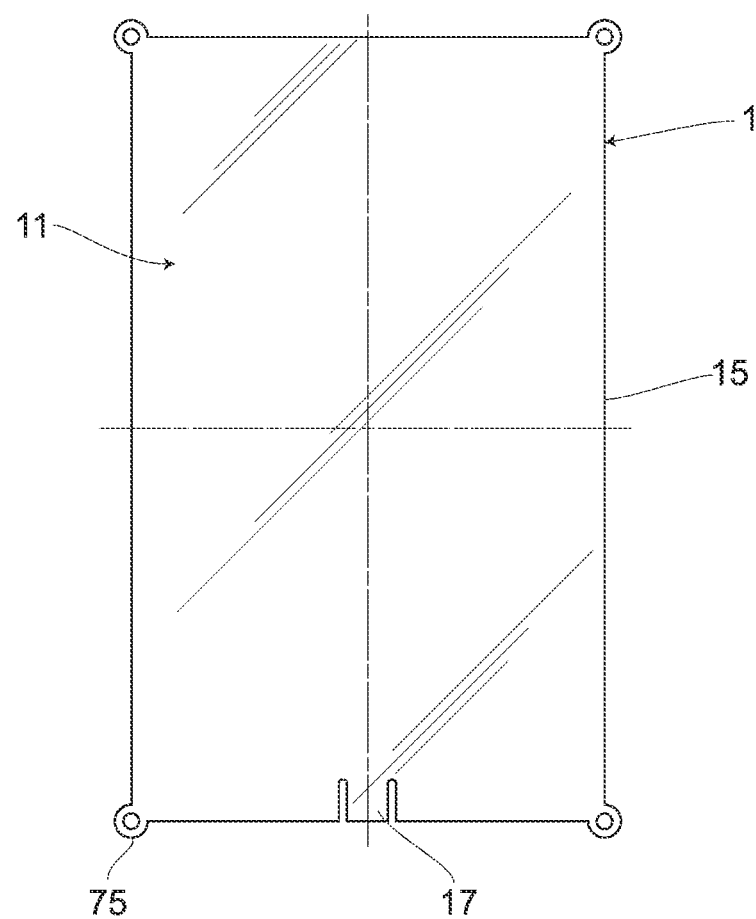
FIG. 35 is a planar view of a modified embodiment of the sheet-shaped heat pipe of the first embodiment.

FIG. 35 shows a modified embodiment of the aforementioned sheet-shaped heat pipe 1 installed inside the chassis of the mobile terminal 51. Provided on the four corners of the container 15 are attachment portions 75 instead of the chamfered portions 16. Each of the attachment portions 75 is formed as a through hole and allows the sheet-shaped heat pipe 1 to be attached to the chassis of the mobile terminal 51. For example, the attachment portions 75 can be matched to screw holes (not shown) formed on the rear surface portion of the touch panel 53, followed by inserting screws as fixing members through the attachment portions 75 and then screwing these screws into the screw holes. Thus, the sheet-shaped heat pipe 1 can be easily attached and fixed to a desired location of the chassis of the mobile terminal 51.

Figure 36:
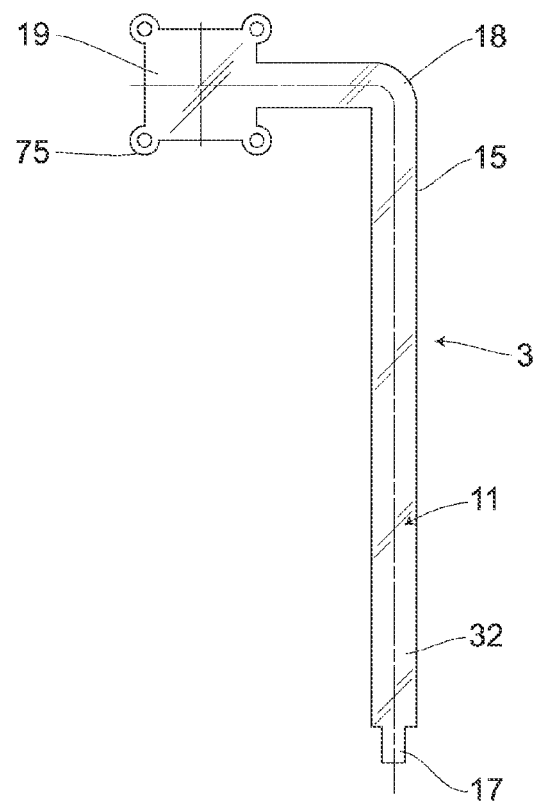
FIG. 36 is a planar view of a modified embodiment of the sheet-shaped heat pipe of the third embodiment.

Moreover, inside the chassis of the mobile terminal 31, not only the aforementioned sheet-shaped heat pipe 1 but also a heat pipe of various shapes may be installed. FIG. 36 shows a modified embodiment of the sheet-shaped heat pipe 3 of the third embodiment. Here, formed on the four corners of the heat-receiving portion 19 are the attachment portions 75 similar to those shown in FIG. 35. Particularly, in such case, the attachment portions 75 allow the heat-receiving portion 19 of the sheet-shaped heat pipe 3 to tightly abut against the CPU 54 as the heat source.

The attachment portions 75 are not limited to the through holes shown in FIG. 35 and FIG. 36. In fact, the attachment portions 75 may have any structures and be provided in any locations as long as the sheet-shaped heat pipe can thus be easily attached and fixed to the chassis of the mobile terminal 51.

Particularly, with regard to the sheet-shaped heat pipe 3 shown in FIG. 36, at one end of the heat pipe is served as a heat dissipation portion 32, while the other end thereof is served as a heat-receiving portion 19 thermally connected to the CPU 54. The heat-receiving portion 19 is formed wider than the heat dissipation portion 32 that is any other portion of the sheet-shaped heat pipe 3 or than a connecting member connecting heat dissipation portion 32 with the heat-receiving portion 19 in the planar view so as to be matched to the outer shape of the CPU 54. That is, since the heat-receiving portion 19 is formed wider than any other portions of the sheet-shaped heat pipe 3, thermal connection between the heat-receiving portion 19 and the CPU 54 that is a heat generating component is ensured, thereby conducting a heat produced from the CPU 54 to the heat-receiving portion 19 effectively thus allowing the heat generating component such as CPU 54 to make best use of its capabilities.

Figure 37:
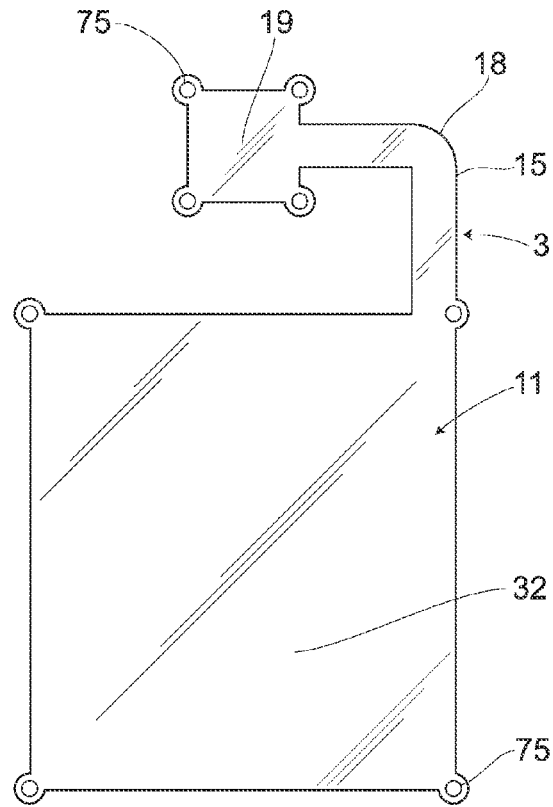
FIG. 37 is a planar view of a modified embodiment of the sheet-shaped heat pipe of the third embodiment.

As another modified embodiment of the sheet-shaped heat pipe 3, FIG. 37 shows one whose heat dissipation portion 32 is formed wider than any other portions of the sheet-shaped heat pipe 3 is the planar view. As shows in FIG. 37, attachment portions 75 are provided not only at the four corners of the heat-receiving portion 19 but also at those of the heat dissipation portion 32. The heat dissipation portion 32 is formed wider than the heat-receiving portion 19, or than any connecting member that connects heat-receiving portion 19 to the heat dissipation portion 32, so as to be matched to the outer shape of the battery pack 57. Therefore, in such case, the attachment portions 75 allow the heat-receiving portion 19 to tightly abut against the CPU 54 as the heat source or allow the heat dissipation portion 32 to tightly abut against the battery pack 57. Further, the heat dissipation portion 32 of the sheet-shaped heat pipe 3 can be formed wider than any other portions of the sheet-shaped heat pipe 3 to diffuse a heat transported to the heat dissipation portion 32 further into a larger area such as the battery pack 57, thus allowing the heat generating component seen as CPU 54 to make best use of its capabilities.

Figure 38:
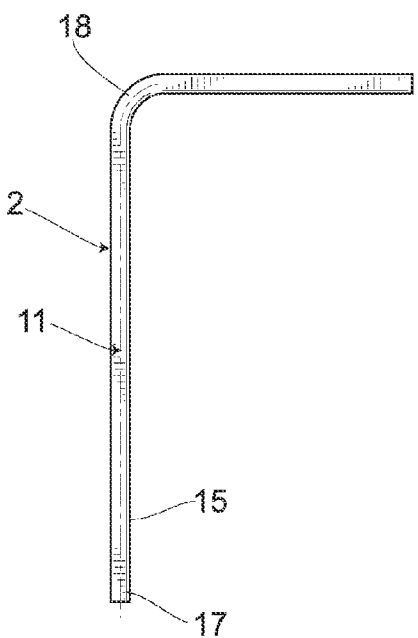
FIG. 38 is a planar view of the sheet-shaped heat pipe of the second embodiment to be installed in a smartphone.
Figure 39:
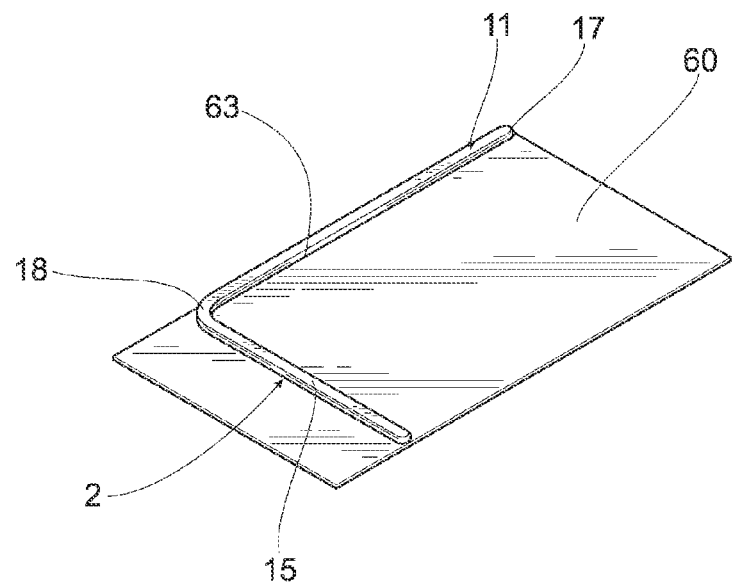
FIG. 39 is an external view of a cooling unit obtained by thermally connecting the sheet-shaped best pipe of the second embodiment to a heat dissipation plate.

FIG. 38 is a planar view of the sheet-shaped heat pipe 2 of the second embodiment to be installed in the mobile terminal 51. Here, as shown in the figure, the sheet-shaped heat pipe 2 is substantially formed into the shape of "L" with only one bended portion 18 being established midway through the container 15. As shown in FIG. 39, with regard to the thin sheet-shaped heat pipe 2 such as the one of the second embodiment, a cooling unit obtained by thermally connecting the sheet-shaped heat pipe 2 to a heat dissipation plate 60 is to be installed inside the chassis of the mobile terminal 51. The heat dissipation plate 60 is made of a metal such as an aluminum alloy exhibiting a thermal conductivity of not lower than 15 W/m·k and a thickness of not larger than 0.3 mm. A plated layer (not shown) such as that of nickel or tin is to be formed on the heat dissipation plate 60, followed by joining the sheet-shaped heat pipe 2 to this heat dissipation plate 60 through a low-temperature solder 63 that serves as a joining material and has a melting point of not higher than 160° C. Soldering using the low-temperature solder 63 not only allows the sheet-shaped heat pipe 2 and the heat dissipation plate 60 to be thermally joined to each other in a favorable manner; but also eliminates the concern that the sheet-shaped heat pipe 2 may be deformed and swell due to the heat generated at the time of performing soldering. In addition, similar functions and effects can be achieved even when thermally joining each of the other thin sheet-shaped heat pipes 3 and 4 to the heat dissipation plate 60, instead of the sheet-shaped heat pipe 2.

Here, the rectangular plate-shaped heat dissipation plate 60 thermally joined together with the aforementioned L-shaped sheet-shaped heat pipe 2 is installed instead of the sheet-shaped heat pipe 1 shown in FIG. 32. Particularly, the sheet-shaped heat pipe 2 is provided on the rear surface region of the heat dissipation plate 60 and along the side surface of the battery pack 57 that is formed into the shape of a rectangular box. Further, the CPU 54 is disposed on the front surface side of the motherboard 56 in a manner such that a part of the sheet-shaped heat pipe 2 is arranged in the vicinity of the CPU 54. The heat dissipation plate 60 has an outer shape matched to the chassis inner shape of the mobile terminal 51.

In that case, when the CPU 54 or the like produces heat such that the temperature inside the chassis of the mobile terminal 51 increases, the heat from the CPU 54 will be transported to the heat-receiving portion of the sheet-shaped heat pipe 2 through the heat dissipation plate 60. Further, the operating fluid will evaporate at the heat-receiving portion such that the vapor thus generated will then flow from the heat-receiving portion toward the heat dissipation portion having a low temperature, through the vapor passage 20. In other words, heat transport takes place inside the sheet-shaped heat pipe 2. The heat transported to the heat dissipation portion will be thermally diffused in a large and planar region of the heat dissipation plate 60, and will then be released from the front and rear surfaces of the heat dissipation plate 60 to both the metal plate 59 as the rear surface of the touch panel 53 and the battery pack 57. In this way since the mobile terminal 51 allows the heat produced by the CPU 54 or the like to be thermally diffused in a large area, a heat condensed in a heat spot(s) on the outer frame surface of the touch panel 53 or the like can be relaxed, thereby making it possible to restrict the temperature of the CPU 54 from increasing.

Moreover, although the vapor will be condensed such that the operating fluid will then be collected at the heat dissipation portion of the sheet-shaped heat pipe 2, the operating fluid will actually be brought back from the heat dissipation portion to the heat-receiving portion through a strong capillary force of the grooves 22 that are formed on both sides of the vapor passage 20 inside the sheet-shaped heat pipe 2. Specifically the operating fluid is brought back to the heat-receiving portion by travelling from the fluid passages 35A and 35B that are orthogonal to the vapor passage 20 through the fluid passage 35 that is formed along the vapor passage 20. Therefore, the operating fluid shall never be absent at the heat-receiving portion; particularly, the operating fluid that has evaporated at the heat-receiving portion will be guided to the heat dissipation portion along the grooves 22 through the capillary force, thereby allowing evaporation to continuously take place, thus allowing the sheet-shaped heat pipe 2 to exhibit its primary capabilities.

Further, the thickness t1 of the sheet-shaped heat pipe 2 itself is not larger than 0.5 mm. Furthermore, by employing the heat dissipation plate 60, there is no need to lay the sheet-shaped heat pipe 2 over the CPU 54 and the battery pack 57. Especially, in the case of the mobile terminal 51 such as a smartphone, the sheet-shaped heat pipe 2 can be used in the chassis thereof that is limited to a certain thickness for ease of use. Particularly the sheet-shaped heat pipe 2 allows the heat of the CPU 54 or the like to be swiftly and thermally diffused in a large area while exhibiting and maintaining a significantly favorable thermal conductivity as compared to a graphite sheet.

Described hereunder are detailed structures and modified embodiments of the embodiments 1 to 4.

FIG. 40A is a cross-sectional view of the section A of the first sheet body 11 of FIG. 11A that is taken on a line D-D; and FIG. 40B is a cross-sectional view of the section B of the second sheet body 12 of FIG. 11 that is taken on a line E-E. As shown in FIG. 40A and FIG. 40B, when performing half-etching on each of the sheet bodies 11 and 12, a ditched depth L1 of a passage section 21 composting the vapor passage 20 is formed to not smaller than 50% of the thickness t2 of each of the sheet bodies 11 and 12. As a result of forming a ditched section of such thickness L1 as the passage section 21 of the vapor passage 20 through etching, a sufficient vapor passage can be secured inside the container 15 even in the case of the thin sheet-shaped heat pipe 2. Further, when performing etching, although a ditched depth L2 of the grooves 26 composing the wicks 22 is inevitably shallower than the ditched depth L1 of the passage section 21 at the time of manufacturing (L1>L2), the fact that the ditched depth 12 of the grooves 26 is shallow endows the wicks 22 with a strong capillary force such that the performance of the sheet-shaped heat pipe 2 can be improved without difficulties in manufacturing.

FIG. 41 shows a modified embodiment of the sheet-shaped heat pipe 2. As for the wicks 22 shown in this figure, while the grooves 26 and the walls 2 are formed on the first sheet body 11, no walls 27 but only the grooves 26 are formed on the second sheet body 12. Further, by diffusion-joining the side walls 23 to each other with the one side surfaces of the half-etched sheet bodies 11 and 12 facing each other, there can be obtained the sheet-shaped heat pipe 2 with the desired wicks 22 being formed on both sides of the vapor passage 20. In this way, there can be formed the wicks 22 of various structures by ingeniously shaping the grooves 26 and the walls 27.

Figure 42:
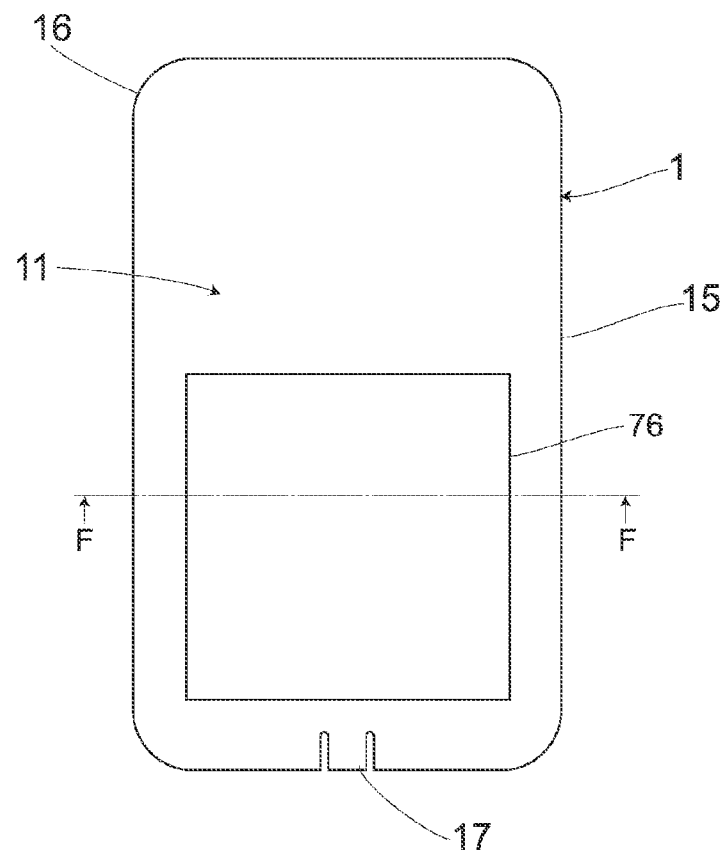
FIG. 42 is a planar view of a modified embodiment of the sheet-shaped heat pipe of the first embodiment.
Figure 43:
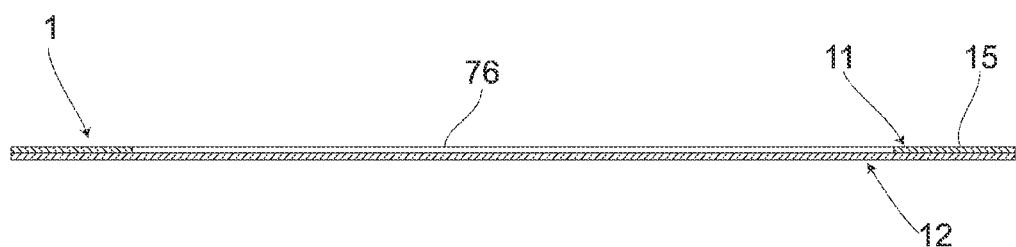
FIG. 43 is a cross-sectional view taken on a line F-F shown in FIG. 42, when the escape section is formed as a cutout or a thin-walled section.
Figure 44:
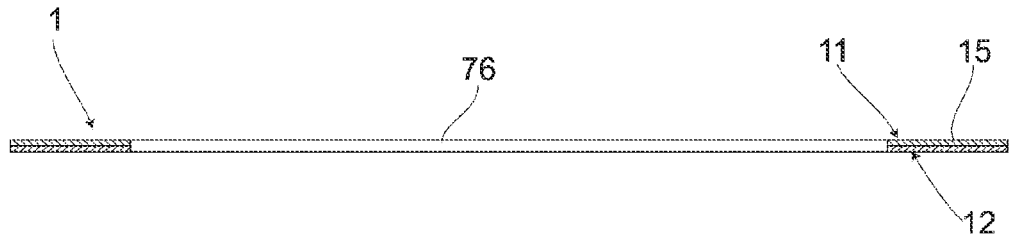
FIG. 44 is a cross-sectional view taken on the line F-F shown in FIG. 42, when the escape section is formed as a through hole.

FIG. 42 shows a modified embodiment of the sheet-shaped heat pipe 1 of the first embodiment and the sheet-shaped heat pipe 1 includes an escape section 76 being provided to avoid an interference with the battery pack 57. FIG. 43 is a cross-sectional view taken on a line F-F of FIG. 42 when the escape section 76 is either a cutout or a thin-walled section. In addition, FIG. 44 is a cross-sectional view taken on the line F-F of FIG. 42 when the escape section 76 is formed as a through hole. That is, in accordance with the shapes of each functional component and the battery pack 57, the escape section 76 may be formed as a concave cutout or thin-walled section; or as a through hole. Moreover, the escape section 76 may also be formed in appropriate regions of the sheet-shaped heat pipe 1 when necessary.

Figure 45:
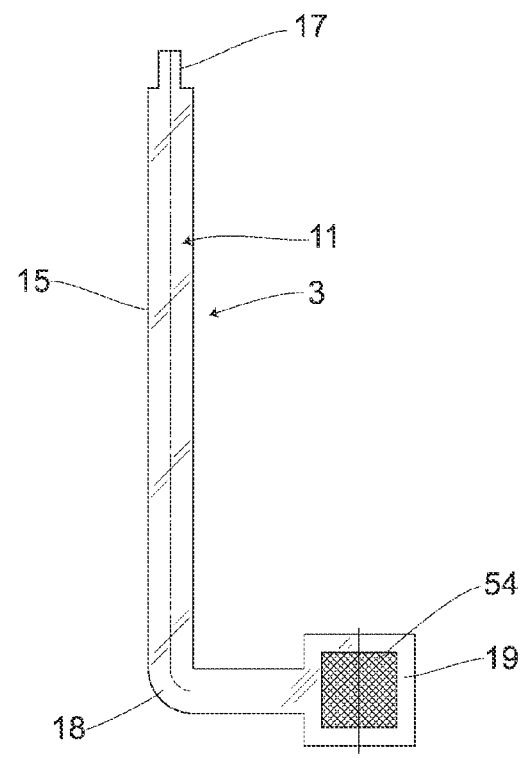
FIG. 45 is a planar view of the sheet-shaped heat pipe of the third embodiment, showing a positional relationship between a CPU and a heat-receiving portion.

FIG. 45 shows a positional relationship between the heat-receiving portion 19 and the CPU 54 with regard to the sheet-shaped heat pipe 3 of the third embodiment. The CPU 34 has a rectangular outer shape, and the heat-receiving portion 19 is formed in such a manner that it matches the outer shape of the CPU 54. Particularly, it is preferred that the heat-receiving portion 19 be formed into a shape allowing the entire surface of the CPU 54 to come into contact therewith.

Figure 46:
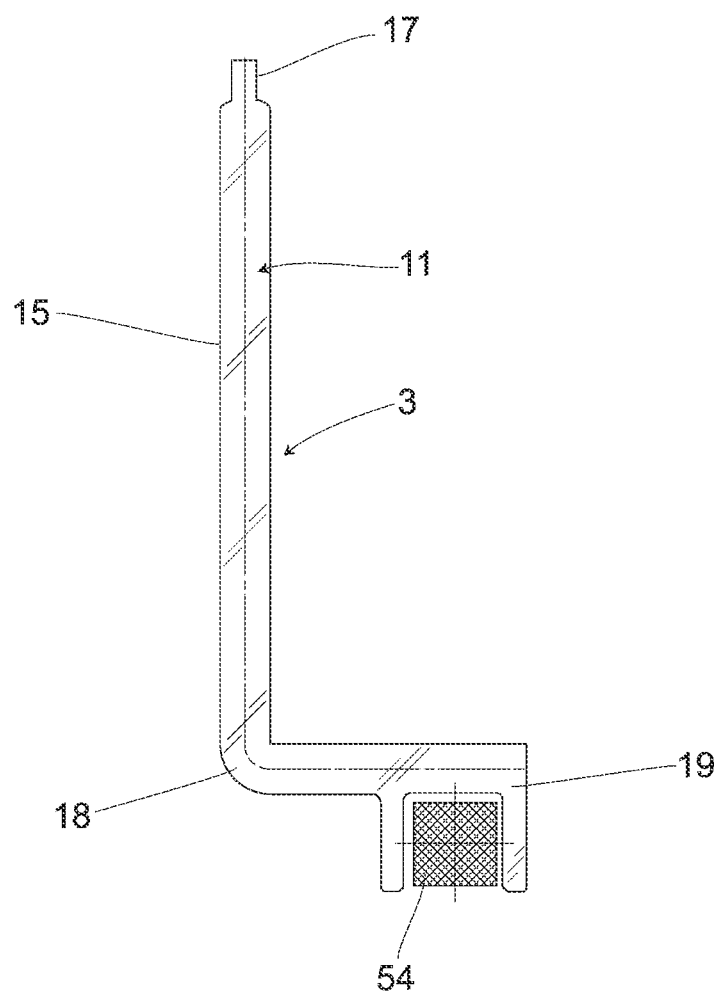
FIG. 46 is a planar view of a modified embodiment of the sheet-shaped heat pipe of the third embodiment, showing a positional relationship between a CPU and a heat-receiving portion.

FIG. 46 shows a modified embodiment of the heat-receiving portion 19 of the sheet-shaped heat pipe 3 of the third embodiment. Here, the heat-receiving portion 19 is disposed in a lateral section of the CPU 54 as the heat source in a way such that this heal-receiving portion 19 surrounds an area that occupies 50% of a peripheral region of the CPU 54. In this way, even when a limitation is imposed on the thickness of the chassis of the mobile terminal 51; and the heat-receiving portion 19 and the CPU 54 cannot be vertically laid on top of each other, the heat-receiving portion 19 of the sheet-shaped heat pipe 3 can be disposed in the lateral section of the CPU 54 that occupies at least 50% of the peripheral region of the CPU 54, thereby not allowing the sheet-shaped heat pipe 3 to be received inside the thin chassis of the mobile terminal 51, but also allowing the heat from the CPU 54 to be thermally and effectively transported through the sheet-shaped heat pipe 3.

Figure 47:
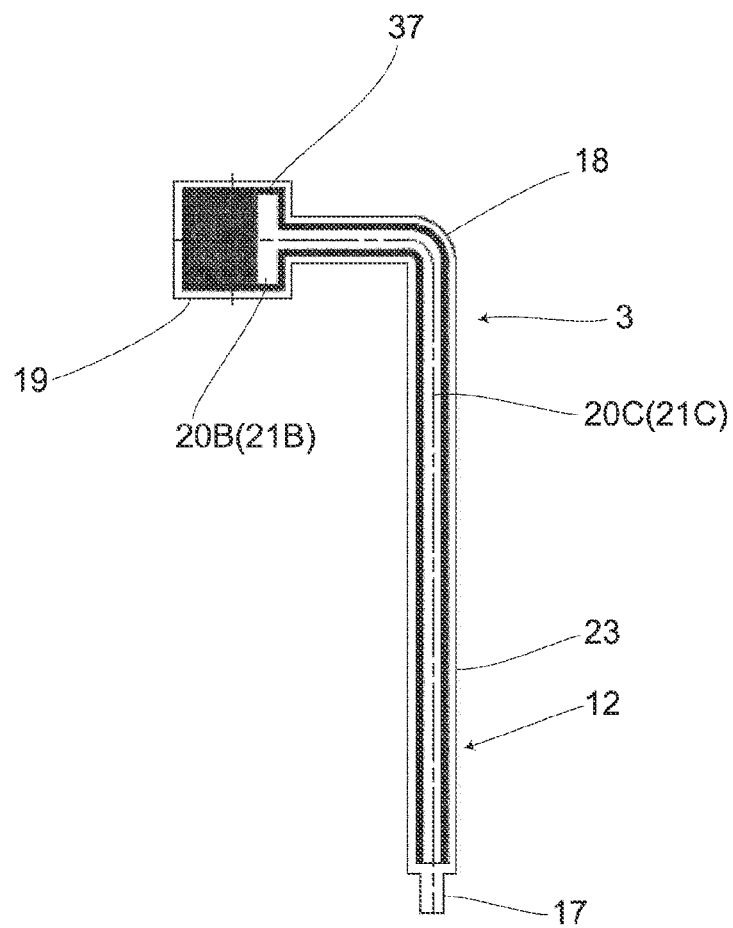
FIG. 47 is a planar view of a second sheet body with an unwoven cloth disposed therein, which is a modified embodiment of the sheet-shaped heat pipe of the first embodiment.
Figure 48:
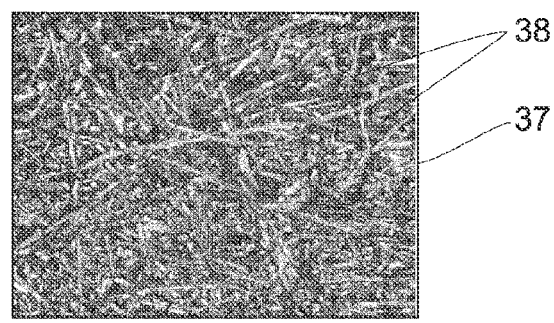
FIG. 48 is an enlarged view of the unwoven cloth shown in FIG. 47 of the first embodiment.

FIG. 47 shows a state in which a sheet-shaped unwoven cloth 3 is used to fill the heat-receiving portion 19 being provided as a part of the container 15 with regard to the sheet-shaped heat pipe 3 of the third embodiment. The unwoven cloth 37 provided inside the container 15 is in fact arranged between the sheet bodies 11 and 12, and the wicks 22 formed in the heat-receiving portion 19 are finely miniaturized even further due to the portion of the unwoven cloth 37 filled therein. FIG. 48 is an enlarged view of the unwoven cloth 37 shown in FIG. 47. The unwoven cloth 3 is made of an aggregate of a metal fiber 38, and has a clearance not larger than 30 µm for the purpose of improving the capillary force of the wicks 22 of the heat-receiving portion 19. That is, as for the heat-receiving portion 19, other than the capillary force of the grooves 22 formed on both sides of the vapor passage 20, the capillary force of the unwoven cloth 81 made the metal fiber 82 also comes into effect such that the operating fluid can be swiftly refluxed to the heat-receiving portion 31, thereby efficiently drawing the heat from the CPU 54, thus improving the performance of the sheet-shaped heat pipe 3.

Fifth Embodiment

FIGS. 49 to 68 illustrate a fifth embodiment in which one of the flattened heat pipes 6, 7 and 10 having various shapes is installed inside the chassis of the aforementioned mobile terminal 51 with its heat pipe thermally connected to the heat dissipation plate 60.

Figure 49:
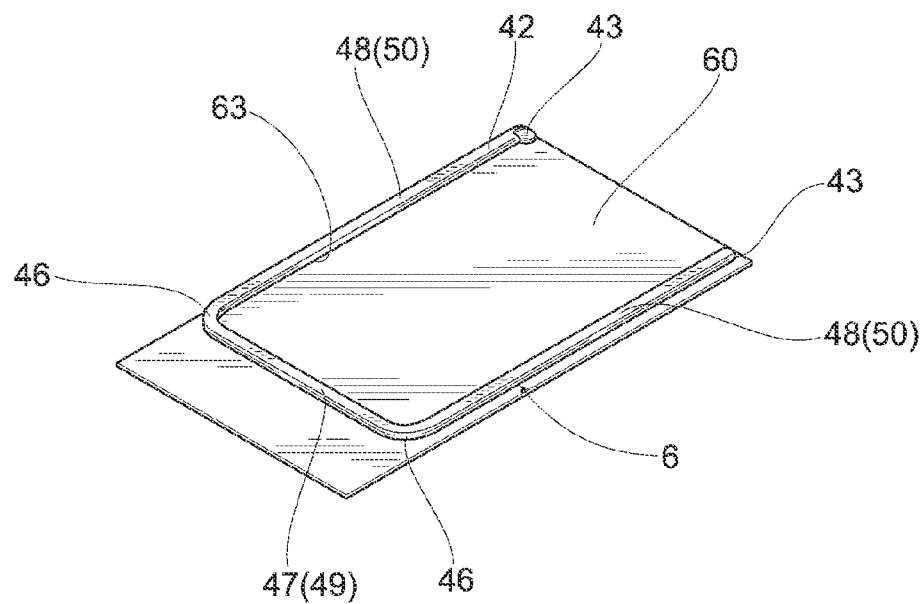
FIG. 49 is an external view of a cooling unit obtained by thermally connecting the U-shaped flattened heat pipe of the fifth embodiment to the heat dissipation plate.
Figure 50:
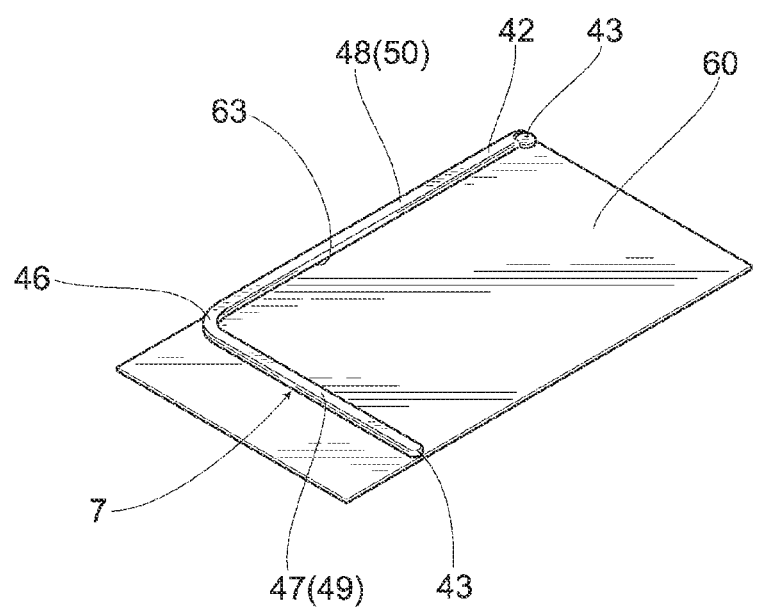
FIG. 50 is an external view of the cooling unit of the fifth embodiment obtained by thermally connecting the L-shaped flattened heat pipe to the heat dissipation plate.
Figure 51:
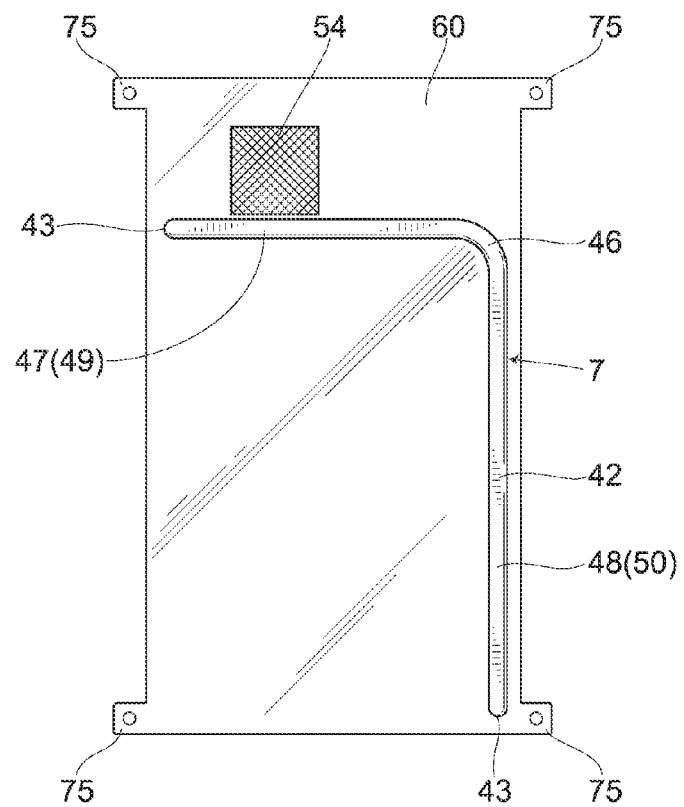
FIG. 51 is a plane view of a cooling unit of an alternative example in the fifth embodiment.
Figure 52:
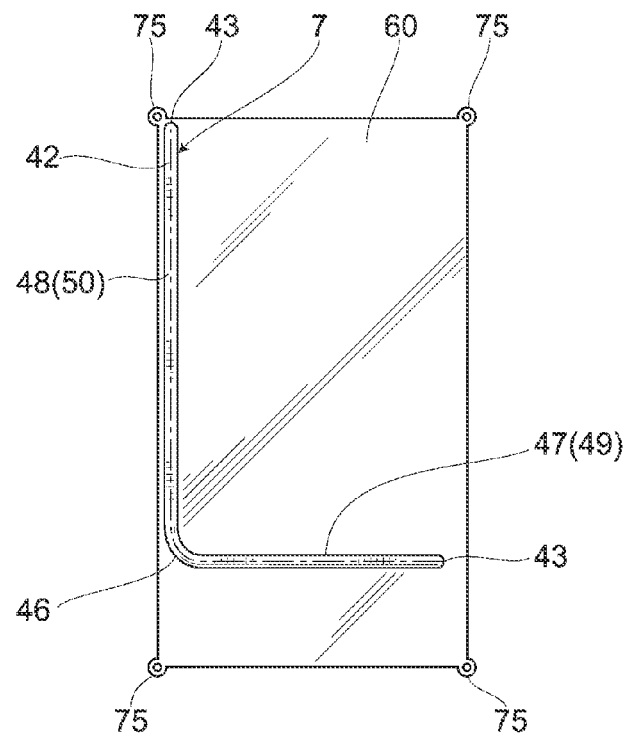
FIG. 52 is a plane view of a cooling unit of an alternative example in the fifth embodiment.

FIG. 49 shows an outer appearance of a cooling unit by itself with its U-shaped flattened heat pipe 6 thermally connected to the heat dissipation plate 60. FIG. 50 shows an outer appearance of a cooling unit by itself with its L-shaped flattened heat pipe 7 thermally connected to the heat dissipation plate 69. In each of the figures, the heat dissipation plate 60 is made of a metal such as an aluminum alloy that exhibits thermal conductivity of not lower than 15 W/m·k and the plate has a thickness of not larger than 0.3 mm. A plated layer (not shown) such as that of nickel or tin is to be formed on the surface of the heat dissipation plate 60, followed by joining the flattened heat pipe 6 or 7 to this heat dissipation plate 60 through a low-temperature solder 63 that serves as a joining material and has a melting point of not higher than 160° C. Soldering using the low-temperature solder 63 not only allows the flattened heat pipes 6 and 7 and the heat dissipation plate 69 to be thermally joined to each other in a favorable manner; but also eliminates the concern that the flattened heat pipes 6 and 7 may be deformed and swell doe to the heat generated at the time of performing soldering.

FIGS. 51 to 55 show various examples of the cooling units whose L-shaped flattened heat pipe 7 is thermally connected to the heat dissipation plate 60. Particularly in an example shown in FIG. 51 and FIG. 52, attachment portions 75 that connect to the chassis of the mobile terminal 51 are respectively provided on each of the four corners of the heat dissipation plate 60. The attachment portions 75 herein are formed as a through hole. For example, the attachment portions 75 can be matched to screw holes (not shown) formed on the rear surface portion of the touch panel 53, followed by inserting screws, not shown, as fixing members through the attachment portions 75 and then screwing these screws into the screw holes. Thus, the heat dissipation plate 60 can be easily attached and fixed to a desired location of the chassis of the mobile terminal 51.

Figure 53:
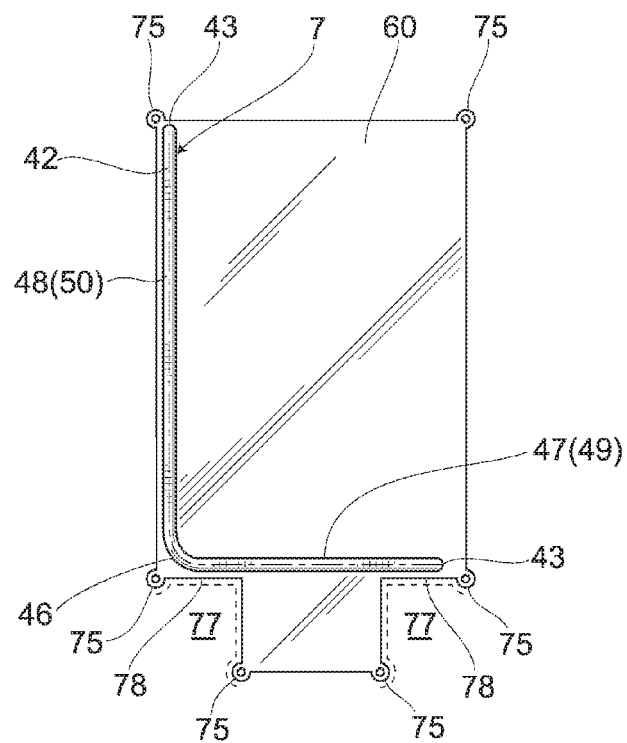
FIG. 53 is a plane view of a cooling unit of an alternative example in the fifth embodiment.
Figure 54:
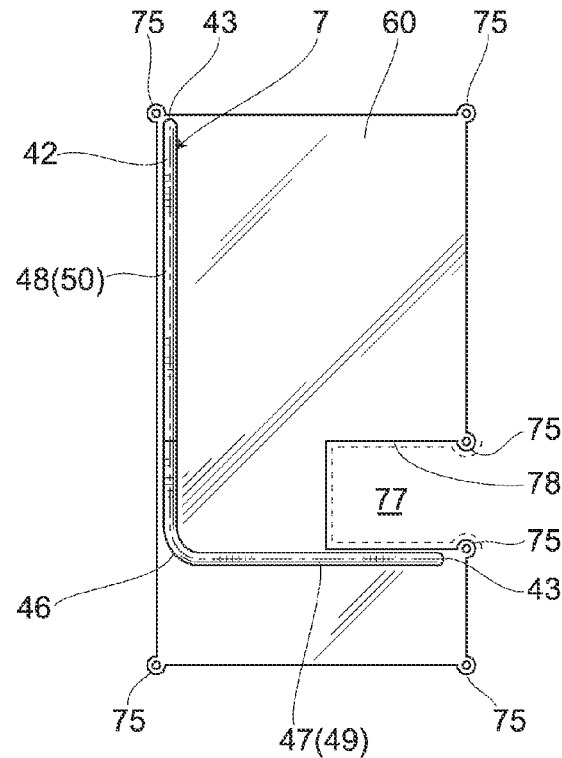
FIG. 54 is a plane view of a cooling unit of an alternative example in the fifth embodiment.

In an embodiment shown in FIG. 53, the heat dissipation plate 60 includes along with the attachment portions 75, cutouts 78 for avoiding an interference with a region 77 interfering with the chassis of the mobile terminal 51. Here, two cutouts 78 are formed on the lower parts of both right and left sides of the heat dissipation plate 60. The attachment portions 75 allow the heat dissipation plate 60 to be attached and fixed to the chassis of the mobile terminal 51 without causing the heat dissipation plate 60 to come into contact with the region 77 interfering with the chassis, thereby also making it possible to alleviate a heat influence exerted upon the region 77 interfering with the chassis of the mobile terminal 51 by the heat dissipation plate 60. Similarly, in an example shown in FIG. 54, the heat dissipation plate 60 includes one cutout 78 on the right side of the plate along with the attachment portions 75.

Figure 55:
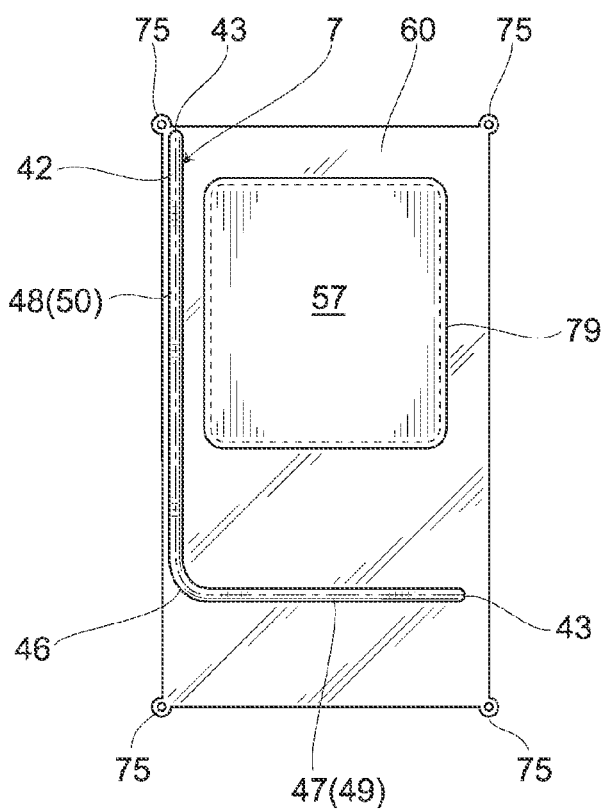
FIG. 55 is a plane view of a cooling unit of an alternative example in the fifth embodiment.

The heat dissipation plate 60 shown in FIG. 55 includes a hole 79 as a region interfering with the chassis of the mobile terminal 51. Particularly, the hole 79 is provided to avoid an interference with the battery pack 57. For this reason, the attachment portions 75 allow the heat dissipation plate 60 to be attached and fixed to the chassis of the mobile terminal 51 without causing the heat dissipation plate 60 to come into contact with the battery pack 57, thereby also making it possible to alleviate a heat influence exerted upon the battery pack 57 by the heat dissipation plate 60.

The cutout[s] 78 and the hole 79, formed as an escape section, are not limited to those shown in FIGS. 51 to 55 but may be formed in any appropriate regions of the heat dissipation plate 60 when necessary. Even when the cutout 78 or the hole 79 is provided on the heat dissipation plate 60, the flattened heat pipe 7 is to be placed so that the whole portion of the pipe is thermally connected to the heat dissipation plate 60.

Next, heat pipes of the present embodiment are described with reference to FIGS. 56 to 65.

Figure 58:
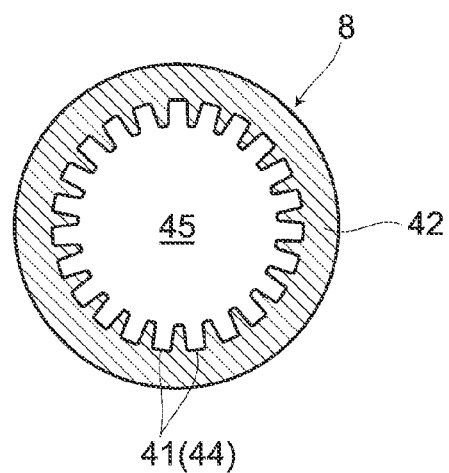
FIG. 58 is a cross-sectional view of a non-flattened heat pipe of an alternative example in the fifth embodiment.

FIG. 58 shows a linear heat pipe 8 used in this embodiment with no flattening being processed. The heat pipe 8 has a shape of non-flat circular tube with a diameter in the range of Φ2 to Φ6 mm, and is formed by sealing two ends of an internally grooved copper pipe 42. The sealing may be performed by, e.g. TIG welding. The internally grooved copper pipe 42 is made of e.g. pure copper and has grooves 41 formed on the inner wall. In any case, inside the heat pipe, an operating fluid (not shown) such as pure water is vacuum-encapsulated.

A copper alloy pipe having enhanced workability is employable as a pipe body that constitutes the main body part of the heat pipe 8, in place of the copper pipe 42 made of pure copper being excellent in heat conductivity. In such case, a plurality of grooves 41 are formed on the inner wall of the pipe; sealing portions 43 are formed, by any suitable means such as TIG welding, on both ends of the hollow cylindrical-shaped pipe body that is extended toward the longitudinal direction, thus obtaining a heat pipe 8 that is sealed and evacuated inside. In this case, grooves 41 are provided on the entire inner circumference of the copper pipe 42 along the longitudinal direction, forming a liquid passage 44 for the operating fluid. Moreover, the hollow portion surrounded by the groove 41 forms a gas passage 45 for the operating fluid.

Figure 56:
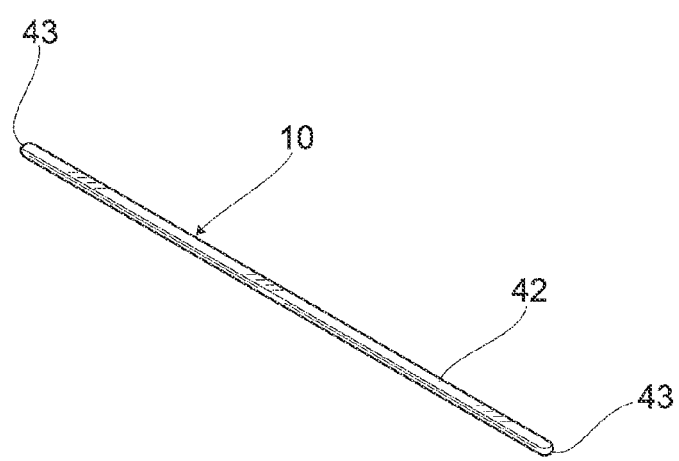
FIG. 56 is an external view of the flattened heat pipe of the fifth embodiment with no bended portion being provided thereon.
Figure 57:
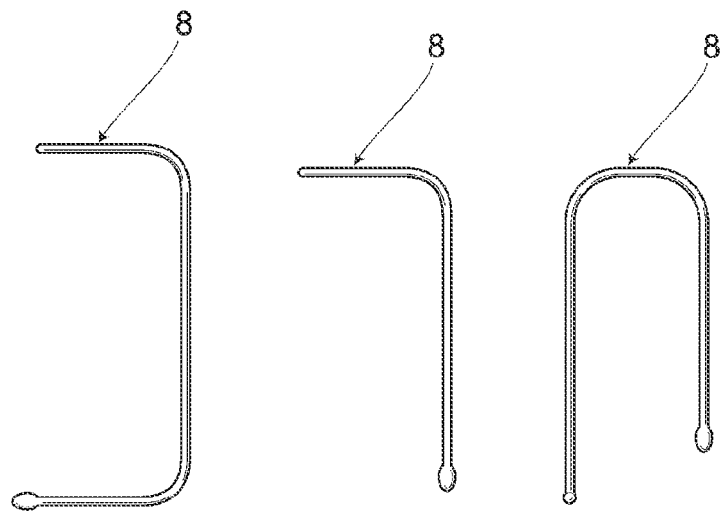
FIG. 57 is an external view of the flattened heat pipe of the fifth embodiment with bended portion being provided thereon.

A I-shaped flattened heat pipe 10 provided with a flattened portion in some or entire part of the copper pipe 42 may be obtained, as shown in FIG. 56, by the virtue of the heat pipe 8 being not bended but flattened to a thickness conforming to the mounting space of the chassis of the mobile terminal 51.

Alternatively, the heat pipe 8 may be formed into an inverted C-shapes L-shape, or U-shape, as shown in FIG. 57A, FIG. 57B and FIG. 57C, respectively with one or more bended portion being established midway through the copper pipe 42. The heat pipe may be then flattened to a thickness conforming to the mounting space of the chassis of the mobile terminal 51 to constitute flattened heat pipes 6 and 7 provided with a flattened portion in some or entire part of the copper pipe 42 as described above.

With regard to the outer shape of the U-shaped flattened heat pipe 6, the copper pipe 42 is bended 90 degrees at two places midway through the pipe and each bended portion is formed into a curved bended portion 46, forming a shape with arms 48 being connected via the bended portions 46 at both ends of a straight shaped base 47. Here, with regard to the flattened heat pipe 6, a part of the heat pipe corresponding to the base 47 is arranged as a heat-receiving portion 49 such that the past of the heat pipe are allowed to conduct a heat to the CPU 54 via the heat dissipation plate 60 and that another part of the heat pipe corresponding to the arms 48 are thermally connected to the both sides of the heat dissipation plate 60, as a heat dissipation portion 50, along a part of the outer circumferential portion of the chassis of the mobile terminal 31.

Moreover, with regard to the outer shape of the L-shaped flattened heat pipe 7, the copper pipe 42 is bended 90 degrees at one place midway through the pipe and the bended portion is formed into the curved bended portion 46, forming a shape with arm 48 being connected via the bended portion 46 at one end of the straight shaped base 47. Here, with regard to the flattened heat pipe 7, a part of the heat pipe, corresponding to the base 47, is arranged as a heat-receiving portion 49 such that the part of the heat pipe are allowed to conduct a heat to the CPU 54 via the heat dissipation plate 60 and that another part of the heat pipe corresponding to the arm 48 are thermally connected to one side of the heat dissipation plate 60, as a heat dissipation portion 50, along a part of the outer circumferential portion of the chassis of the mobile terminal 51.

Figure 59:
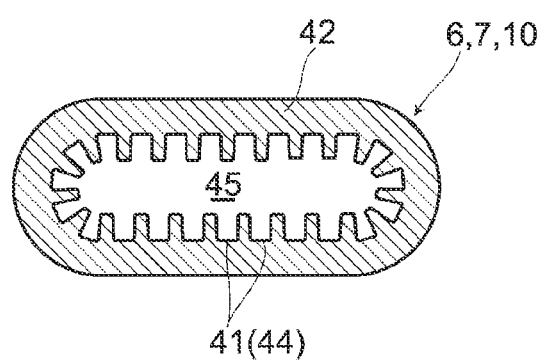
FIG. 59 is a cross-sectional view of the flattened heat pipe of an alternative example in the fifth embodiment.

FIG. 59 shows a cross-sectional view of each of the flattened heat pipes 6, 7 and 10. It is preferred that the thickness of the flattened heat pipes 6, 7 and 10 may be in the range of 0.4 to 2 mm so that it conform to the mounting space of the chassis of the mobile terminal 51. With regard to the flattened heat pipes 6, 7 and 10 formed by flattening the heat pipe 8, grooves 41 are provided on the entire inner circumference of the copper pipe 42 along the longitudinal direction, forming a liquid passage 44 for the operating fluid. Further, the hollow portion surrounded by the grooves 41 defines a gas passage 45 for the operating fluid.

The cross-section of the flattened heat pipes 6, 7 and 10 may be formed into various shapes and the shapes are not limited to the one shown in FIG. 59. The modified embodiments are described as follows. The flattened heat pipes 6, 7 and 10, shown in FIGS. 60 to 63, are provided with a plurality of grooves 41; the grooves 41 in each of the figures are formed not entirely over the all inner circumference but on a part of the inner circumference of the copper pipe 42 along the longitudinal direction. The grooves 41 define liquid passages 44 for the operating fluid, whereas the heat pipe is formed with a gas passage 45 for the operating fluid in part where the grooves 41 are not formed.

Figure 60:
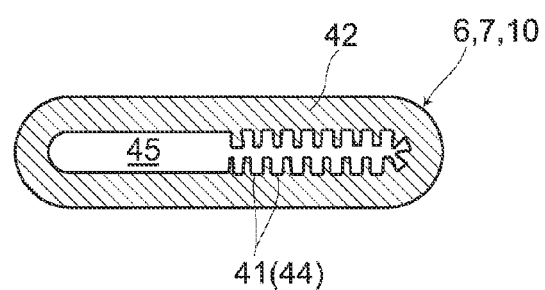
FIG. 60 is a cross-sectional view of the flattened heat pipe of an alternative example in the fifth embodiment.

More particularly, regarding each of the flattened heat pipes 6, 7 and 10 shown in FIG. 60, at one side across its width direction are formed the liquid passages 44 for the operating fluid while at another side to the width direction, a gas passage 45 for the operating fluid is formed inside. This allows the liquid passages 44, for the operating fluid, and gas passage 45 to be separately disposed from each other onto one side and another side, respectively of the flattened heat pipes 6, 7 and 10 across the width.

Figure 61:
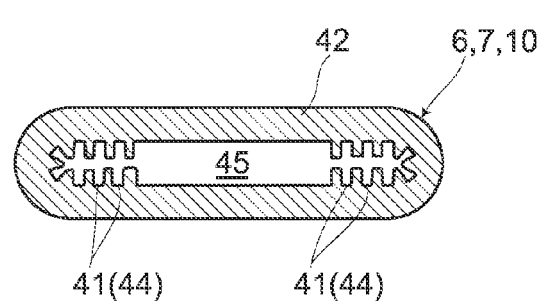
FIG. 61 is a cross-sectional view of the flattened heat pipe of an alternative example in the fifth embodiment.

Each of the flattened heat pipes 6, 7 and 10 shown in FIG. 61 is formed with liquid passages 44 for the operating fluid at both sides across its width while at the middle of the heat pipe across the width, a gas passage 45 for the operating fluid is formed inside. This allows the liquid passages 44 for the operating fluid and the gas passage 45 to be separately disposed from each other on the both sides and the middle of the each of the flattened heat pipes 6, 7 and 10, respectively across its width.

Figure 62:
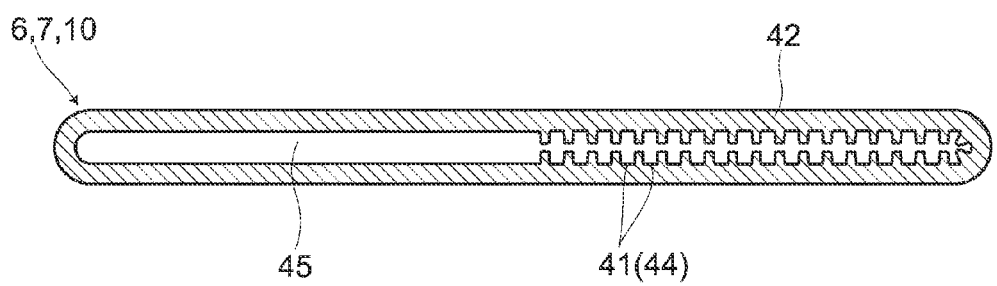
FIG. 62 is a cross-sectional view of the flattened heat pipe of an alternative example in the fifth embodiment.
Figure 63:
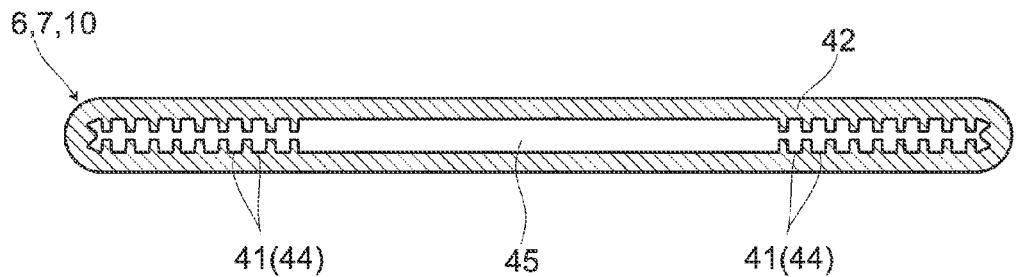
FIG. 63 is a cross-sectional view of the flattened heat pipe of an alternative example in the fifth embodiment.

Each of the flattened heat pipes 6, 7 and 10, shown in FIG. 62 and FIG. 63, has substantially planner shapes whose width direction being extended wider than the one shown in FIG. 60 or FIG. 61. The width of each of the flattened heat pipes 6, 7 and 10, in this case, is substantially matched to the one of the heat dissipation plate 60, allowing the heat to be immediately diffused over the entire heat dissipation plate 60.

Figure 64:
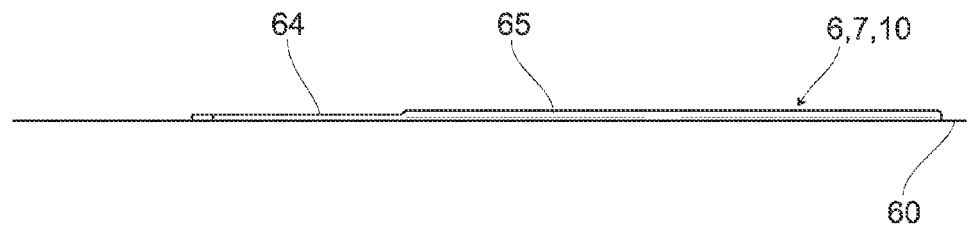
FIG. 64 is a side view of the cooling unit of the fifth embodiment obtained by thermally connecting the heat pipe to the heat dissipation plate.

As an alternative modified embodiment, a flattening processing may be given to the copper pipe 42 so as to have various flatness rates, e.g. those of the flattened heat pipes 6, 7 and 10 shown in FIG. 64. In that case, the present embodiment is advantageous since a first thin portion 64 of large flatness rate and a second thick portion 65 of small flatness rate are formed to be thermally connected to the heat dissipation plate 60, thus allowing it easy to have a good balance between heat pipe capability and housing capacity onto the chassis of the mobile terminal 51.

Figure 65:
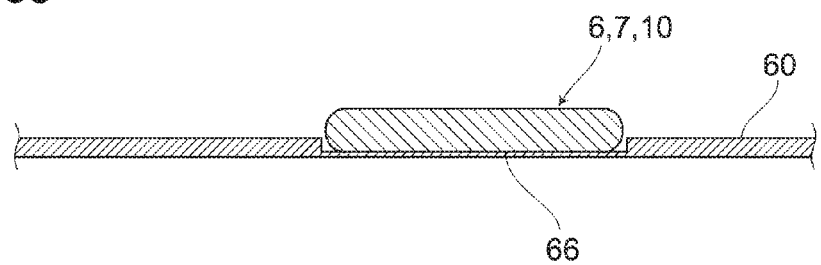
FIG. 65 is a vertical cross-sectional view of a main part of the cooling unit in the fifth embodiment.
Figure 66:
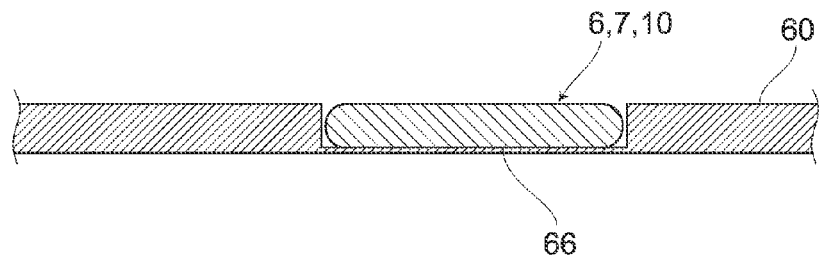
FIG. 66 is a vertical cross-sectional view of a main part of the cooling unit in the fifth embodiment.

Each of the flattened heat pipes 6, 7 and 10 completed, in this way, is solder-connected, like the one described above, to at least one of the attachment portions 75 and the heat dissipation plate 60 optionally provided with the cut-out 78 or the hole 79 by using a low-temperature solder 63. FIG. 65 and FIG. 66 show a joining structure between each of the flattened heat pipes 6, 7 and 10 and the heat dissipation plate 60. Formed on the heat dissipation plate 60 is a concave dent 66 formed thinner for allowing each of the flattened heat pipes 6, 7 and 10 to be fitted therein. In this case, the flattened heat pipes 6,7 or 10 having the heat dissipation plate 60 can be installed even inside the thin chassis of the mobile terminal 51 by means of a dent 66 formed on the heat dissipation plate 60 and by providing the flattened heat pipes 6,7 or 10 on the dent 66. Moreover, as shown in FIG. 65, in case that the thickness of a region where the dent 66 is not formed in the heat dissipation plate 60 is smaller than that of each of the flattened heat pipes 6, 7 and 10, a part of each of the flattened heat pipes 6, 7 and 10 protrudes outwardly from at least one side surface of the heat dissipation plate 60, as shown in FIG. 66, the heat pipe may be provided so as not to protrude outwardly front any side surface of the heat dissipation plate 60 if a thickness of a region where the dent 66 is not formed in the heat dissipation plate 60 is larger than that of each of the flattened heat pipes 6, 7 and 10, thus allowing an easier installation onto the mobile terminal 51.

Figure 67A:
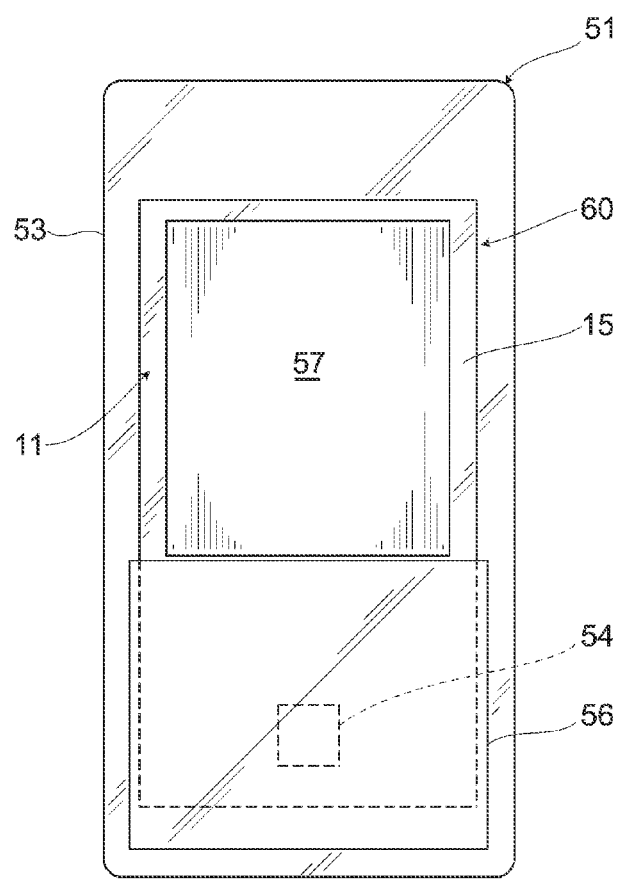
FIG. 67A is a rear view of a mobile terminal without a rear cover but with a dissipation plate that has the flattened heat pipe disposed between a rear surface of a touch panel and a motherboard, or between the one and the battery pack
Figure 67B:
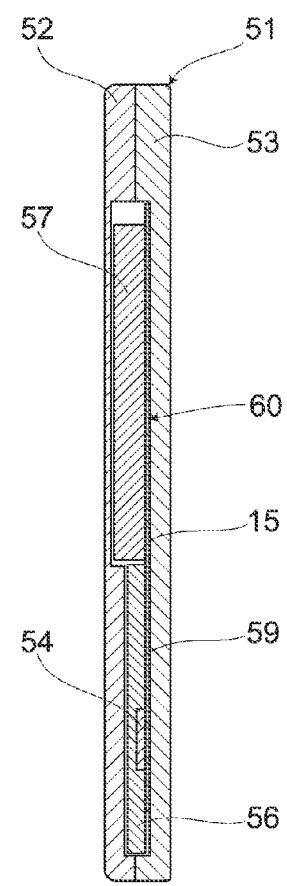
FIG. 67B is a vertical cross-sectional view of the mobile terminal with the rear cover and with the heat dissipation plate, having the flattened heat pipe, disposed between the rear surface of a touch panel and the motherboard, or between the one and the battery pack.

As shown in FIG. 67A and FIG. 67B, the heat dissipation plate 60 thermally connected to the flattened heat pipes 6,7 and 10 (here, not shown) is installed between the metal plate 59 as the rear surface of the touch panel 53 and the battery pack 57 so as to be brought as close contact as possible. Further, a motherboard 56 with CPU 54 is disposed inside the chassis of the mobile terminal 51 so that the CPU 54 and the heat dissipation plate 60 are brought as close contact as possible. Note that a cover for the CPU 54 may be optionally disposed between the CPU 54 and the heat dissipation plate 60. That is, heat dissipation plate 60 thermally connected to the flattened heat pipes 6, 7 and 10 is installed between the rear surface of the touch panel 53 and the motherboard 56 or between the one and the battery pack 57.

As for the mobile terminal 51 shown in FIG. 67A and FIG. 67B, when the CPU 54 or the like produces heat such that the temperature inside the chassis increases, the heat from the CPU 54 will be transported to the heat-receiving portion 49 of the flattened heat pipes 6, 7 and 10 through the heat dissipation plate 60. Further, the operating fluid will evaporate at the heat-receiving portion 49 such that the vapor thus generated will then flow from the heat-receiving portion 49 toward the heat dissipation portion 50 having a low temperature. In other words, heat transport takes place inside each of the flattened heat pipes 6, 7 and 10. The heat transported to the heat dissipation portion 50 will be thermally diffused in a large and planar region of the heat dissipation plate 60, and will then be released from the front and rear surfaces of the heat dissipation plate 60 to both the metal plate 59 as the rear surface of the touch panel 53 and the battery pack 57. In this way since the mobile terminal 51 allows the heat produced by the CPU 54 or the like to be thermally diffused in a large area, a heat condensed in a heat spot(s) on the outer frame surface of the touch panel 53 or the like can be relaxed, thereby making it possible to restrict the temperature of the CPU 54 from increasing.

Moreover, although the vapor will be condensed such that the operating fluid will then be collected at the heat dissipation portion 50 of the flattened heat pipes 6, 7 and 10, the operating fluid will actually be brought back from the heat dissipation portion 50 to the heat-receiving portion 49 via the liquid passage 44 through a strong capillary force of the grooves 41 that are formed on the inner wall of the flattened heat pipes 6, 7 and 10. Therefore, the operating fluid shall never be absent at the heat-receiving portion 49; particularly, the operating fluid that has evaporated at the heat-receiving portion will be guided to the heat dissipation portion 50 along the gas passage 45, thereby allowing evaporation to continuously take place, thus allowing each of the flattened heat pipes 6, 7 and 10 to exhibit its primary capabilities.

Further, there is no need to lay the flattened heat pipes 6, 7, and 10 over the CPU 54 Especially, in the case of the mobile terminal 51 such as a smartphone, the flattened heat pipes 6, 7 and 10 can be used in the chassis thereof that is limited to a certain thickness for ease of use. Particularly, the flattened heat pipes 6, 7 and 10 allows the heat of the CPU 54 or the like to be swiftly and thermally diffused in a large area through the heat dissipation plate 60 while exhibiting and maintaining a significantly favorable thermal conductivity as compared to a graphite sheet.

FIG. 68A and FIG. 68B show an alternative embodiment in which the heat dissipation plate 60 thermally connected to the flattened heat pipes 6, 7 and 10 is installed between the rear cover 52 and the motherboard 56. Here, the heat dissipation plate 60 includes an escape section 76 as a region interfering with the chassis of the mobile terminal 51. Particularly, the escape section 76 is provided to avoid an interference with the battery pack 57. For this reason, the heat dissipation plate 60 can be installed in the chassis of the mobile terminal 51 without causing the heat dissipation plate 60 to come into contact with the battery pack 57, thereby also making it possible to alleviate a heat influence exerted upon the battery pack 57 by the heat dissipation plate 60. Other than the region of the battery pack 57, the aforementioned escape section 76 may be provided in regions interfering with various functional components that are installed inside the chassis of the mobile terminal 51.

In FIG. 68A and FIG. 68B, heat dissipation plate 60 thermally connected to each of the flattened heat pipes 6, 7 and 10 is installed inside the chassis of the mobile terminal 51 between the rear cover 52 forming a rear part of the chassis and motherboard 56 including the CPU 54 so that these are brought as close contact as possible.

As for the mobile terminal 51 shown in FIG. 68A and FIG. 68B, when the CPU 54 or the like produces heat such that the temperature inside the chassis increases, the heat from the CPU 54 will be transported to the heat-receiving portion 49 of the flattened heat pipes 6, 7 and 10 through the heat dissipation plate 60. Further, the operating fluid will evaporate at the heat-receiving portion 49 such that the vapor thus generated will then flow from the heat-receiving portion 40 toward the heat dissipation portion 50 having a low temperature. In other words, heat transport takes place inside the flattened heat pipes 6, 7 and 10. The heat transported to the heat dissipation portion 50 will be thermally diffused in a large and planar region of the heat dissipation plate 60, and will then be released from another side surface of the heat dissipation plate 60 to the rear cover 52 of the chassis. In this way, since the mobile terminal 51 allows the heat produced by the CPU 54 or the like to be thermally diffused in a large area, a heat condensed in a heat spot(s) on the outer frame surface of the rear cover 52 or the like can be relaxed, thereby making it possible to restrict the temperature of the CPU 54 from increasing.

Moreover, although the vapor will be condensed such that the operating fluid will then be collected at the heat dissipation portion 50 of the flattened heat pipes 6, 7 and 10, the operating fluid will actually be brought back from the heat dissipation portion 50 to the heat-receiving portion 49 via the liquid passage 44 through a strong capillary force of the grooves 41 that are formed on the inner wall of the flattened heat pipes 6, 7 and 10. Therefore, the operating fluid shall never be absent at the heat-receiving portion 49; particularly the operating fluid that has evaporated at the heat-receiving portion will be guided to the heat dissipation portion 50 along the gas passage 45, thereby allowing evaporation to continuously take place, thus allowing flattened heat pipes 6, 7 and 10 to exhibit its primary capabilities.

Further, there is no need to lay the flattened heat pipe 6, 7, or 10 over the CPU 54 and the battery pack 57. Especially, in the case of the mobile terminal 51 such as a smartphone, the flattened heat pipes 6, 7 and 10 can be used in the chassis thereof that is limited to a certain thickness for ease of use. Particularly, the flattened heat pipes 6, 7 and 10 allows the heat of the CPU 54 or the like to be swiftly and thermally diffused in a large area, through the heat dissipation plate 60 while exhibiting and maintaining a significantly favorable thermal conductivity as compared to a graphite sheet.

FIG. 69A through FIG. 69C show test results obtained by comparing with one another the ways the temperature of the mobile terminal 51 increases due to differences in a cooling structure. FIG. 69A shows a surface temperature of the touch panel 53 when the sheet-shaped heat pipe 1 of the first embodiment is disposed between the rear surface of the touch panel 53 and motherboard 56 or between the one and the battery pack 57; FIG. 69B shows a surface temperature of the touch panel 53 when the heat dissipation plate 60 thermally connected to the flattened heat pipe 6 of the fifth embodiment is disposed between the tear surface of the touch panel 53 and the motherboard 56 or between the one and the battery pack 57; FIG. 69C shows a surface temperature of the touch panel 53 when a conventional graphite sheet is disposed between the rear surface of the touch panel 53 and the motherboard 56 or between the one and the battery pack 57.

The tests were conducted by mounting a heat-source heater (not shown) as a substitute for the CPU 54 on a smartphone that is a mobile terminal 51. As the test conditions, an ambient temperature was set to be 25° C.; the heat value of the heat-source heater was set to be 5 W; and measured was a temperature obtained after 20 minutes had elapsed. Further, the thickness of the sheet-shaped heat pipe 1 used in the test was 0.5 mm and one arm 48 of the flattened heat pipe 6 is arranged in the vicinity of the heat-source heater as the heat-receiving portion 40 while another arm 48 has a shape conformed to the lateral region of the battery pack 57 as the heat dissipation portion 50. The thickness of the heat-receiving portion 49 and the one of the heat dissipation portion 50 are 0.5 mm and 0.8 mm, respectively. The heat dissipation plate 60 thermally connected to the flattened heat pipe 6 is made of copper and has a thickness of 0.2 mm. The thickness of the graphite sheet was 0.017 mm.

It is understood from the aforementioned test results that, as compared to the conventional cooling structure using "Graphite sheet," each of the cooling structures using the sheet-shaped heat pipe 1 or the heat dissipation plate 60 with flattened heat pipe 6, of the present embodiment, allows the heat generated by the heat-source heater to be widely diffused over the entire heat dissipation plate 60; and allows a heat condensed in a heat spot(s) on the surface of the touch panel 53 to be significantly relaxed.

Moreover, temperature distributions on the entire surfaces of the touch panel 53 are shown as images in FIG. 69A through FIG. 69C where in particular inside the chassis of the mobile terminal 51, attention should be given to a "battery pack area" on which the battery pack 5 is to be mounted and to a "motherboard area" on which the motherboard 56 is to be mounted; the difference in temperature between the temperature of the "battery pack area" and that of "motherboard area" are within 3K in a cooling structure, shown in FIG. 69A, with the sheet-shaped heat pipe 1, thus showing a good and uniform heat diffusion being undertaken through the sheet-shaped heat pipe 1 into the rear surface of the touch panel 53.

The CPU 54, installed as a control processor, is configured to be underclocked when the temperature has reached a predetermined temperature to limit the thermal elevation of the CPU 54 itself. However, since the underclocked CPU 54 exhibits poor processing capability, the temperature needs to be managed so as not to underclock the CPU 54 inside the chassis of the mobile terminal 51.

In this regard, in the cooling structure with the sheet-shaped heat pipe 1, particularly in the one shown in FIG. 69A, the difference in temperature between the temperature of the "battery pack area" and that of the "motherboard area" is to be within 10K when the increase in the surface temperature of the touch panel 53 has reached a maximum and then become saturated without causing underclocking of the CPU 54. Therefore, there can be achieved a good and uniform heat diffusion through the sheet-shaped heat pipe 1 into the rear surface of the touch panel 53 without degrading primary capabilities of the CPU 54.

To sum it up, as shown in FIG. 32B and FIG. 67B, in the mobile terminal 51 described in each embodiment above, the flat-type heat pipe, such as sheet-shaped heat pipes 1 to 4 or flattened heat pipes 6, 7 and 10, is disposed between the rear surface of the touch panel 53 and motherboard 56 serving as a substrate or between the one and the battery pack 57.

In this case, since the flat-type heat pipe is arranged opposite to the rear surface of the touch panel 53 which is a part of the chassis of the mobile terminal 51, a good and uniform heat diffusion from heat generating components such as CPU 54 to a large area on the chassis can be achieved through these sheet-shaped heat pipes 1 to 4 or through the flattened heat pipes 6, 7 and 10, thus allowing the heat generating components such as CPU 54 to make best use of its capabilities.

Moreover, as shown in FIG. 34B and FIG. 68B, regarding the mobile terminal 51 described in each embodiment above, the flat-type heat pipe, such as sheet-shaped heat pipes 1 to 4 or flattened heat pipes 6, 7 and 10, is disposed between the rear cover 52 and the motherboard 56 serving as a substrate.

In this case, since the flat-type heat pipe is arranged opposite to the rear surface of the rear cover 52 which is a part of the chassis of the mobile terminal 51, a favorable heat diffusion from heat generating components such as CPU 54 to a large area on the chassis can be achieved through these the flat-type heat pipes, thus allowing the heat generating component such as CPU 54 to make best use of its capabilities.

Moreover, in each of the cooling structures with flattened heat pipes 6, 7 and 10 shown in the fifth embodiment as described in FIG. 65 and FIG. 66, it is preferred that a dent 66 is provided in the heat dissipation plate by thinly forming a portion of the heat dissipation plate 60 that is made of a metal such as copper or of forming material (plastic) having excellent heat conductivity and that the flattened heat pipe is then mounted on the dent 66.

In this way, by means of the dent 66 formed on the heat dissipation plate 60, the flattened heat pipes 6, 7 and 10 having the heat dissipation plate 60 can be effortlessly installed even in a thin chassis of the mobile terminal 51 by mounting the flattened heat pipes 6, 7 and 10 on the dent 66. Therefore, the heat dissipation plate 60 allows the heat generating components such as CPU 54 to make best use of its capabilities since the plate allows favorable heat diffusion into the larger area of the chassis.

Further, as shown in FIG. 36 and FIG. 37, the aforementioned sheet-shaped heat pipes 1 to 4 include the heat-receiving portion 19 and the heat dissipation portion 37; the heat-receiving portion 19 and the heat dissipation portion 32 are formed wider than any other portions of the sheet-shaped heat pipes 1 to 4.

In this case, by forming the heat-receiving portion 19 wider than any other parts of the pipe, thermal connection between, the heat-receiving portion 19 and the heat generating components such as CPU 54 is ensured. Also, by forming the heat dissipation portion 32 wider than any parts of the pipe, the heat is allowed to dissipate into a larger area, allowing the heat generating components such as CPU 54 to make best use of its capabilities.

Furthermore, as shown in FIG. 69A to FIG. 69C, by the virtue of the rear surface of the touch panel 53 being divided into a first region where motherboard 56 is to be placed and a second region where the battery pack 57 is to be placed, sheet-shaped heat pipe 1 is configured to be installed inside the chassis of the mobile terminal 51 so that the difference in temperature between the temperature of the "first region" and that of "second region" is to be within 3K when the increase in temperature of the touch panel 53 has reached a maximum.

That is, by the virtue of the touch panel 53 that is configured not to get heated locally when the increase in temperature of the touch panel 53 has reached a maximum, there can be achieved a good and uniform heat diffusion over the rear surface of the touch panel 53, allowing the heat generating components such as CPU to make best use of its capabilities.

Further, sheet-shaped heat pipe 1 is configured to be installed inside the chassis of the mobile terminal 51 so that the difference in temperature between the temperature of the "first region" and that of "second region" is to be within 10K when the increase in the surface temperature of the touch panel 53 has reached a maximum without causing underclocking of the CPU 54 as a heat generating component.

That is, by the virtue of the touch panel 53 of its rear surface configured not to get heated locally when the increase in temperature of the touch panel 53 has reached a maximum without causing undercooking of the CPU 54 as a heat generating component, there can be achieved a good and uniform heat diffusion over the rear surface of the touch panel 53, allowing the heat generating components such as CPU 34 to make best use of its capabilities without degrading its primary capability of the CPU 54.

It is to be understood that the present invention may not be limited to those described above as an embodiment, and many modifications and variations are possible within the scope of the invention. For example, the shapes of the sheet-shaped heat pipes 1 to 4 or those of flattened heat pipes 6, 7, and 10 are not limited to those described in the aforementioned embodiments and the sheet may have any shapes as long as the sheet provides a desired performance. Further, the sheet-shaped heat pipes 1 to 4, and the flattened heat pipes 6, 7 and 10 work well as long as those are provided either between the rear surface of the touch panel 53 and motherboard 56, or between the one and the battery pack 57.

What is claimed:

1. A mobile terminal comprising:
   a touch panel;
   a rear cover arranged on a rear side of the touch panel; and
   a flat chassis defined by the touch panel and the rear cover,
      said flat chassis containing thereinside:
      a substrate;
      a battery pack; and
      a flat-type heat pipe disposed between a rear surface of the touch panel and any of the substrate and the battery pack, said flat-type heat pipe being in contact with the touch panel, wherein said flat-type heat pipe is a sheet-shaped heat pipe including
         a sealed container composed of a plurality of sheet bodies laminated on top of one another, said sheet bodies including at least two sheet bodies having concave grooves and concave passages in one side of each of the at least two sheet bodies facing inwardly toward each other to form the sealed container defining thereinside:
            vapor passages consisting of the concave passages; and
            wicks consisting of the concave grooves.

2. The mobile terminal according to claim 1, said sheet-shaped heat pipe including:
   a heat-receiving portion; and
   a heat dissipation portion, wherein
   at least one of the heat-receiving portion and the heat dissipation portion is formed wider than any other portions of the sheet-shaped heat pipe.

3. The mobile terminal according to claim 1, wherein the sheet-shaped heat pipe is installed in a region occupying not less than 50% of the rear surface of the touch panel.

4. The mobile terminal according to claim 1, wherein one part of a first side surface of the sheet-shaped heat pipe serves as a heat-receiving portion, and is in contact with and thermally connected to the substrate including a heat source, while
the other part of the first side surface of the sheet-shaped heat pipe serves as a heat dissipation portion, and is in contact with and thermally connected to the battery pack.

5. The mobile terminal according to claim 1, wherein the rear surface of the touch panel is composed of a metal plate, and a first side surface of the sheet-shaped heat pipe serves as a heat dissipation portion, and is in contact with and thermally connected to the metal plate.

6. The mobile terminal according to claim 5, wherein the first side surface of the sheet-shaped heat pipe is entirely in contact with and thermally connected to the metal plate.

7. The mobile terminal according to claim 1, wherein the sheet-shaped heat pipe has a thickness of not larger than 0.5 mm.

8. A mobile terminal comprising:
   a touch panel
   a rear cover arranged on a rear side of the touch panel; and
   a flat chassis defined by the touch panel and the rear cover,
      said flat chassis containing thereinside
      a substrate;
      a battery pack; and
      a flat-type heat pipe disposed between the rear cover and the substrate, said flat-type heat pipe being in contact with the rear cover while avoiding any contact with the battery pack, wherein said flat-type heat pipe is a sheet-shaped heat pipe including
         a sealed container composed of a plurality of sheet bodies laminated on top of one another, said sheet bodies including at least two sheet bodies having concave grooves and concave passages in one side of each of the at least two sheet bodies facing inwardly toward each other to form the sealed container defining thereinside:
            vapor passages consisting of the concave passages; and
            wicks consisting of the concave grooves.

9. The mobile terminal according to claim 8, said sheet-shaped heat pipe including:

a heat-receiving portion; and a heat dissipation portion, wherein at least one of the heat-receiving portion and the heat dissipation portion is formed wider than any other portions of the sheet-shaped heat pipe.

10. The mobile terminal according to claim 8, wherein said sheet-shaped heat pipe is provided with an escape section avoiding an contact and interference with the battery pack.

11. The mobile terminal according to claim 8, wherein a first side surface of the sheet-shaped heat pipe partly serves as a heat-receiving portion, and is in contact with and thermally connected to the substrate including a heat source, while a second side surface of the sheet-shaped heat pipe partly serves as a heat dissipation portion, and is in contact with and thermally connected to the rear cover.

12. The mobile terminal according to claim 8, wherein the sheet-shaped heat pipe has a thickness of not larger than 0.5 mm.

* * * * *